(12) United States Patent
Peterson et al.

(10) Patent No.: US 11,192,597 B2
(45) Date of Patent: Dec. 7, 2021

(54) SIDE-BY-SIDE VEHICLE

(71) Applicant: Polaris Industries Inc., Medina, MN (US)

(72) Inventors: Shawn D. Peterson, East Bethel, MN (US); Bryce A. Holm, Luck, WI (US); Brent A. Erspamer, Blaine, MN (US); Bradley R. Morisch, Lindstrom, MN (US); Kurt E. Stenberg, Greenbush, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 16/576,305

(22) Filed: Sep. 19, 2019

(65) Prior Publication Data

US 2020/0010125 A1 Jan. 9, 2020

Related U.S. Application Data

(62) Division of application No. 15/631,874, filed on Jun. 23, 2017, now Pat. No. 10,479,422.

(Continued)

(51) Int. Cl.
*B62D 33/06* (2006.01)
*B60K 17/22* (2006.01)
(Continued)

(52) U.S. Cl.
CPC .......... *B62D 33/0617* (2013.01); *B60G 3/20* (2013.01); *B60G 21/05* (2013.01); *B60G 21/055* (2013.01); *B60K 17/22* (2013.01); *B60K 17/24* (2013.01); *B60K 17/34* (2013.01); *B60K 17/344* (2013.01); *B60N 2/005* (2013.01); *B60N 2/02* (2013.01); *B60N 2/305* (2013.01); *B60N 2/3097* (2013.01); *B60N 2/38* (2013.01); *B62D 23/005* (2013.01);
(Continued)

(58) Field of Classification Search
CPC . B60N 2/38; B60N 2/005; B60N 2/02; B60N 2002/0212; B60K 17/00
See application file for complete search history.

(56) References Cited

U.S. PATENT DOCUMENTS 5,195,802 A * 3/1993 Hayakawa ............ B60N 2/366
297/334
6,010,190 A * 1/2000 Downey ................ B60N 2/123
297/331

(Continued)

FOREIGN PATENT DOCUMENTS

CA 177158 8/2018
EM 004169266-0001 8/2017
(Continued)

OTHER PUBLICATIONS

International Preliminary Report on Patentability issued by the International Bureau of WIPO, dated Jun. 25, 2019, for International Patent Application No. PCT/US2017/054006; 10 pages.

(Continued)

*Primary Examiner* — Erez Gurari
(74) *Attorney, Agent, or Firm* — Faegre Drinker Biddle & Reath LLP

(57) ABSTRACT

The present invention relates to all terrain vehicles having at least a pair of laterally spaced apart seating surfaces.

26 Claims, 73 Drawing Sheets

Related U.S. Application Data

(60) Provisional application No. 62/438,267, filed on Dec. 22, 2016.

(51) Int. Cl.

| | | |
|---|---|---|
| *B60K 17/344* | (2006.01) | |
| *B60G 21/055* | (2006.01) | |
| *B60K 17/24* | (2006.01) | |
| *B60G 3/20* | (2006.01) | |
| *B60N 2/30* | (2006.01) | |
| *B62D 23/00* | (2006.01) | |
| *B60K 17/34* | (2006.01) | |
| *F16D 9/06* | (2006.01) | |
| *B60N 2/005* | (2006.01) | |
| *B60N 2/02* | (2006.01) | |
| *B60N 2/38* | (2006.01) | |
| *B60G 21/05* | (2006.01) | |
| *B62D 29/00* | (2006.01) | |
| *B62D 33/02* | (2006.01) | |
| *B62D 33/023* | (2006.01) | |
| *B60K 17/00* | (2006.01) | |
| *B62D 3/00* | (2006.01) | |

(52) U.S. Cl.
CPC ............ *B62D 29/00* (2013.01); *B62D 33/02* (2013.01); *F16D 9/06* (2013.01); *B60G 2200/144* (2013.01); *B60G 2204/1224* (2013.01); *B60K 17/00* (2013.01); *B60N 2002/0212* (2013.01); *B60N 2205/35* (2013.01); *B60Y 2200/20* (2013.01); *B62D 3/00* (2013.01); *B62D 23/00* (2013.01); *B62D 33/023* (2013.01)

(56) References Cited

U.S. PATENT DOCUMENTS

| | | | | |
|---|---|---|---|---|
| 6,102,463 | A * | 8/2000 | Swanson | B60N 2/3013 |
| | | | | 296/37.15 |
| 6,183,033 | B1 * | 2/2001 | Arai | B60N 2/3013 |
| | | | | 296/65.09 |
| 6,698,835 | B2 * | 3/2004 | Kojima | B60N 2/0881 |
| | | | | 248/429 |
| 6,767,040 | B1 * | 7/2004 | Freijy | B60N 2/3031 |
| | | | | 296/65.09 |
| 7,950,486 | B2 * | 5/2011 | Van Bronkhorst | B60G 17/021 |
| | | | | 180/89.11 |
| 8,267,457 | B2 * | 9/2012 | Yamada | B60N 2/3013 |
| | | | | 296/65.01 |
| 8,973,693 | B2 | 3/2015 | Kinsman | |
| 8,997,908 | B2 * | 4/2015 | Kinsman | B60R 21/13 |
| | | | | 180/89.1 |
| 9,366,280 | B2 | 6/2016 | Whiting | |
| 9,457,756 | B2 * | 10/2016 | Hirooka | B60R 9/06 |
| 9,650,078 | B2 | 5/2017 | Kinsman | |
| 9,725,023 | B2 | 8/2017 | Miller | |
| 9,950,674 | B1 * | 4/2018 | Kalergis | B60N 2/305 |
| 10,232,788 | B1 * | 3/2019 | Hagedorn | B60R 7/043 |
| 10,479,422 | B2 * | 11/2019 | Hollman | B60K 17/344 |
| 10,625,639 | B2 * | 4/2020 | Deschamps | B60N 2/36 |
| 10,793,031 | B1 * | 10/2020 | Daniels | B60N 2/2893 |
| 2002/0017797 | A1 * | 2/2002 | Jach | B60N 2/3011 |
| | | | | 296/65.09 |
| 2002/0033622 | A1 * | 3/2002 | Jarnail | B64D 11/0619 |
| | | | | 297/216.2 |
| 2002/0074852 | A1 | 6/2002 | Scrivens | |
| 2003/0197393 | A1 * | 10/2003 | Hanagan | B60N 2/3031 |
| | | | | 296/65.01 |
| 2006/0255637 | A1 * | 11/2006 | O'Connor | B60N 2/20 |
| | | | | 297/331 |
| 2007/0021222 | A1 | 1/2007 | Voigt | |
| 2007/0026954 | A1 | 1/2007 | Langer | |
| 2007/0181358 | A1 | 8/2007 | Nakagaki | |
| 2008/0169694 | A1 * | 7/2008 | Speh | B60N 2/2209 |
| | | | | 297/300.1 |
| 2009/0295185 | A1 * | 12/2009 | Abe | B60N 2/3065 |
| | | | | 296/65.09 |
| 2010/0213733 | A1 * | 8/2010 | Stark | B60N 2/309 |
| | | | | 296/65.08 |
| 2010/0317485 | A1 | 12/2010 | Gillingham | |
| 2011/0115259 | A1 | 5/2011 | Mizuta | |
| 2013/0168994 | A1 * | 7/2013 | Yamamoto | B60R 21/026 |
| | | | | 296/63 |
| 2014/0144719 | A1 | 5/2014 | Morgan | |
| 2014/0182957 | A1 * | 7/2014 | Honda | B60H 1/00285 |
| | | | | 180/68.1 |
| 2014/0225403 | A1 * | 8/2014 | Shimada | B60N 2/06 |
| | | | | 297/188.1 |
| 2016/0332543 | A1 * | 11/2016 | Ecker | B60N 2/3093 |
| 2017/0096225 | A1 * | 4/2017 | Smith | B64D 11/0643 |
| 2018/0179991 | A1 | 6/2018 | Oakden-Graus | |
| 2019/0168637 | A1 * | 6/2019 | Abe | B60N 2/3011 |
| 2019/0217753 | A1 * | 7/2019 | McGraw | B60N 2/36 |
| 2019/0366883 | A1 * | 12/2019 | Ultsch | B60N 2/3013 |
| 2020/0148084 | A1 * | 5/2020 | Holm | B60N 2/304 |
| 2020/0180476 | A1 * | 6/2020 | Salenbien | B60N 2/305 |

FOREIGN PATENT DOCUMENTS

| | | |
|---|---|---|
| EP | 1479933 | 11/2004 |
| FR | 2891330 | 3/2007 |
| WO | WO 2018/118176 | 6/2018 |

OTHER PUBLICATIONS

International Search Report issued by the European Patent Office, dated May 14, 2018, for International Patent Application No. PCT/US2017/054006; 6 pages.

Written Opinion issued by the European Patent Office, dated May 14, 2018, for International Patent Application No. PCT/US2017/054006; 9 pages.

* cited by examiner

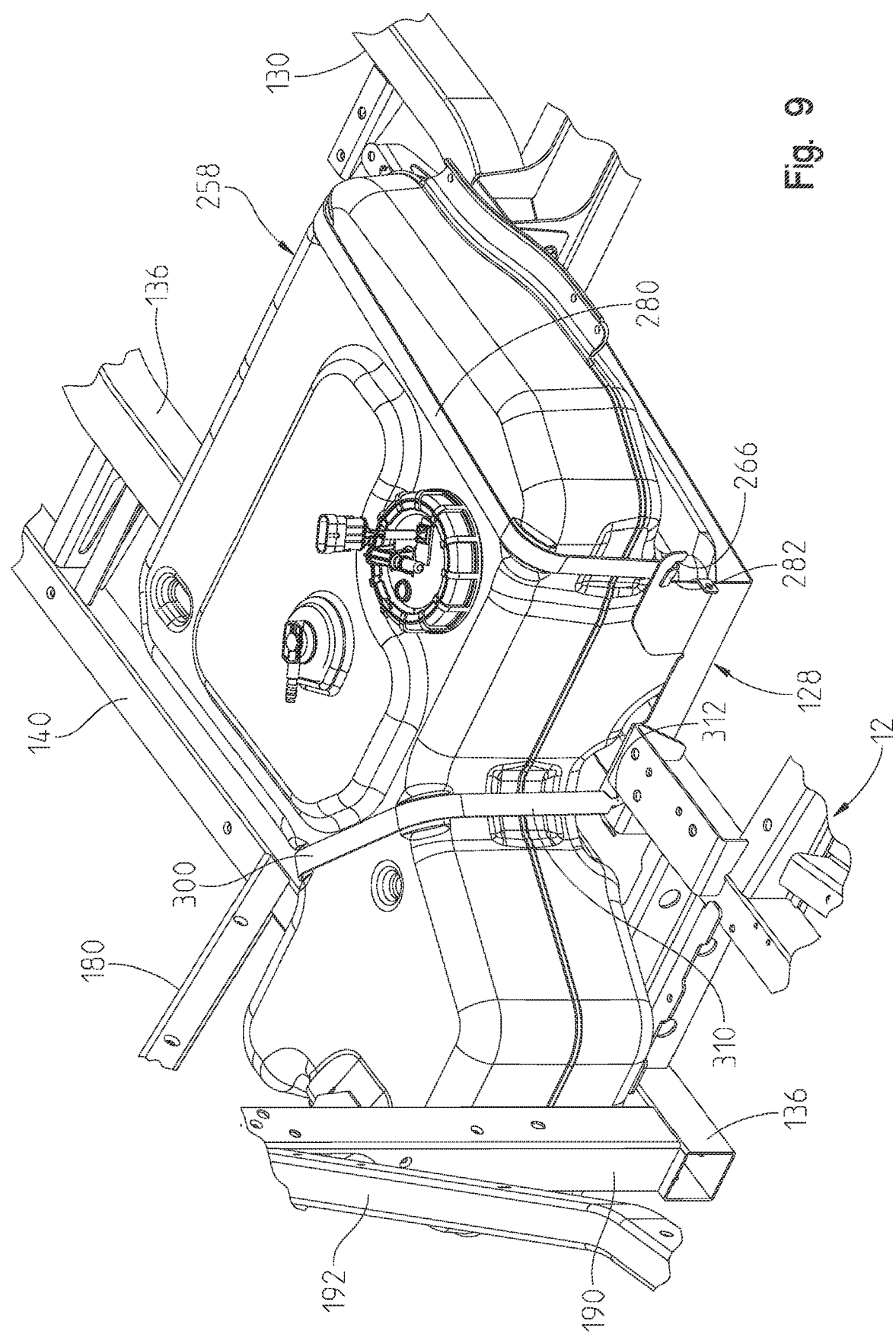

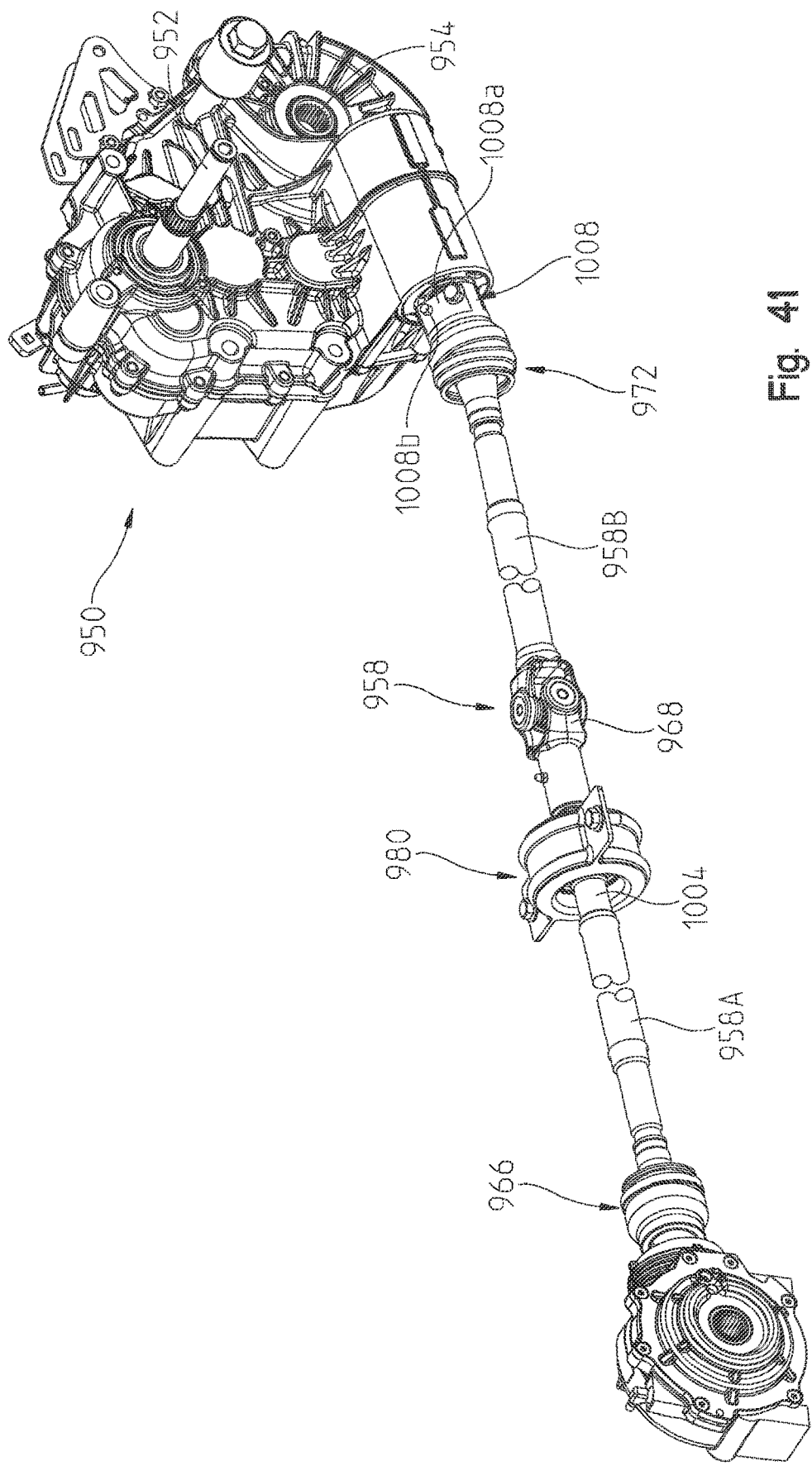

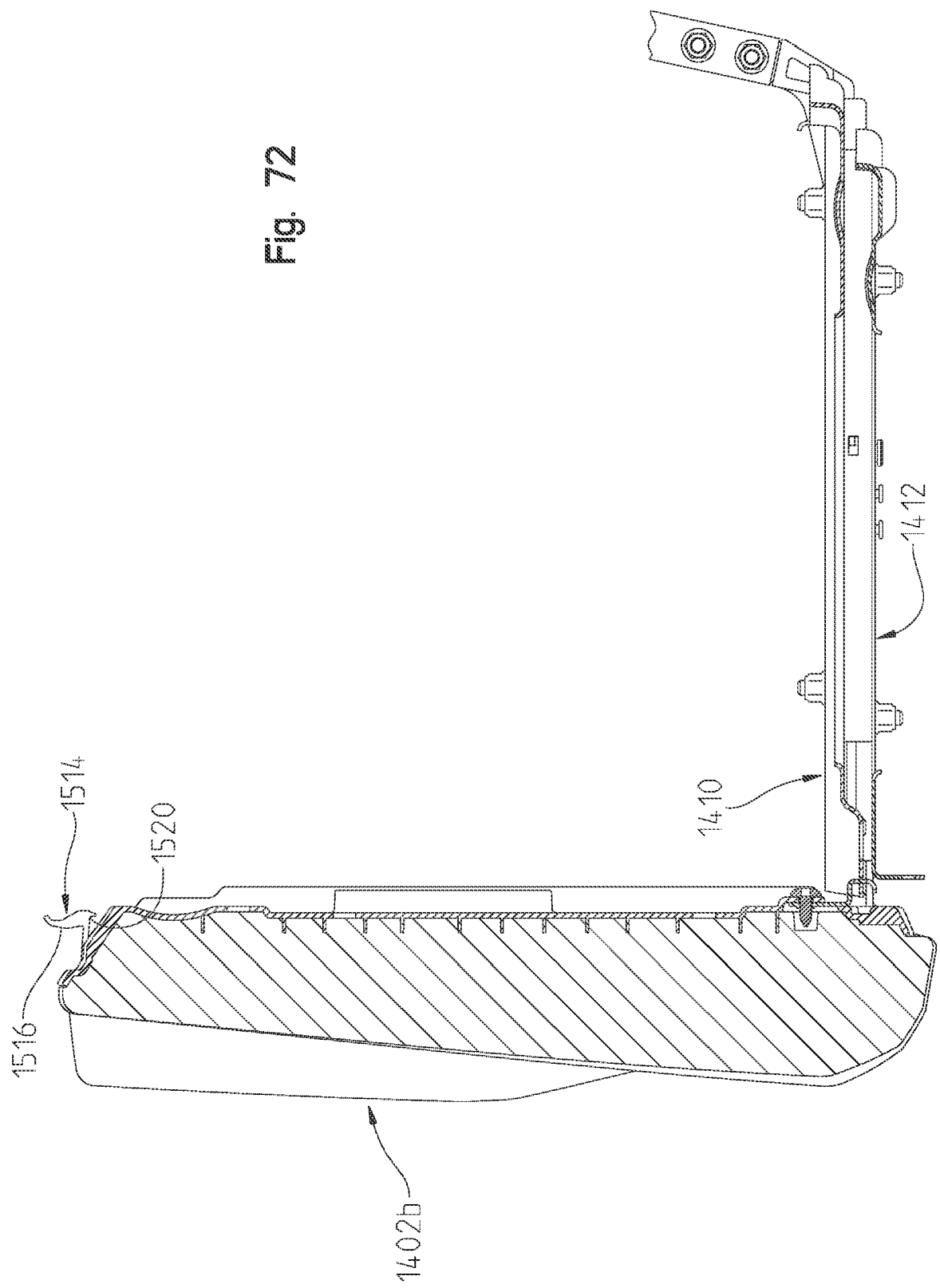

SIDE-BY-SIDE VEHICLE

RELATED CASES

The present application is a divisional of U.S. Serial application Ser. No. 15/631,874, filed Jun. 23, 2017, which claims priority to U.S. Provisional Application Ser. No. 62/438,267 filed Dec. 22, 2016, the subject matter of which are incorporated herein by reference.

FIELD OF THE DISCLOSURE

The present invention relates to side-by-side all terrain vehicles.

BACKGROUND

Generally, all terrain vehicles ("ATVs") and utility vehicles ("UVs") are used to carry one or two passengers and a small amount of cargo over a variety of terrains. Due to increasing recreational interest in ATVs, specialty ATVs, such as those used for trail riding, racing, and cargo hauling have entered the market place. Most ATVs include seating for up to two passengers which are either seated side-by-side or with the passenger positioned behind the driver of the ATV. Side-by-side ATVs, in which the driver and passenger are seated beside each other on laterally spaced apart seats, have become popular because of the ability to allow the passenger to share the driver's viewpoint.

SUMMARY

According to an illustrative embodiment of the present disclosure, a utility comprises a plurality of ground-engaging members; a frame supported by the ground-engaging members; and a drivetrain supported by the frame. The drivetrain comprises a power source, a rear final drive, a front final drive, a rear coupling between the rear final drive and rear wheels and a front coupling between the power source and the front wheels. The front coupling has a defined break point when excessive torque is transmitted to the front coupling.

According to another embodiment of the present disclosure, a utility vehicle comprises an operator's compartment comprising a seating area having a seat. The seat is defined by a seat back and a seat bottom, the seat bottom being pivotal relative to the seat back and towards the seat back, the seat having a linkage to hold the seat bottom in the upper position.

According to another embodiment of the present disclosure, a utility vehicle comprises a plurality of ground-engaging members; a frame supported by the ground-engaging members, including a seat frame member; a drivetrain supported by the frame; and an operator's compartment comprising a seat. The seat is defined by a seat back and a seat bottom, the seat extending transversely of the seat frame member so as to cantilever over an end of the seat frame member, the space under the cantilevered portion of the seat bottom being available for storage. The seat may be an operator's seat or a passenger's seat.

According to another embodiment of the present disclosure, a utility vehicle comprises a plurality of ground-engaging members; a frame supported by the ground-engaging members; a drivetrain supported by the frame; a battery; an operators compartment; a cab frame positioned over the operators compartment; and a bus bar system comprising at least one terminal block electrically coupled to the battery and having a plurality of electrical outlets for direct connection.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 19 is an enlarged perspective view of a front corner on the driver's side showing a net attachment mechanism;

FIG. 41 shows a left perspective view of the drivetrain;

FIG. 72 shows a cross-sectional view of the driver seat as in FIG. 71 with the seat bottom rotated to an open position.

Figure 1:
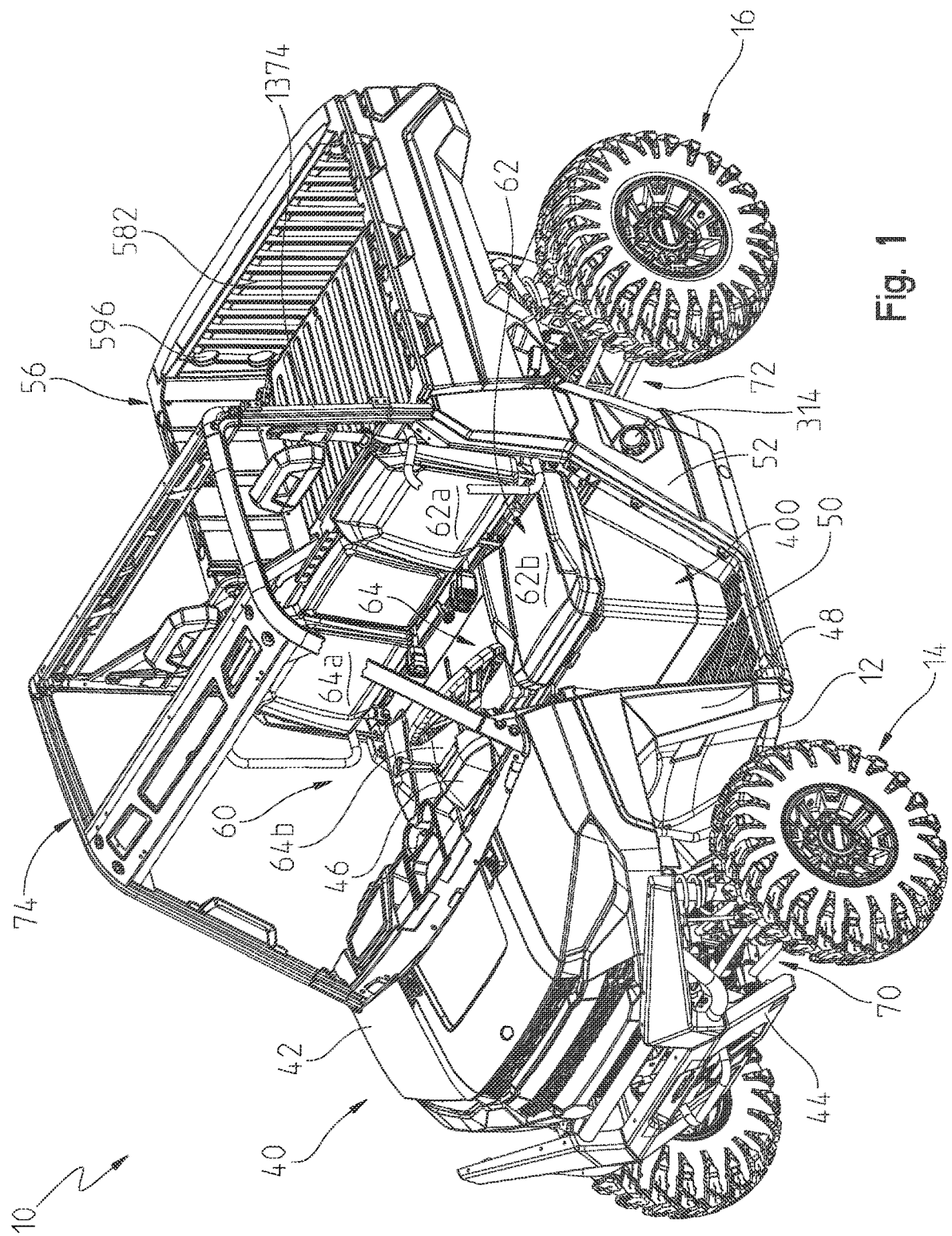
FIG. 1 shows a front left perspective view of the vehicle of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to UVs, certain features described herein may be applied to other applications such as ATVs, snowmobiles, motorcycles, mopeds, etc.

Figure 2:
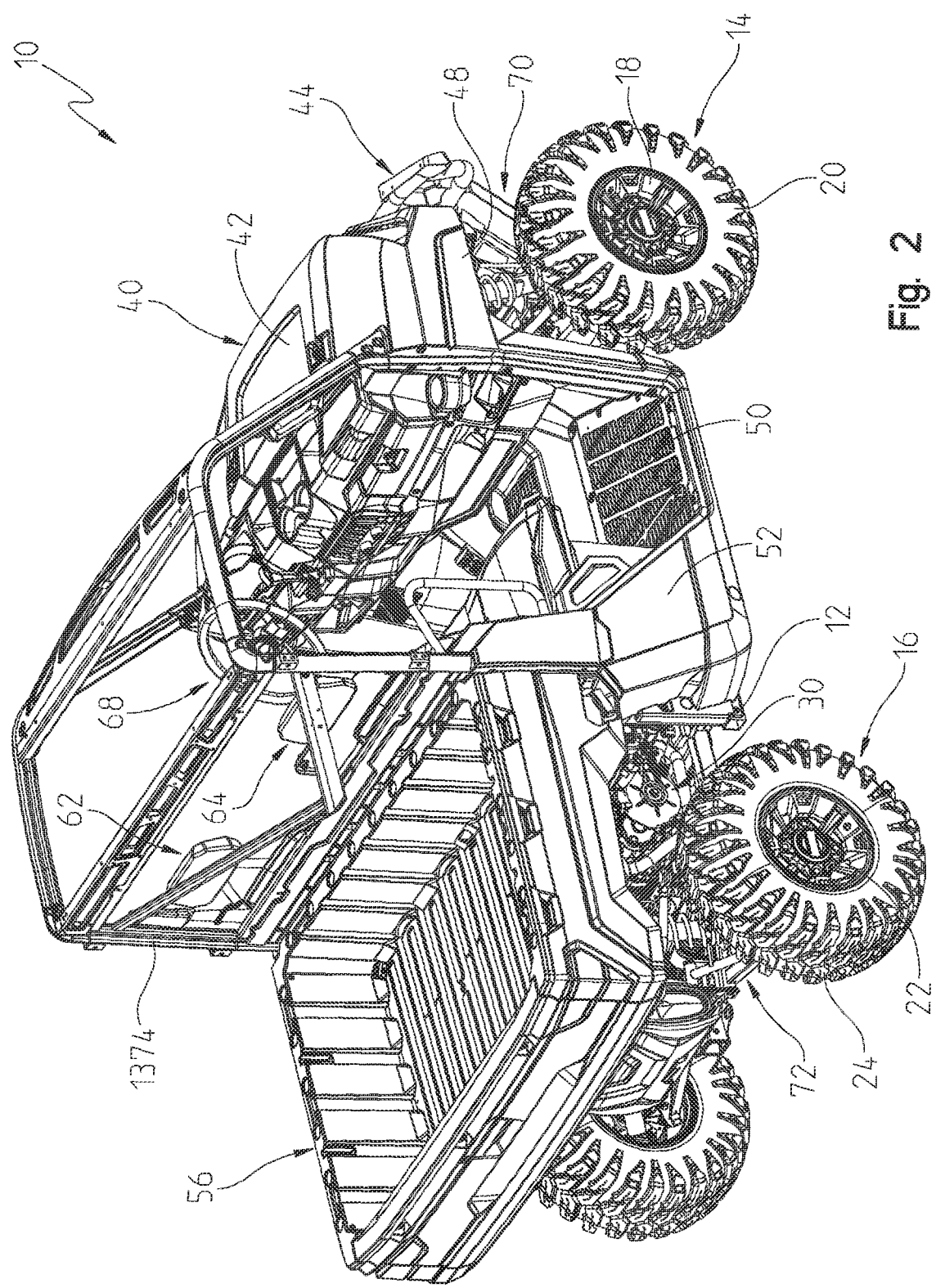
FIG. 2 shows a rear right perspective view of the vehicle of FIG. 1.

With reference first to FIGS. 1-2, the vehicle of the present disclosure will be described. The vehicle is shown generally at 10 and is commonly referred to as an all terrain vehicle (ATV), a side-by-side vehicle (SxS) or a utility vehicle. As shown, vehicle 10 generally comprises a frame 12 supported by ground engaging members 14 and 16. As shown in this disclosure, ground engaging members 14 and 16 are comprised of wheels 18 and tires 20; and wheels 22 and tires 24. Vehicle 10 further comprises a drive train 30 (FIG. 2) operatively connected to frame 12 and drivingly connected to one or more of the ground engaging members 14, 16. In the present disclosure, the drivetrain 30 is comprised of a fuel-burning engine 32 and transmission 34 combination, coupled to both of the front and rear ground engaging members 14, 16, as described in greater detail herein. However, any drivetrain could be contemplated such as hybrid, fuel cell or electric. The drivetrain 30 is more thoroughly described in our U.S. Pat. Nos. 8,973,693 and 8,997,908, as well as in pending patent application Publication Number 20120223500, the subject matter of which is incorporated herein by reference.

As shown in FIGS. 1-2, vehicle 10 further includes a body portion or chassis shown generally at 40 to include a hood 42, front fender 44, dash 46, sideboard 48, front floorboard 50, rear sideboard 52 and rear cargo area 56. As also shown, vehicle 10 is comprised of seating area 60, having a driver seat 62 and a passenger seat 64. Driver seat includes a seat back 62a and a seat bottom 62b, while passenger seat 64 includes a seat back 64a and a seat bottom 64b. Furthermore, vehicle 10 includes operator controls shown generally at 68, which includes controls for steering, acceleration and braking, as described further herein. Vehicle 10 also includes a front suspension 70 and a rear suspension 72. A cab frame 74 is positioned over the operator area and seats to project the driver and passengers.

Figure 3:
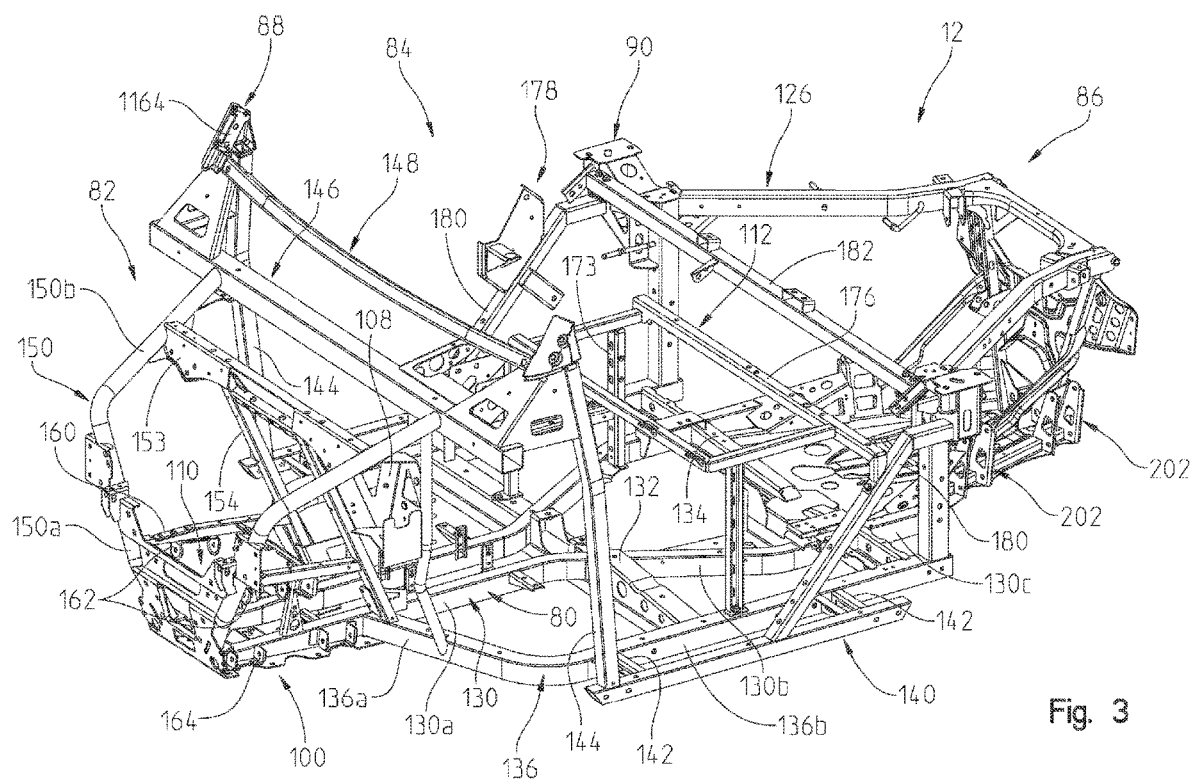
FIG. 3 shows a front left perspective view of a frame for use with the vehicle of FIG. 1.
Figure 4:
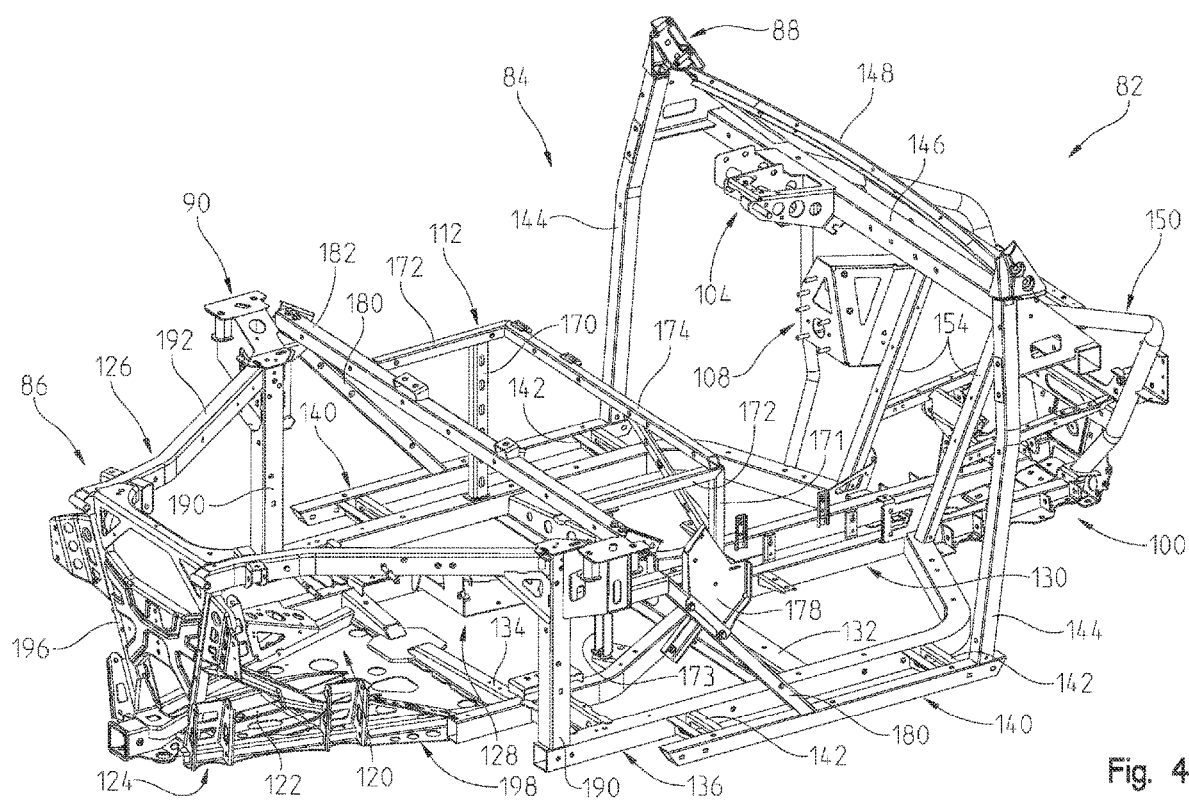
FIG. 4 shows a right rear perspective view of a frame for use with the vehicle of FIG. 1.

With respect now to FIGS. 3-4, frame 12 is generally comprised of a main frame section 80 extending longitudinally along the center line of the vehicle. Frame 12 also includes front frame section 82, mid frame section 84, rear frame section 86 and cab frame support section 88 and 90. Frame 12 provides mounting accessories for mounting various vehicle components. Front section 82 includes a front suspension mount 100, steering mount 104 (FIG. 4), brake cylinder mount 108 (FIG. 4), and front differential mount 110 (FIG. 3). Mid frame section 84 includes seating mount 112. Rear section 86 includes engine mount 120 (FIG. 4), rear final drive mount 122, rear suspension mount 124, rear cargo box support 126 and fuel tank support 128.

With reference still to FIGS. 3-4, frame 12 will be described in greater detail. As shown, main frame section 80 includes two longitudinally extending frame rails 130 having front sections 130A, with frame sections 130B which angle outwardly and rear sections 130C. Transverse sections 132 and 134 are coupled to the frame rails 130 and further couple to outer frame rails 136. Frame rails 136 include front portions 136A which couple to portions 130A of frame rails 130. Frame rails 136 further include longitudinally extending portion 136B which couples to the transverse portions 132 and 134. Another set of frame rails 140 are coupled to frame rails 136 by way of transverse channels 142. Vertical posts 144 extend upwardly from a front end of frame rails 140 and are coupled to transverse rails 146, 148. Cab frame support section 88 is coupled to a top of the vertical post 144. Front posts 150 have lower portions 150A coupled to rails 130A and rearwardly extending portions 150B which couple to transverse rail 146. A transverse rail 153 extends between rearwardly extending portions 150B while vertical posts 154 extend downwardly from rail 153 to frame rails 136. Frame tubes 160 are supported by posts 154 and posts 150 and include upper couplers 162 for the front suspension mount 100. Couplers 164 are also provided at a front end of the frame rail 130 which also provide couplers for front suspension mount 100.

With reference now to FIG. 4, seating mount 112 is shown including vertical posts 170, 171, 173 longitudinally extending rails 172, front transverse rail 174, and rear transverse rail 176 (FIG. 3). As shown in FIG. 4, bracket 178 is coupled to diagonal rail 180 for mounting of a passenger seat as described herein. Another horizontal rail 182 spans the frame 12 above seat frame 12.

Rear frame section 86 includes vertical posts 190 coupled to the rear end of frame rails 136 and support the rear cab frame support section 90. Rear cargo box mount support 126 includes rearwardly extending frame rails 192 which couple to vertical posts 196 and to rear plate 198. Rear suspension mount 124 is defined by channels 200, 202 (FIG. 3) which provide upper and lower coupling points for suspension arms.

Figure 5:
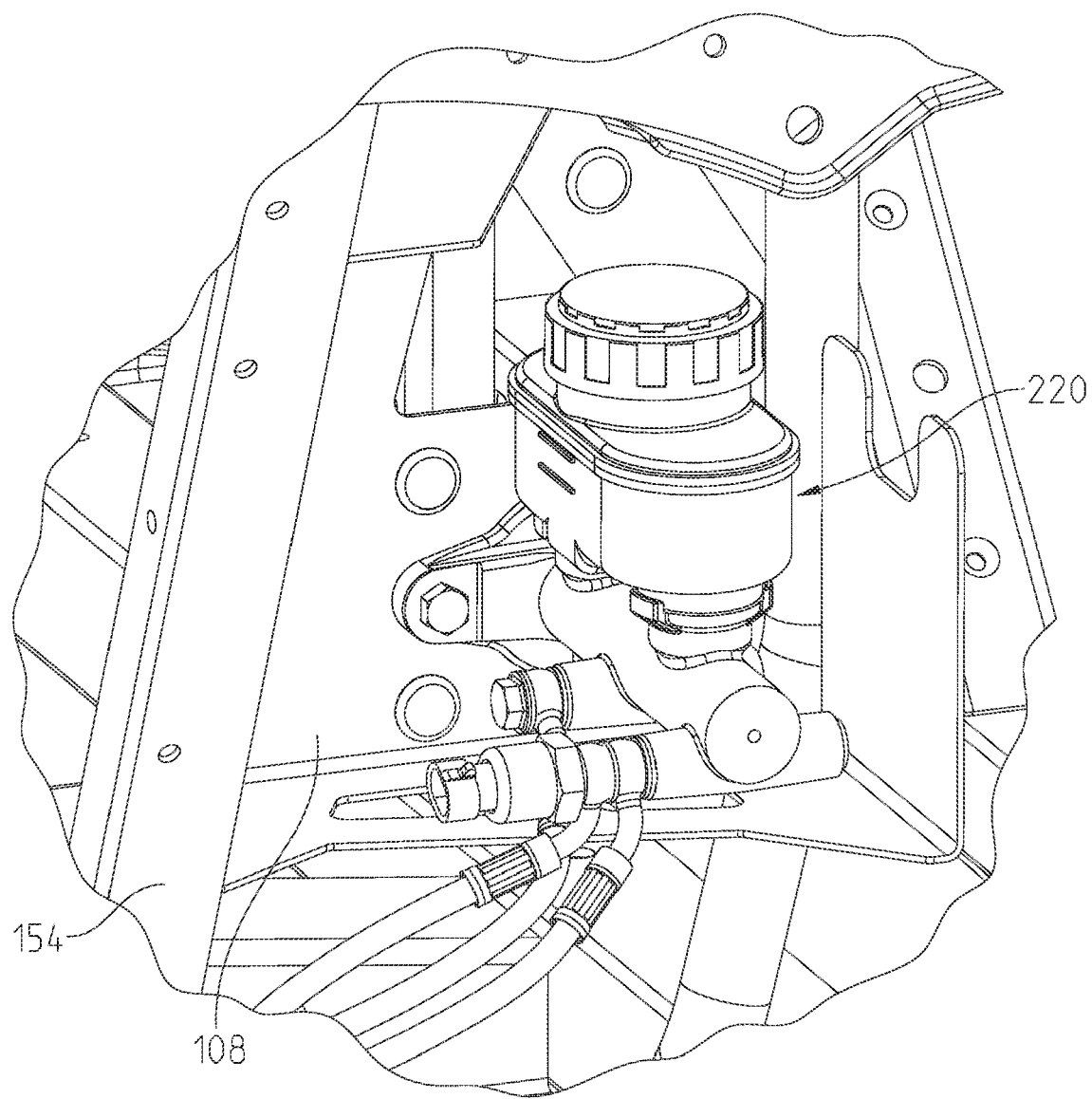
FIG. 5 is a right front perspective view of the brake master cylinder.
Figure 6:
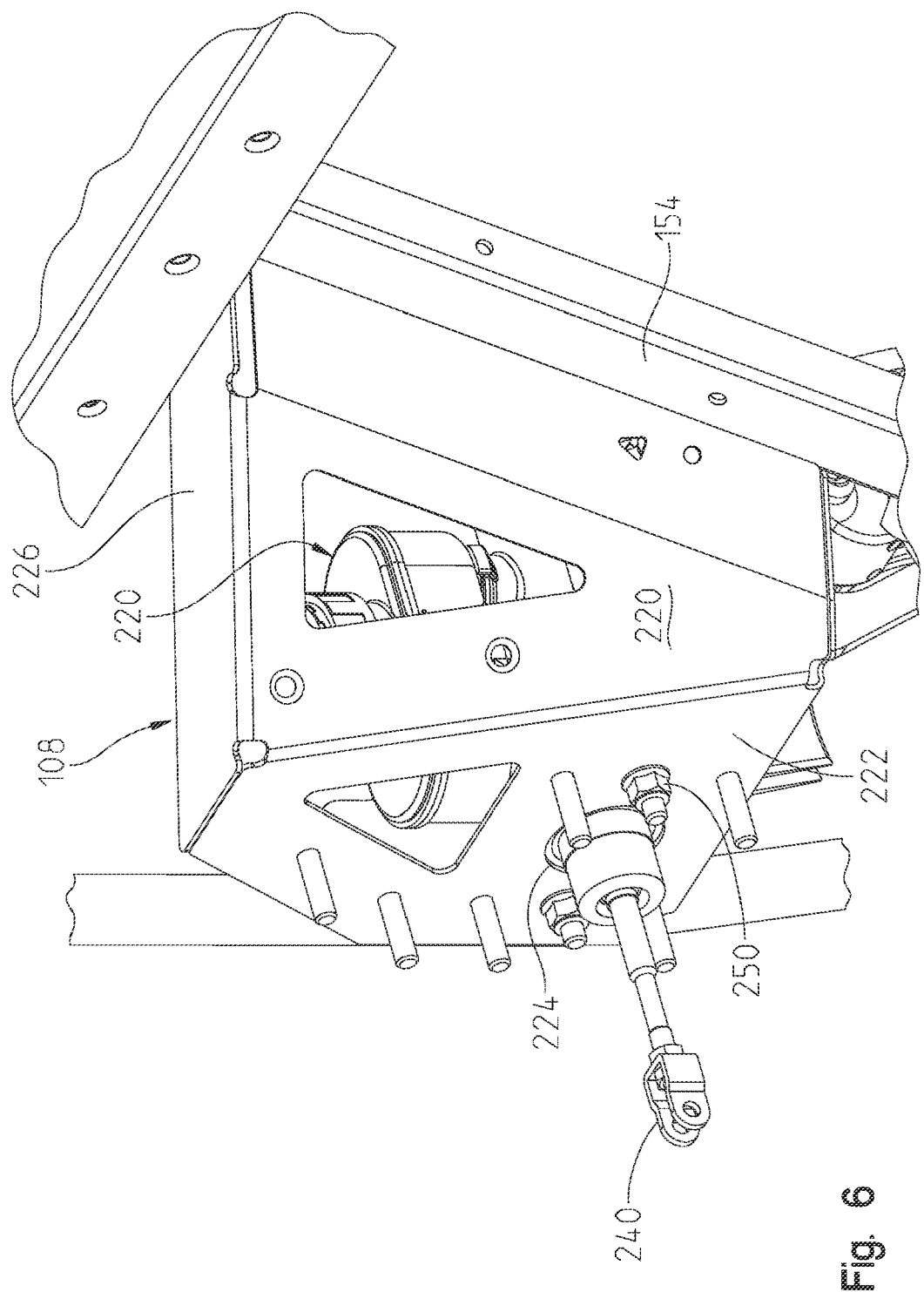
FIG. 6 is a rear right perspective view of the brake master cylinder of FIG. 5.
Figure 7:
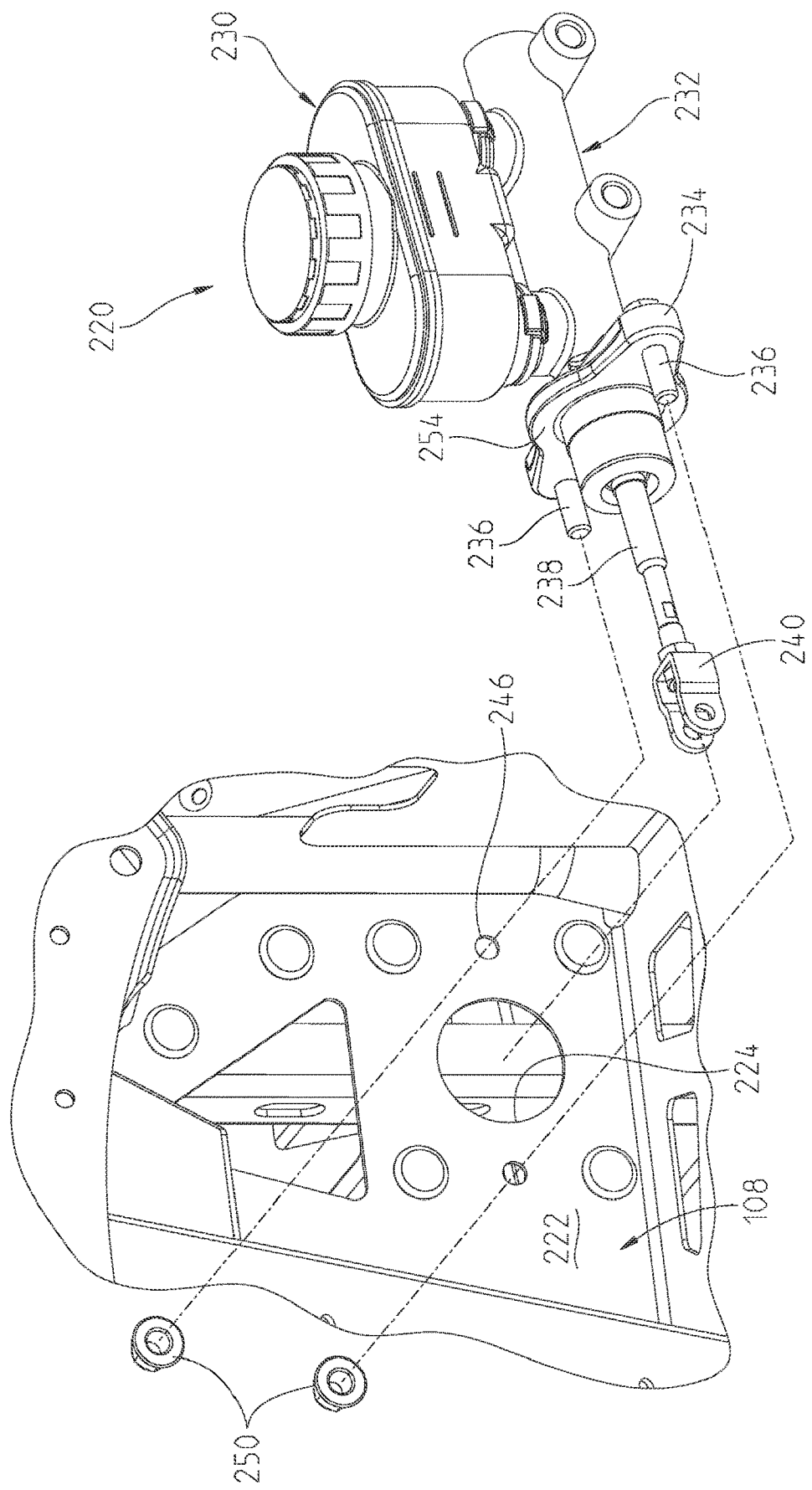
FIG. 7 is an exploded view of the brake master cylinder shown in FIG. 5.

With reference now to FIGS. 5-7, brake cylinder mount 108 and brake master cylinder 220 will be described in greater detail. As shown best in FIG. 6, mount 108 is coupled to vertical post 154 and includes sidewall 220, front plate 222 having an aperture at 224, and an upper wall at 226. As shown in FIG. 7, brake master cylinder 220 includes a reservoir 230 positioned above the brake cylinder body 232. A flange 234 is coupled to an end of the body 232 and has threaded members 236 positioned on either side. A push rod 238 protrudes from body 232 and has a clevis 240 at its end. As shown, clevis 240 and push rod 238 are positioned through aperture 224 and threaded members 236 protrude through apertures 246 of plate 222 where fasteners 250 (FIG. 6) couple master cylinder 220 to the brake mount 108. A seal 254 (FIG. 7) is positioned on a front side of plate 222 (FIG. 6). Clevis 240 would be coupled to brake actuator to actuate the master cylinder and thereby the brakes at wheels 14, 16.

Figure 8:
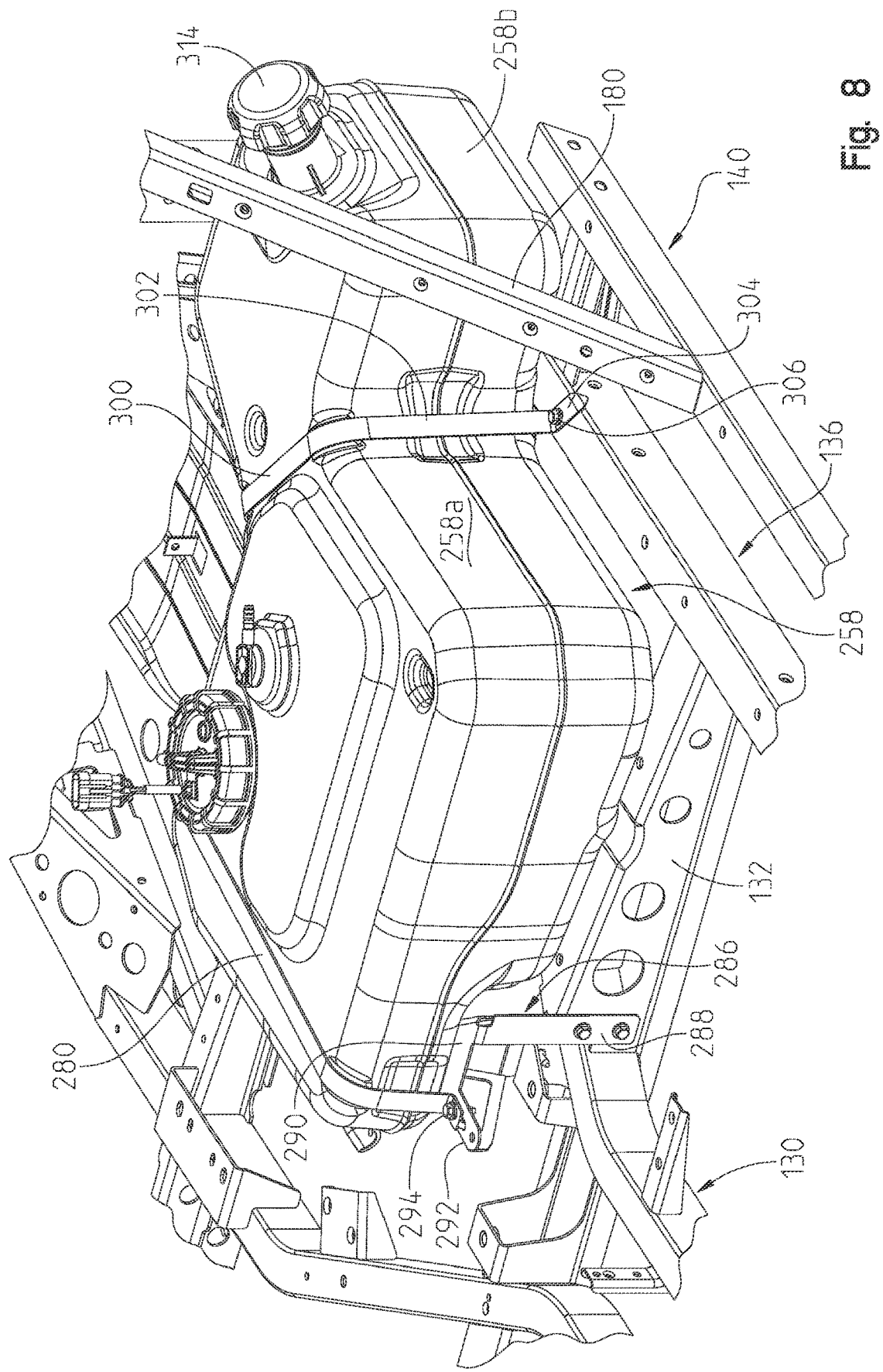
FIG. 8 is a front left perspective view of the fuel tank coupled to the frame.
Figure 10:
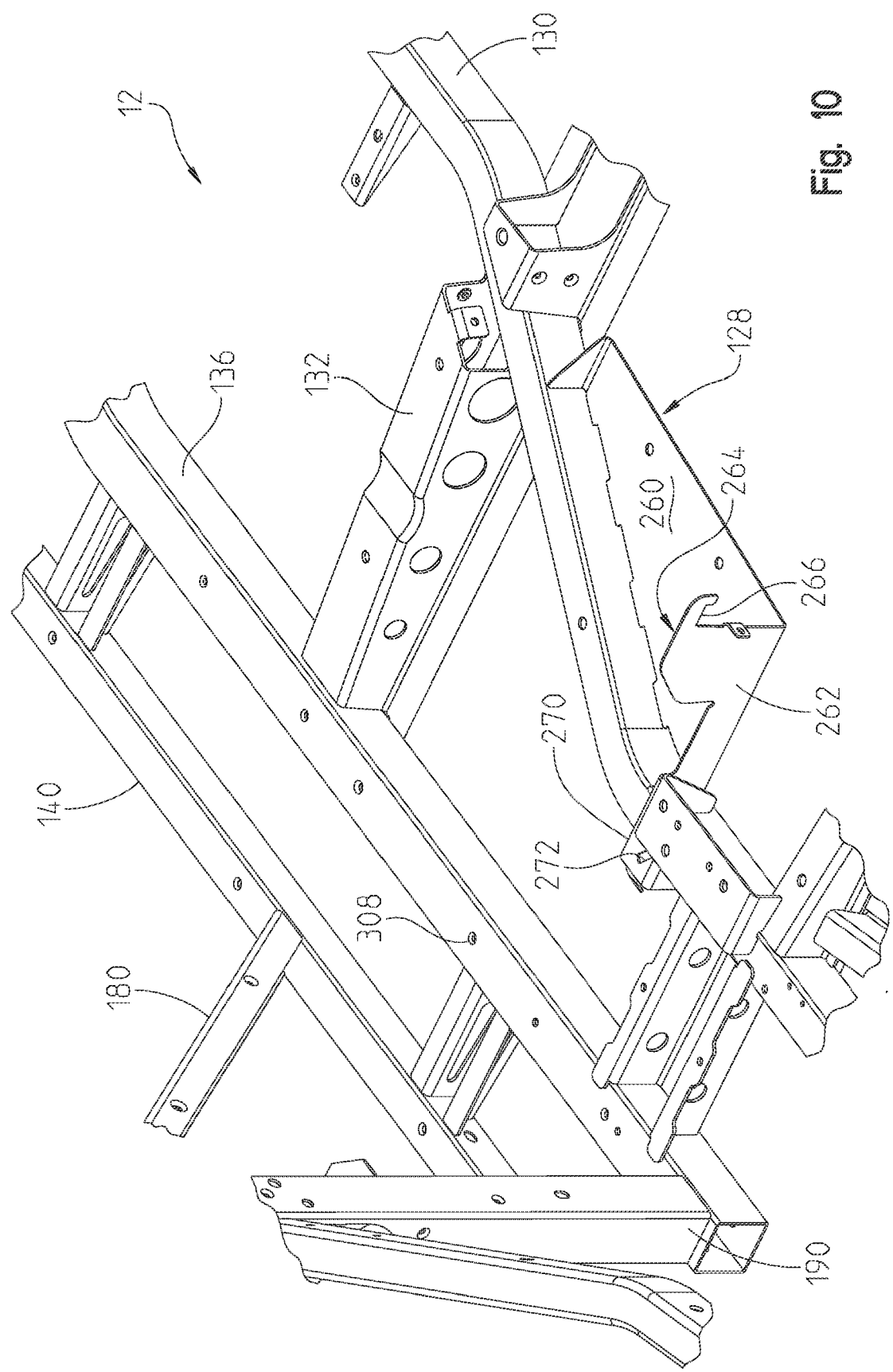
FIG. 10 is a view similar to that of FIG. 8 showing the fuel tank removed.
Figure 9:
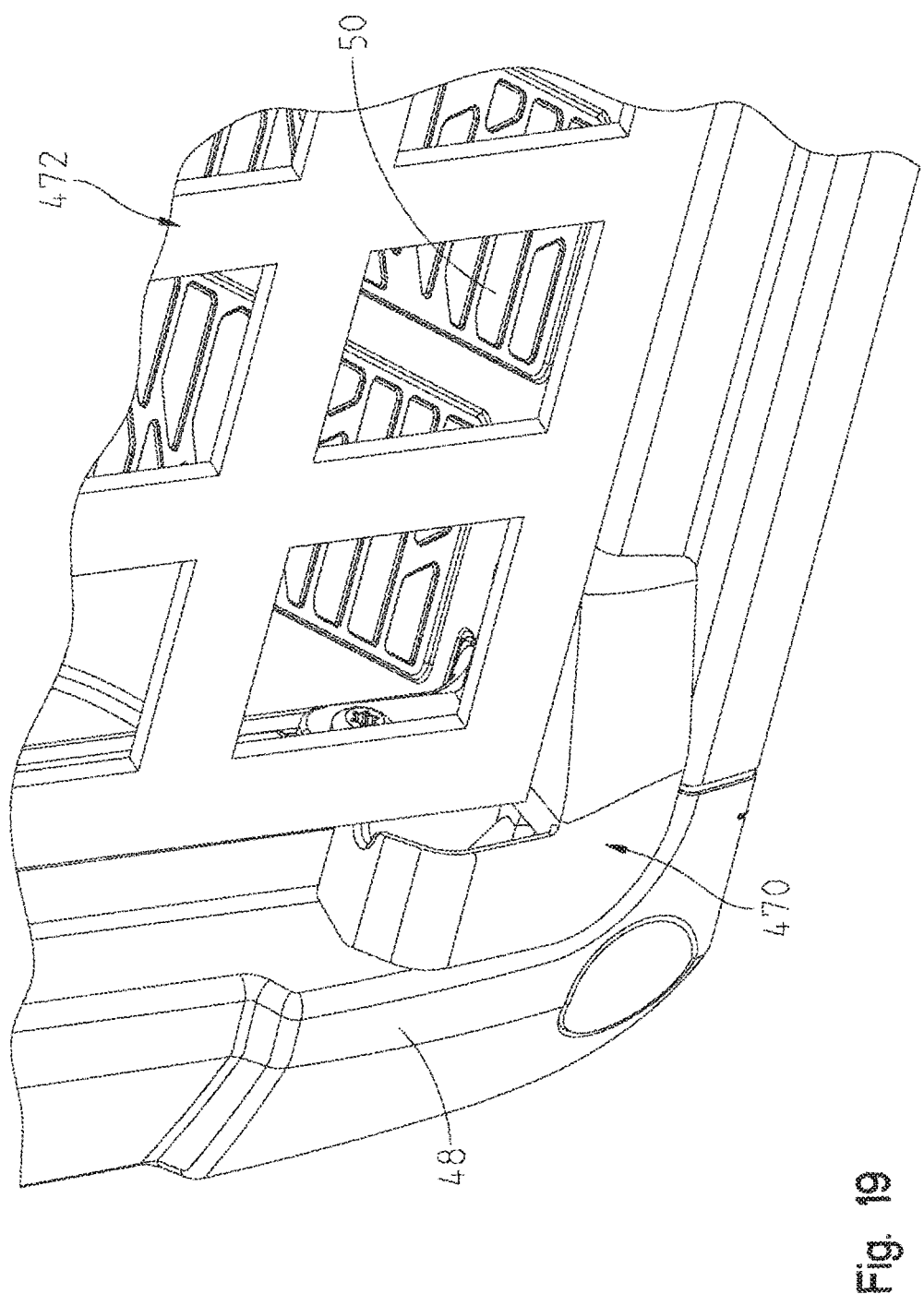
FIG. 9 is a rear right perspective view of the fuel tank of FIG. 8.

With reference now to FIGS. 8-10, a fuel tank 258 is shown coupled to fuel tank mount 128. As shown best in FIG. 10, fuel tank mount 128 includes a plate portion 260 coupled to a bottom of frame rail 130. Mount 128 includes a rear wall 262 having an extension at 264 forming a groove at 266. Wall 262 includes an extension at 270 defining a slot at 272. As shown in FIG. 9, fuel tank 258 is coupled to frame 12 by way of a strap 280 having a hook 282 coupled to groove 266 (FIG. 9) at a first end and to a bracket 286 at a front end (FIG. 8). Bracket 286 has a vertical leg 288 coupled to transverse rail 132 and a horizontal arm 290 having a tab at 292. A fastener 294 couples strap 280 around the fuel tank and to the frame. As shown in FIGS. 8 and 9, strap 300 is also coupled around fuel tank 260. As shown in FIG. 8, strap 300 includes a strap portion 302 having a tab 304 coupled to rail 136 by way of a fastener 306 positioned in aperture 308 (FIG. 10). As shown in FIG. 9, strap 300 includes a portion 310 having a T-shaped coupler 312 positioned in slot 272 (FIG. 10).

As shown best in FIG. 8, fuel tank 258 includes a front tank portion 258A and a rear tank portion 258B. As shown, portion 258A extends to a position proximate frame rail 136 whereas portion 258B is rearward of diagonal brace 180 and extends outward to a position adjacent to longitudinal rail 140. As also shown in FIG. 8, fuel tank 258 includes a filler cap 314 such that filler cap 314 is accessible through side panel 52 (FIG. 1) while fuel tank portion 258A is substantially under seat 62.

Figure 11:
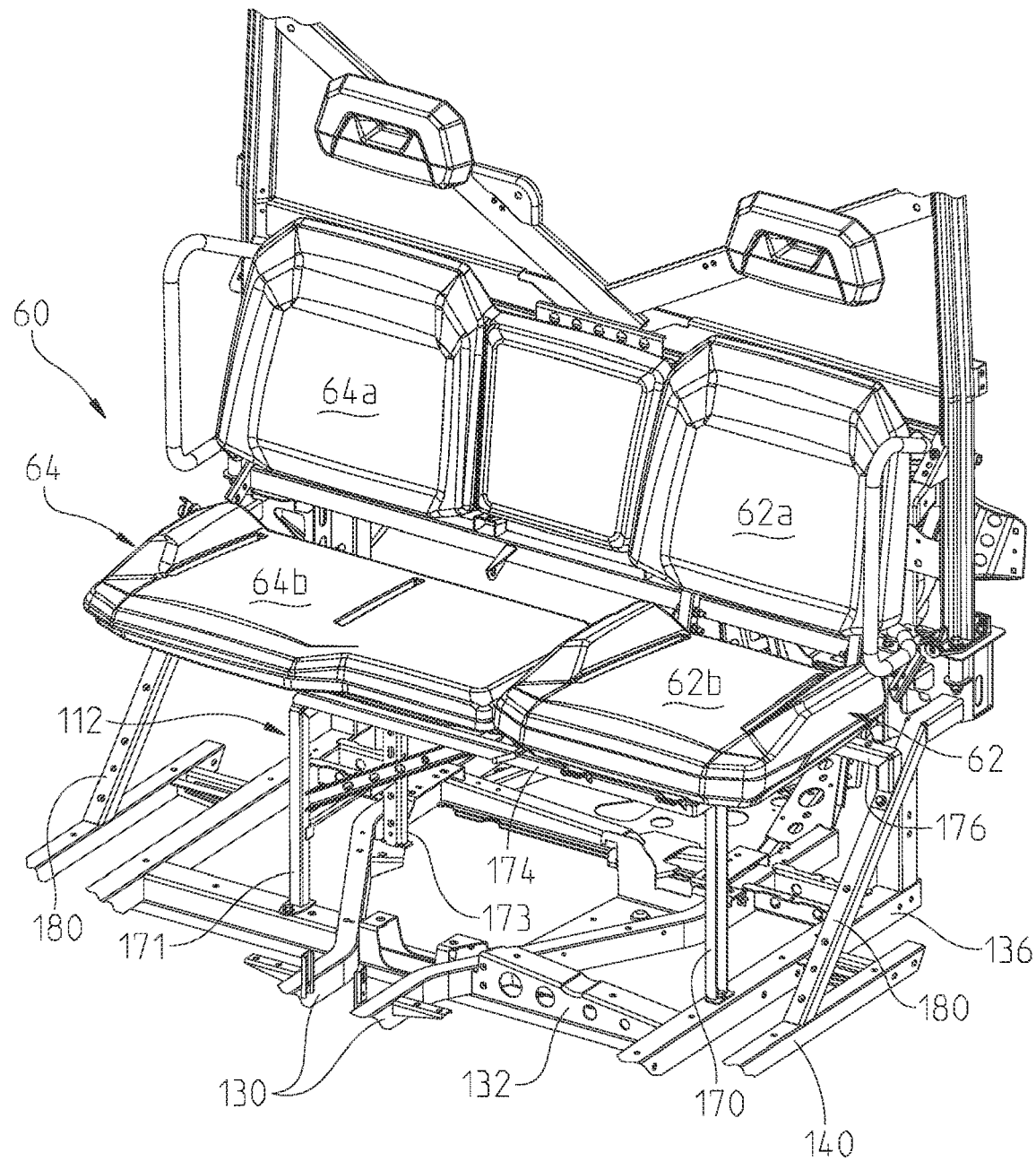
FIG. 11 is a front left perspective view of the seating area including the driver's seat and passenger seats.
Figure 12:
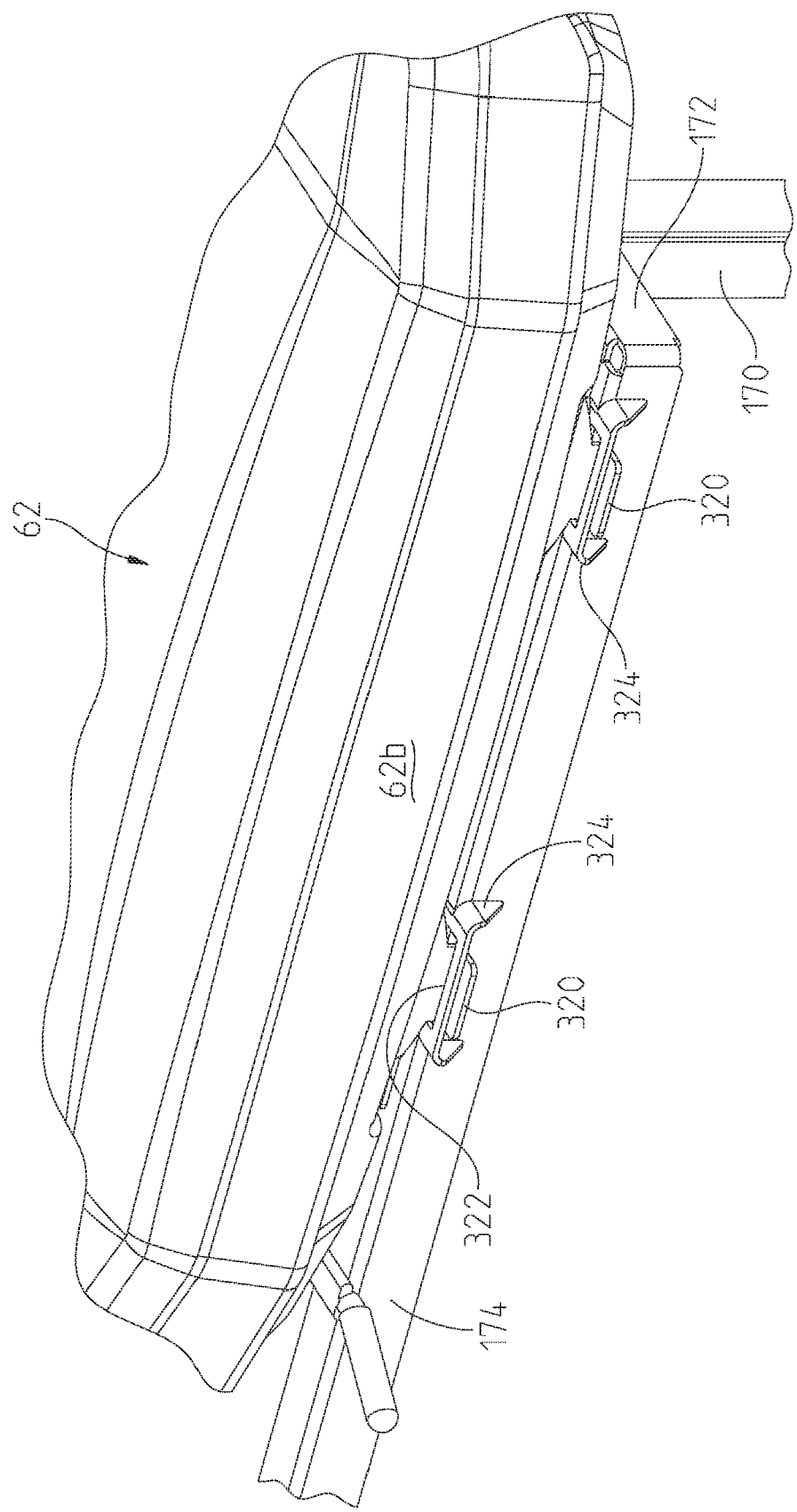
FIG. 12 is an enlarged view of the latching arrangement for the front edge of the driver's seat.

With reference now to FIGS. 11-16, the seating area 60 will be described in greater detail. With reference first to FIG. 11, the driver's seat 62 and passenger seat 64 is shown coupled to the seat mount 112. Driver seat 62 is separate from passenger seat 64 and may be removed independently of passenger seat 64. As shown in FIG. 12, seat bottom 62B includes latch fingers 320 at a front edge thereof which correspond with openings 322 of latches 324. Seat 62 may be removed by unlatching a rear latch (not shown) and rotating the seat forward to remove the latch fingers 320 from the associated openings 322.

Figure 13:
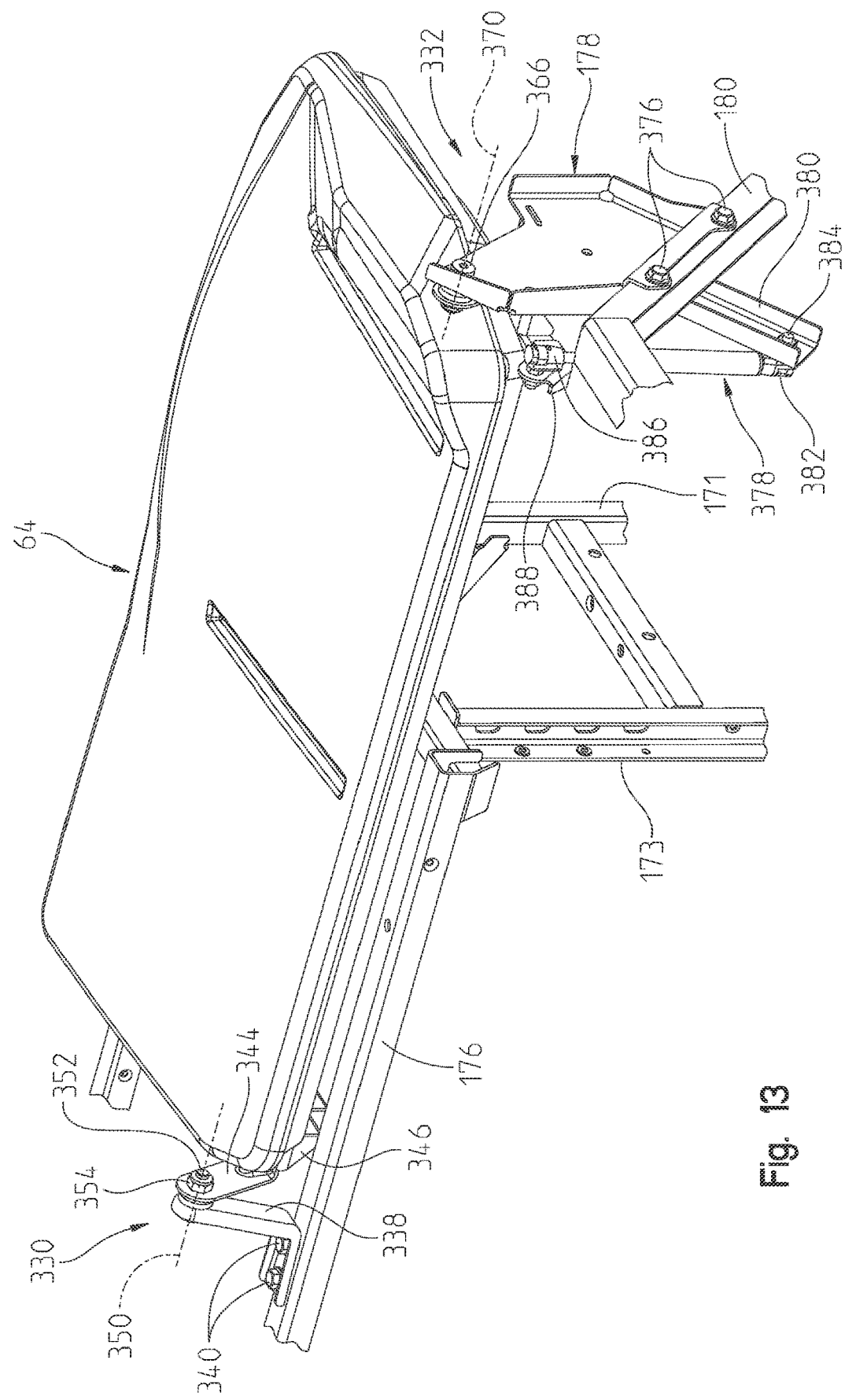
FIG. 13 is a right rear view of the bench portion of the passenger seats and the linkage.
Figure 14:
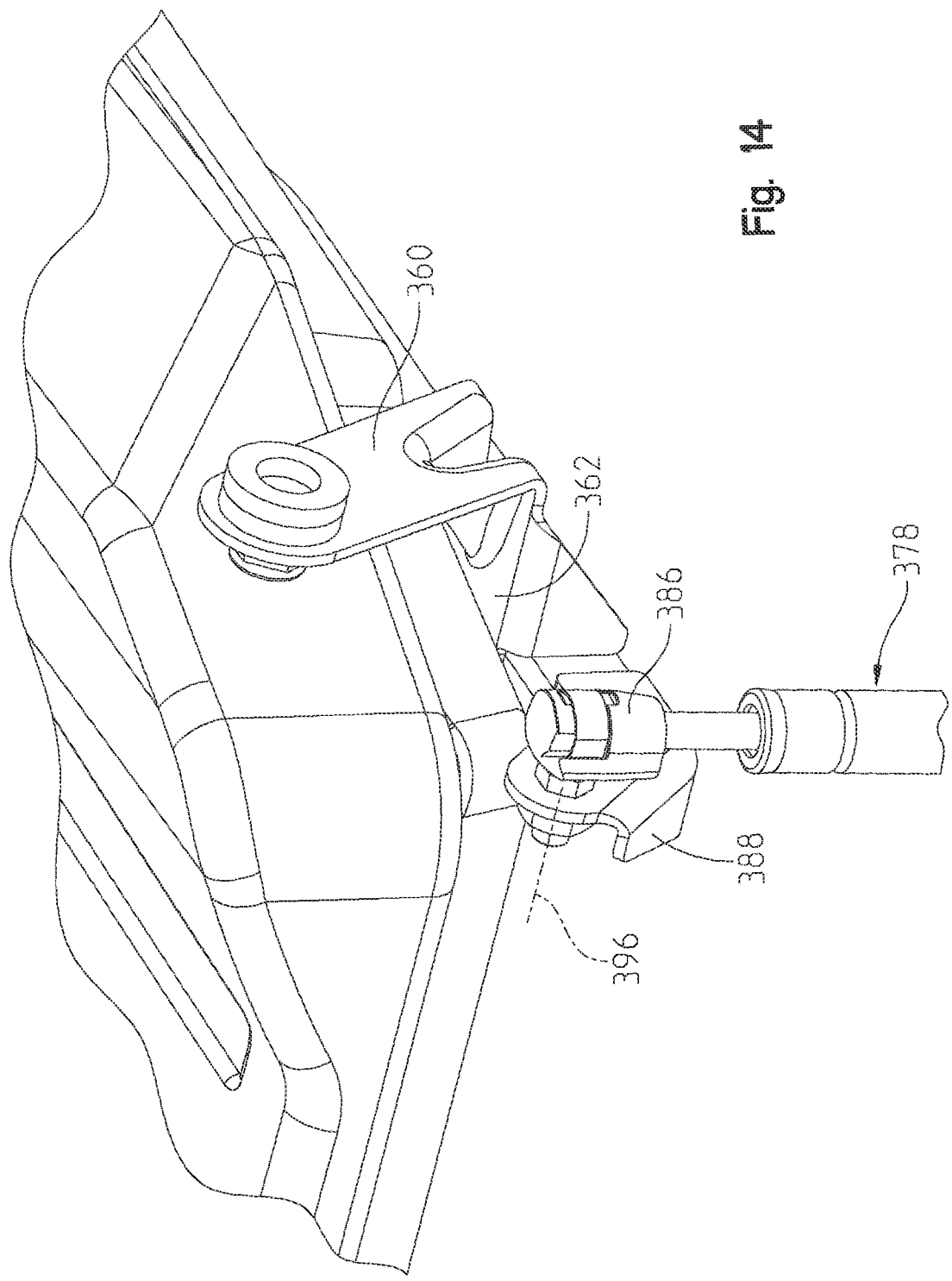
FIG. 14 is an enlarged side view of the seat shown in FIG. 13 with the bracket removed for clarity.

With reference now to FIG. 13, bench portion 64 is coupled to rear rail 176 by way of a first linkage 330 and a second linkage 332. Linkage 330 includes a first fixed bracket 338 coupled to rail 176 by way of fasteners 340. Linkage 330 further includes a link arm 344 coupled to seat frame 346 and pivotally coupled about axis 350 by way of fasteners 352 and 354. With reference to FIGS. 13 and 14, linkage 332 also includes a link arm 360 coupled to seat frame portion 362 where link arm 360 is the counterpart to link arm 344. Link arm 360 is coupled to bracket 178 by way of a fastener 366 such that link arm 360 pivots about axis 370. As shown in FIG. 13, axes 350 and 370 are coaxial. As shown in FIG. 13, bracket 178 is coupled to rail 180 by way of fasteners 376. A gas shock 378 is coupled to a channel 380 which in turn is coupled to rail 180 where gas shock 378 may be extended by lifting the seat from the front thereof. As shown in FIG. 13, gas shock is in the collapsed position. Gas shock 378 includes a lower portion 382 coupled to bracket 380 by way of fasteners at 384. Gas shock includes an upper end at 386 which is coupled to a bracket 388 which in turn couples to seat frame 362.

Figure 15:
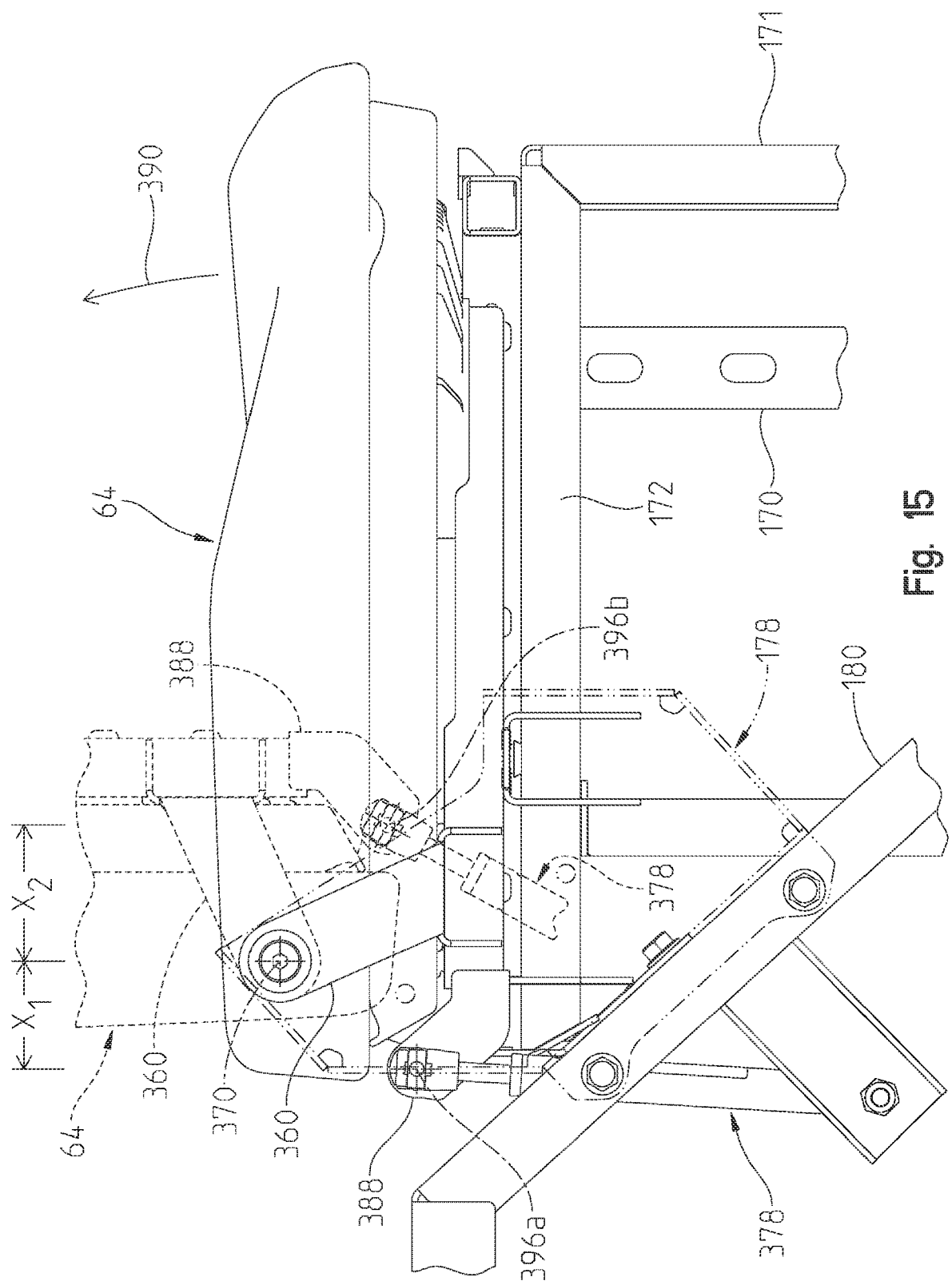
FIG. 15 is a right side view of the bench seat in the down position whereas the bench seat is shown in phantom in the up position.

With reference now to FIG. 15, bench seat portion 64 is shown in solid line where the bench is in the down position, and when bench seat rotates in the direction of arrow 390, bracket 360 rotates upward to the position shown in phantom line about axis 370 and gas shock 378 moves from the position shown in solid line to an extended position shown in phantom. Due to the offset between axis 370 and axis 396b that is, distance $X_2$, a moment is created on the seat bottom 64 and the gas shock holds the bench portion 64 of passenger seat in the up position (phantom position of FIG. 15). When the seat bottom 64b is in the down position, axis 396a is rearward of axis 370 by a distance $X_1$.

Figure 16:
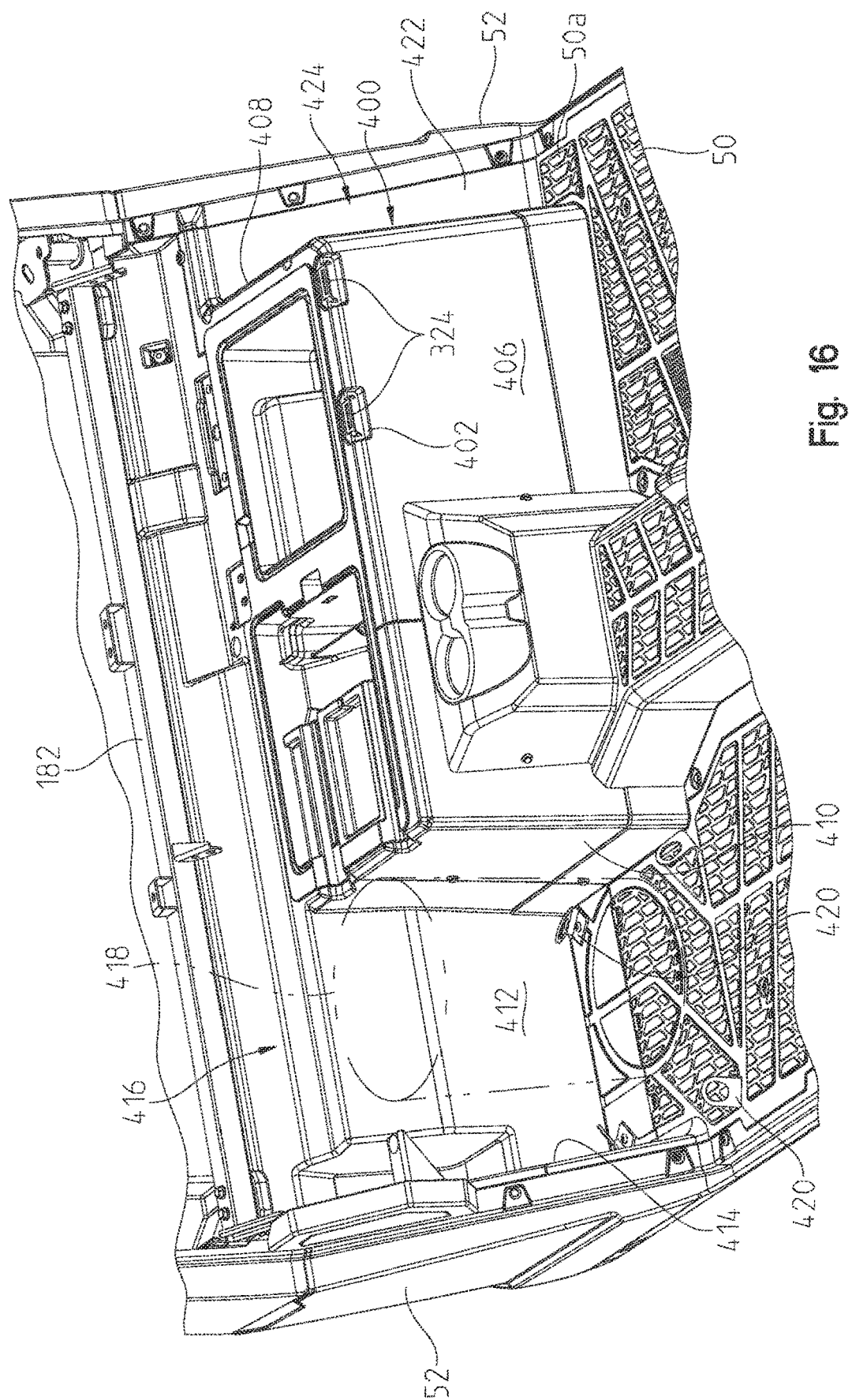
FIG. 16 is a right front view of the seat pedestal for the driver and passenger seat of FIG. 16.

With reference now to FIG. 16, a pedestal portion 400 is shown which overlies the seat mount 128 including the vertical posts 170, 171 and 173, as well as horizontal rails 174 and 176. Seats 62 and 64 are shown removed yet the latches 324 for driver seat 62 are shown exposed through cutouts 402 of the pedestal portion 400. Pedestal portion 400 includes a front wall 406, left sidewall 408 and a right sidewall 410. Right sidewall 410 extends rearwardly to a back wall 412 and an inner side panel 414 covers diagonal brace 180 and extends to the back wall 412. As the passenger seat 64 cantilevers the seat mount 112 (FIG. 11), bench seat 64B extends beyond sidewall 410 defining a space 416 under passenger seat 64. This provides enough space for a 5 gallon bucket 418 to be placed in the space 416 and tie downs 420 are provided in the space to allow bungee cords and the like to be used to retain objects under the seat.

Figure 17:
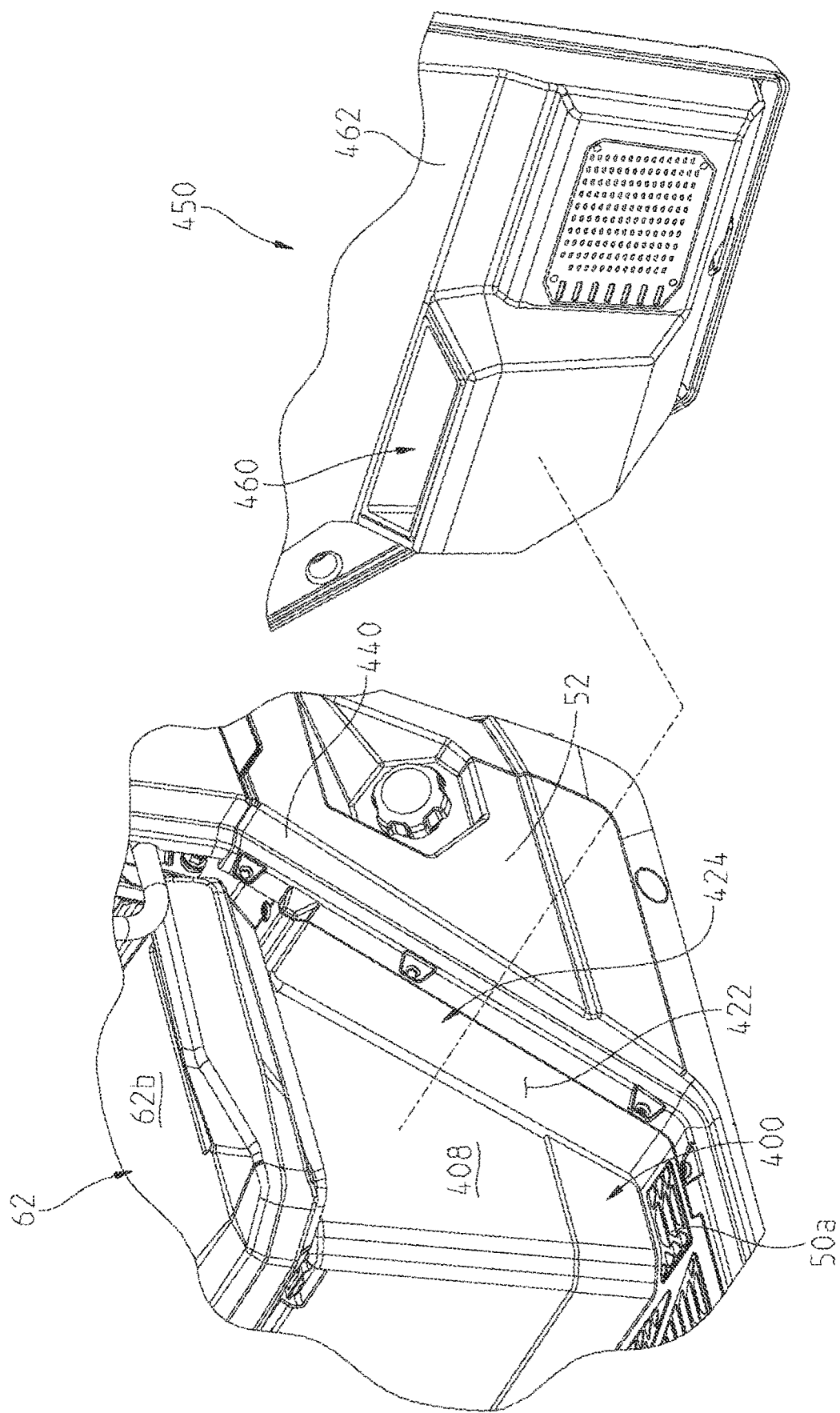
FIG. 17 is an enlarged perspective view from the left side of the vehicle with a driver door exploded in open position.

In a like manner, on the left-hand side and as shown in FIG. 17, a rear diagonal panel 422 is provided which extends to sidewall 408 and also covers diagonal brace 108 on the left hand side (FIG. 11). This defines a space 424 between sidewall 408 and outer side panel 52 of the vehicle. Space 424 provides more floorboard space adjacent to pedestal, that is floorboard space 50A, as shown in FIG. 16 which allows more room for an operator's feet for ingress and egress. Space 424 also provides access space when a door is provided.

Figure 18:
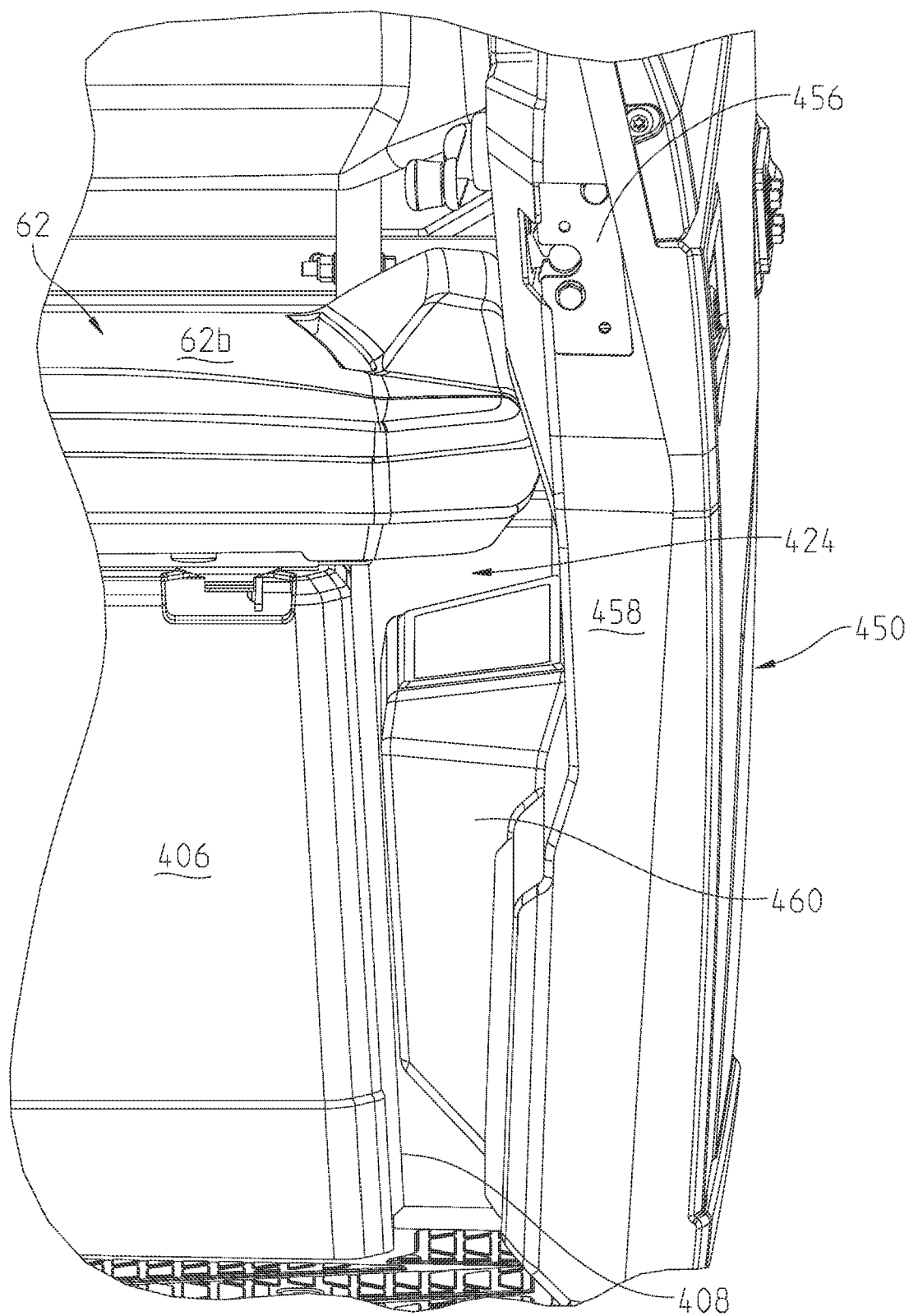
FIG. 18 is a perspective view of the driver's seat with the door closed.

With reference now to FIGS. 17 and 18, an optional door 450 is shown, which may be hingedly attached to vehicle 10 in a manner similar to that shown in U.S. Pat. Nos. 8,973,693 and 8,997,908; the subject matter which is disclosed herein by reference. Door 450 would be hingedly attached along a rear edge 440 and latch at a front edge of door 450. FIG. 18 shows latch 456 positioned along a front edge 458 of door 450. Door 450 includes a storage container 460 integrally defined with an inner side panel 462 of door 450 such that upon closing of the door, storage container 460 is profiled to occupy the space 424 defined beneath the seat bottom 62B and outwardly of the pedestal sidewall 408.

Figure 20:
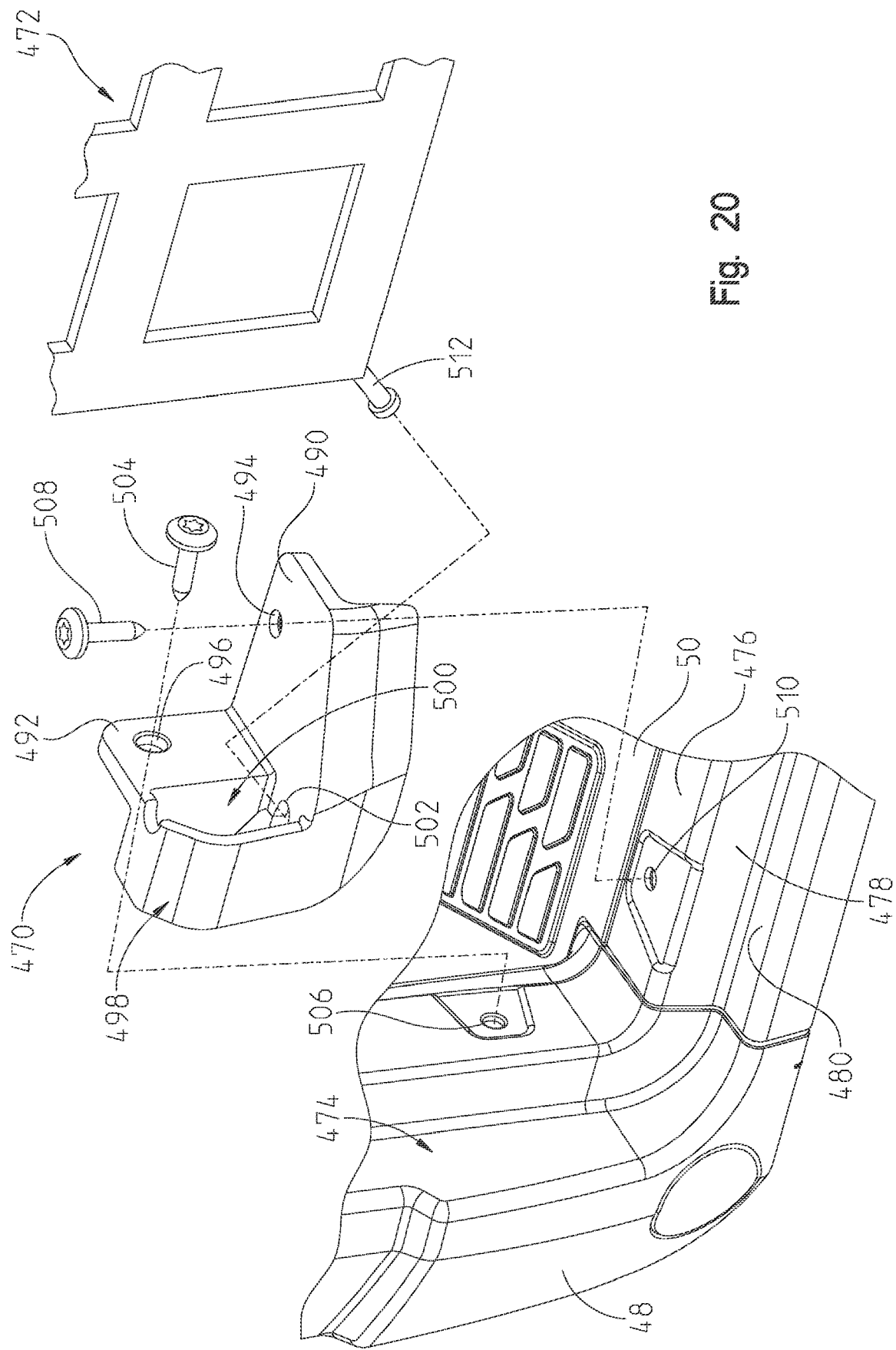
FIG. 20 is an exploded view of the net attachment mechanism of FIG. 19.

With reference now to FIGS. 19 and 20, a clip 470 is shown for use when a side net 472 is used rather than door 450. The profile of the opening surrounding the floorboard 50 is similar to that described in our U.S. Pat. Nos. 8,973,693 and 8,997,908 and U.S. Publication 2012/0223500, the subject matter of which is incorporated herein by reference. Side panels 48 and 52 (FIG. 1) define a recess 474 surrounding the opening defining panel surfaces 476, 478 and 480. Clip 470 includes planar wall portions 490 and 492 having apertures 494 and 496. A body portion 498 is provided having an opening at 500 defining a locking slot at 502. Clip 470 may be retained in the recess 474 by way of a fastener 504 extending through aperture 496 and into threaded aperture 506 and by way of fastener 508 extending through aperture 494 into threaded aperture 510. Thus the body portion 498 resides within the recess surrounding the opening rather than occupying space in the opening. Net 472 includes a locking lug 512 which would correspond with locking slot 502 to retain the net in position.

Figure 21:
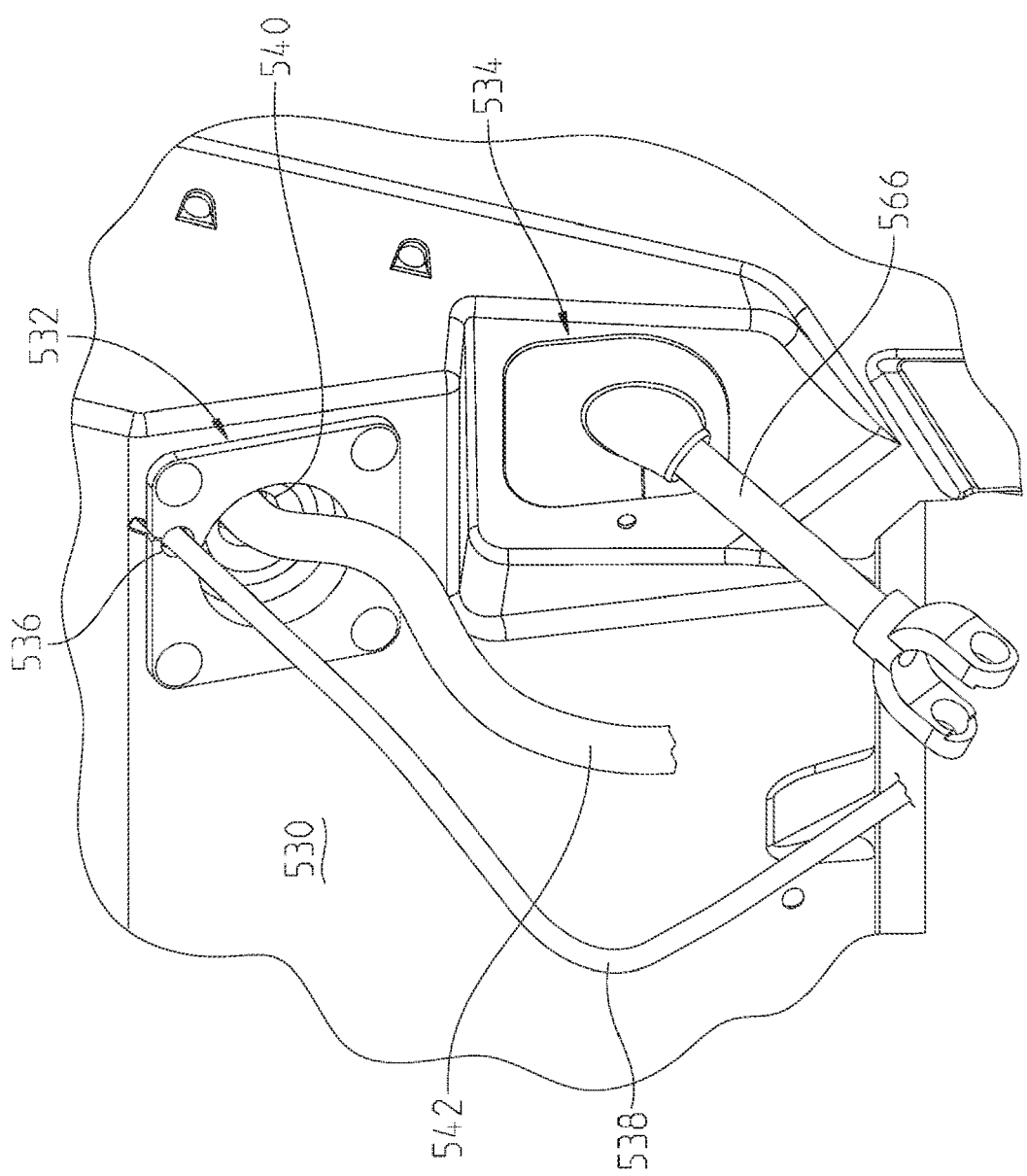
FIG. 21 is a fragmentary view of the sealed panel forward of the operator's compartment.
Figure 22:
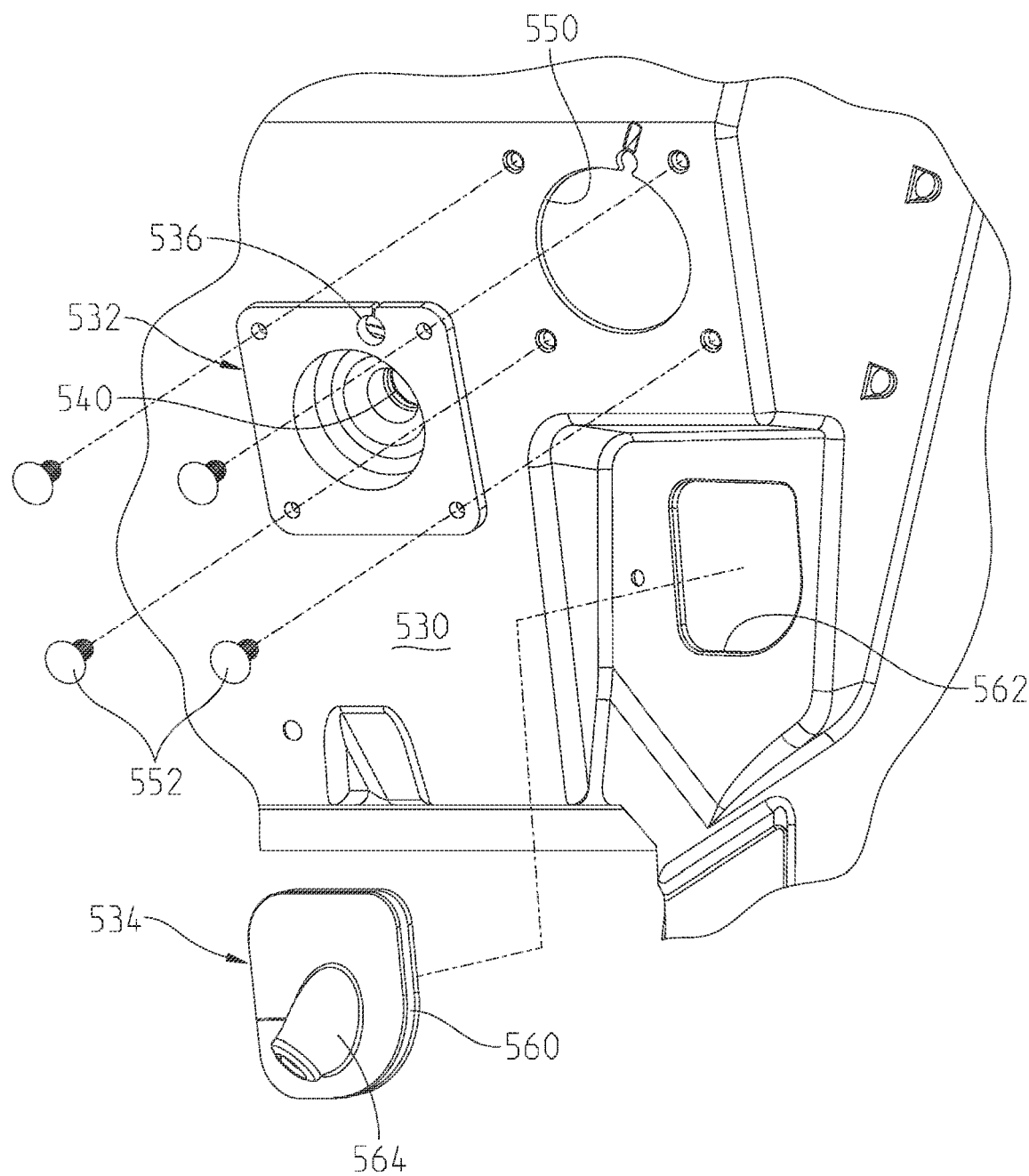
FIG. 22 is an exploded view of the view showed in FIG. 21.

With respect now to FIGS. 21 and 22, the operator's compartment has also been improved from the standpoint of NVH (noise, vibration, and harshness). As shown in FIG. 21, a wall 530 is shown which is under the dash 46 although inside the compartment under the hood 42. As shown, multiple entry points into the operator's compartment have been sealed such as by grommets 532 and 534. As shown, grommet 532 includes an aperture 536 to allow sealed access to shift cable 538, and a second aperture 540 for sealed access to a wire harness 542. As shown in FIG. 22, grommet 532 overlies an aperture 550 where fastener tabs 552 couple the grommet to the panel 530. Grommet 534 includes a peripheral groove 560, as shown in FIG. 22, which overlaps an opening 562 in panel 530. Grommet 560 also includes a sealing boot 564 to allow access to steering shaft 566 such that dust and noise is prevented from entering the operator's compartment through panel 530. It should be understood that multiple access points may be sealed in similar manners by grommets or other sealing members.

Figure 23:
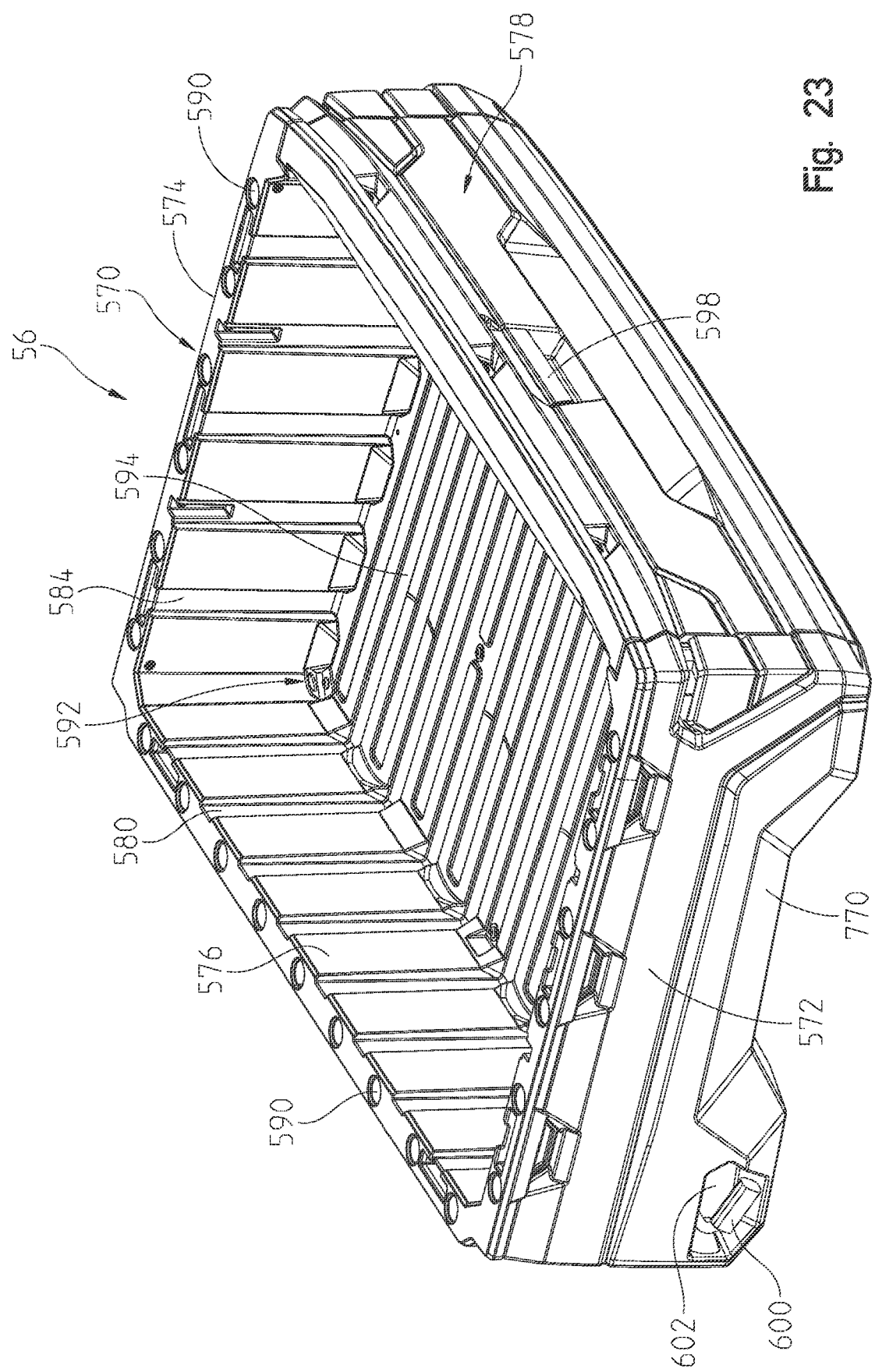
FIG. 23 is a left rear view of the vehicle cargo area.
Figure 24:
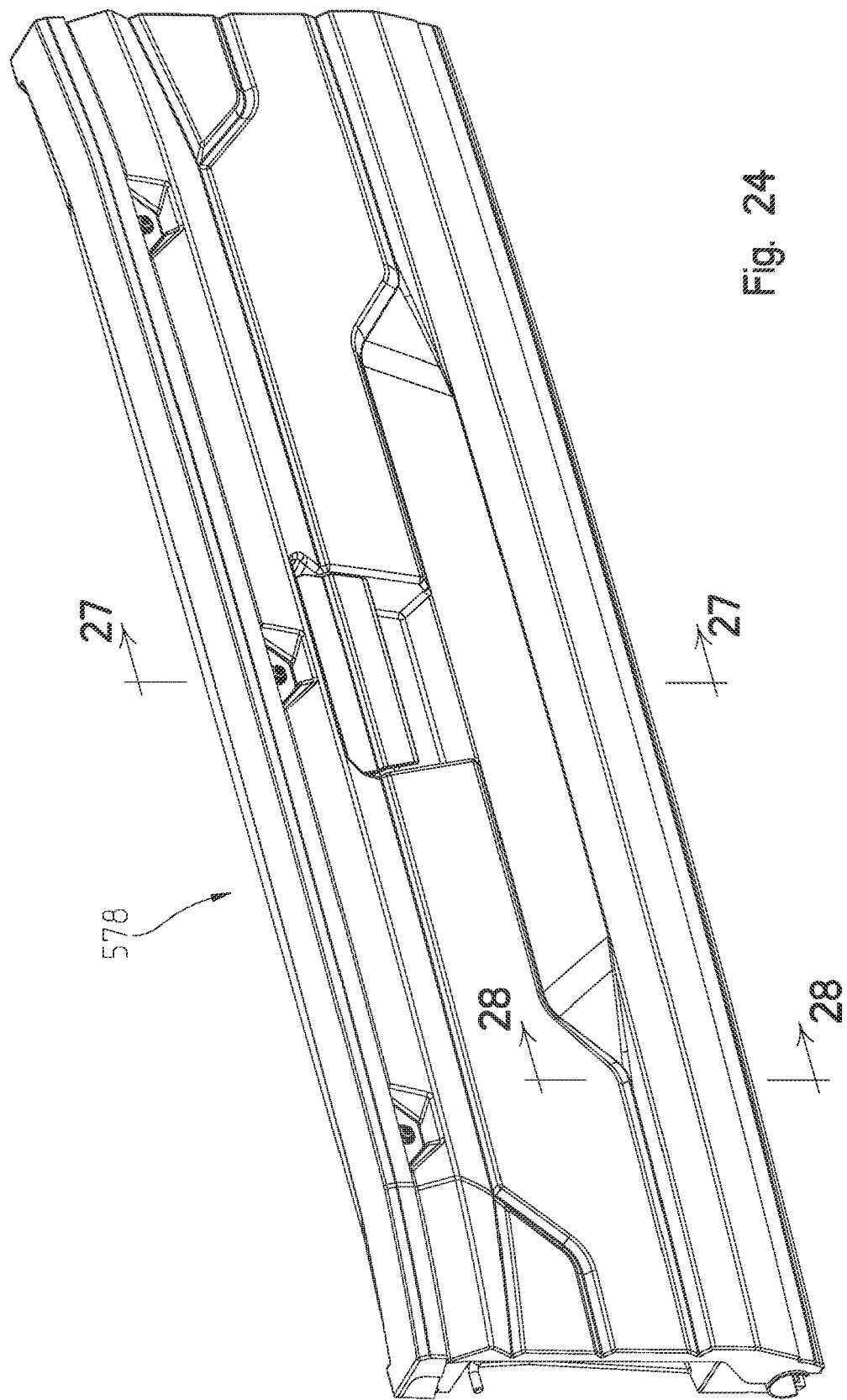
FIG. 24 is a prospective view of the tailgate of the cargo area shown in FIG. 23.

With reference now to FIGS. 23-35, rear cargo area 56 will be described in greater detail. As shown in FIG. 23, rear cargo area 56 includes a dump box 570 having a left sidewall 572, a right sidewall 574, a front wall 576, and a tailgate 578. The inside of front wall 576 includes notches 580 which would cooperate with notches 582 on the tailgate (FIG. 1) for the placement of dividers such as 2"×8" or 2"×10" wooden pieces, and sidewalls 572 and 574 include complementary notches 584 for also subdividing the dump box 570. Top edges of the sidewalls 572, 574 and front wall 576 include apertures 590 for use with applicant's LOCK & RIDE® retention system, which is the subject of U.S. Pat. No. 9,366,280, the subject matter of which is incorporated herein by reference. Dump box 570 also includes tie downs 592 which extend through the floor 594 for use with such items as bungee cords. On the back side of tailgate 578 cup holders 596 (FIG. 1) are defined for use when the tailgate is in the down position. Tailgate 578 also includes a tailgate latch 598 for unlatching the tailgate 578 relative to the remaining portions of the dump box 570. Furthermore, dump box 570 includes a latch release handle 600 which allows the dump box 570 to be released from a latching system and rotated relative to the remainder of the vehicle as is known in the art. Handle 600 is positioned in a recess 602 of sidewall 572. With reference now to FIGS. 25-28, tailgate 578 will be described in greater detail.

Figure 25:
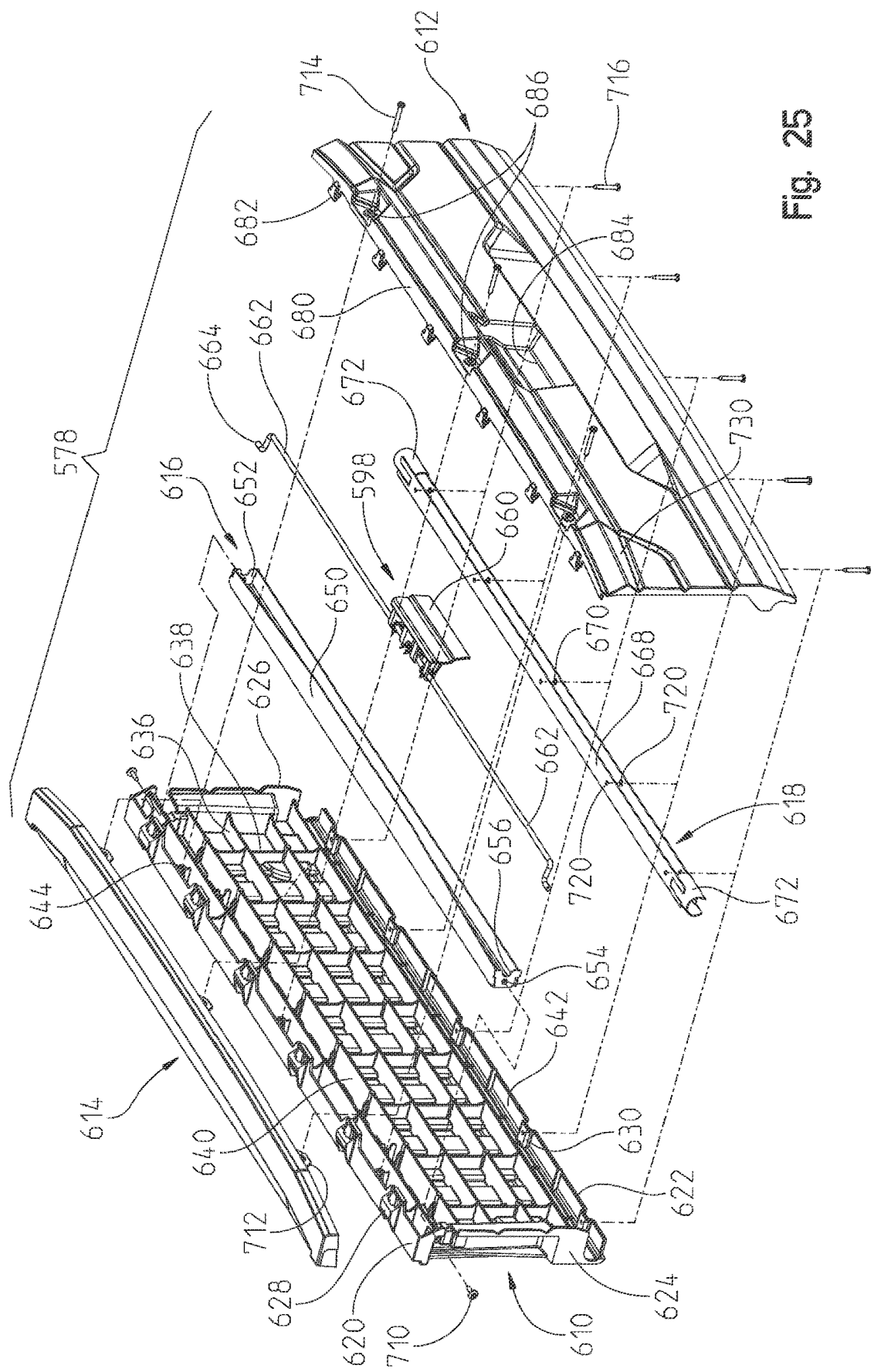
FIG. 25 is an exploded view of the tailgate shown in FIG. 24.

As shown in FIG. 25, tailgate 578 is generally comprised of front panel 610, rear panel 612, top panel 614, upper rail 616, lower rail 618, and latch 598. With reference to FIG. 25, front panel 610 includes an upper wall 620, a lower wall 622, sidewall 624, and opposite sidewall 626. Top wall 620 includes locking latches 628 spaced apart along top wall 620. Lower wall 622 includes a plurality of tabs 630 also spaced apart along lower wall 622. Front wall 610 includes a plurality of ribs, namely horizontal ribs 636 and vertical ribs 638 to rigidify front panel 610. Front panel 610 also includes a top channel at 640 and a lower channel at 642. Front panel 610 also includes bosses at 644.

Rail 616 includes an elongate body 650 having an end wall 652 at each end including an aperture 654 and a U-shaped opening at 656. Latch 598 includes latch handle 660 and a latching rod 662 having latch ends at 664. Rail 618 includes a body 668 having a plurality of apertures at 670 and circular tubes 672 at each end.

Figure 26:
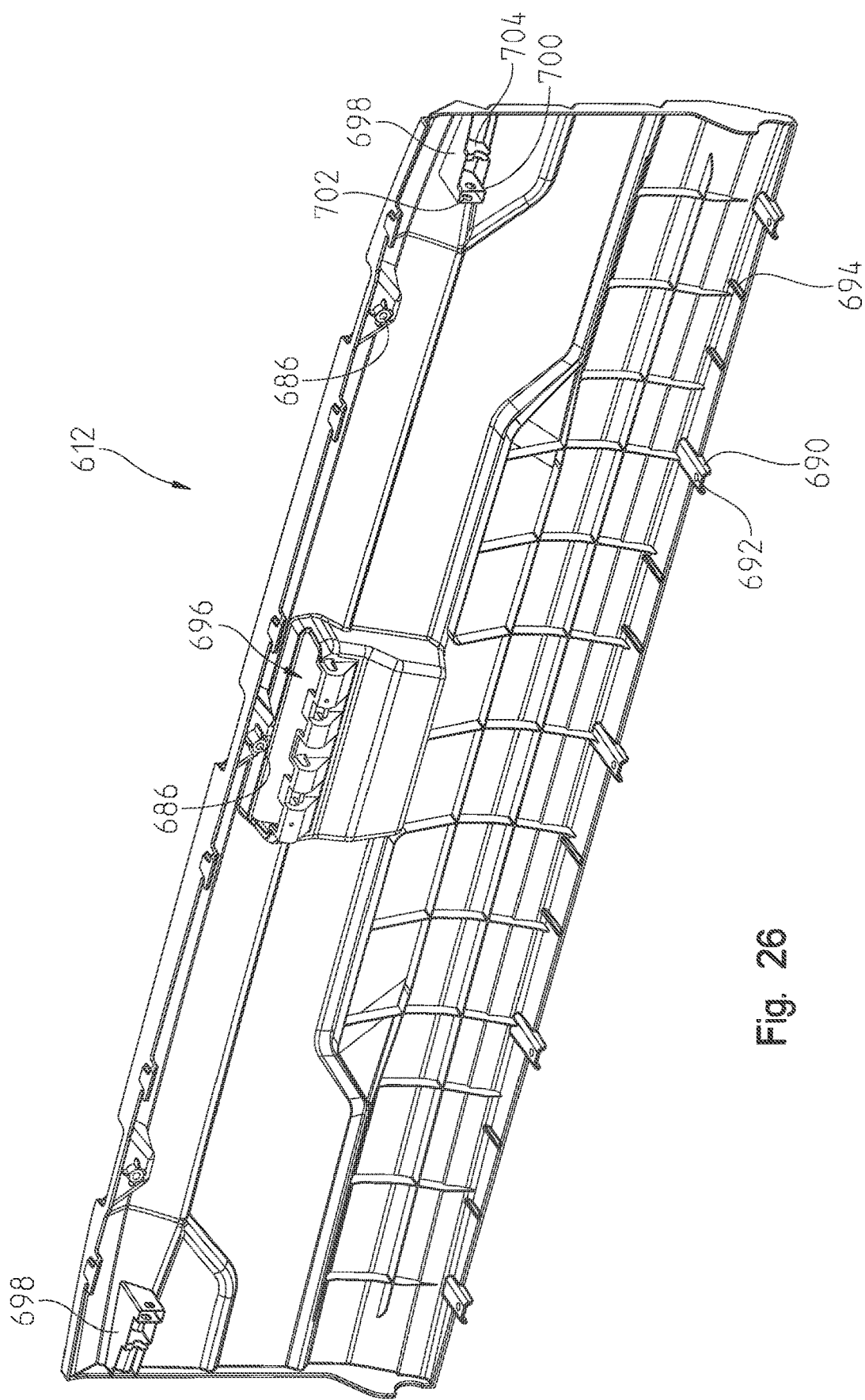
FIG. 26 is a perspective inside view of the rear panel of the tailgate shown in FIG. 25.

Rear panel 612 includes a top wall 680 having latches 682 depending therefrom and cooperating with latch members 628 on front panel 610. Rear panel 612 includes an opening at 684 for receipt of handle 660 and a plurality of apertures at 686. As shown in FIG. 26, rear panel 612 further includes tabs 690 (FIG. 26) having apertures at 692, where tabs 690 align with tabs 630 on front panel 610. Rear panel 612 further includes a latch holding mechanism at 696 for holding latch handle 660 and mechanisms 698 for holding latch rod 662. Mechanisms 698 include parallel walls 700 having apertures at 702 for receiving rod 662 and trunnion walls 704 for guiding rod 662.

Figure 27:
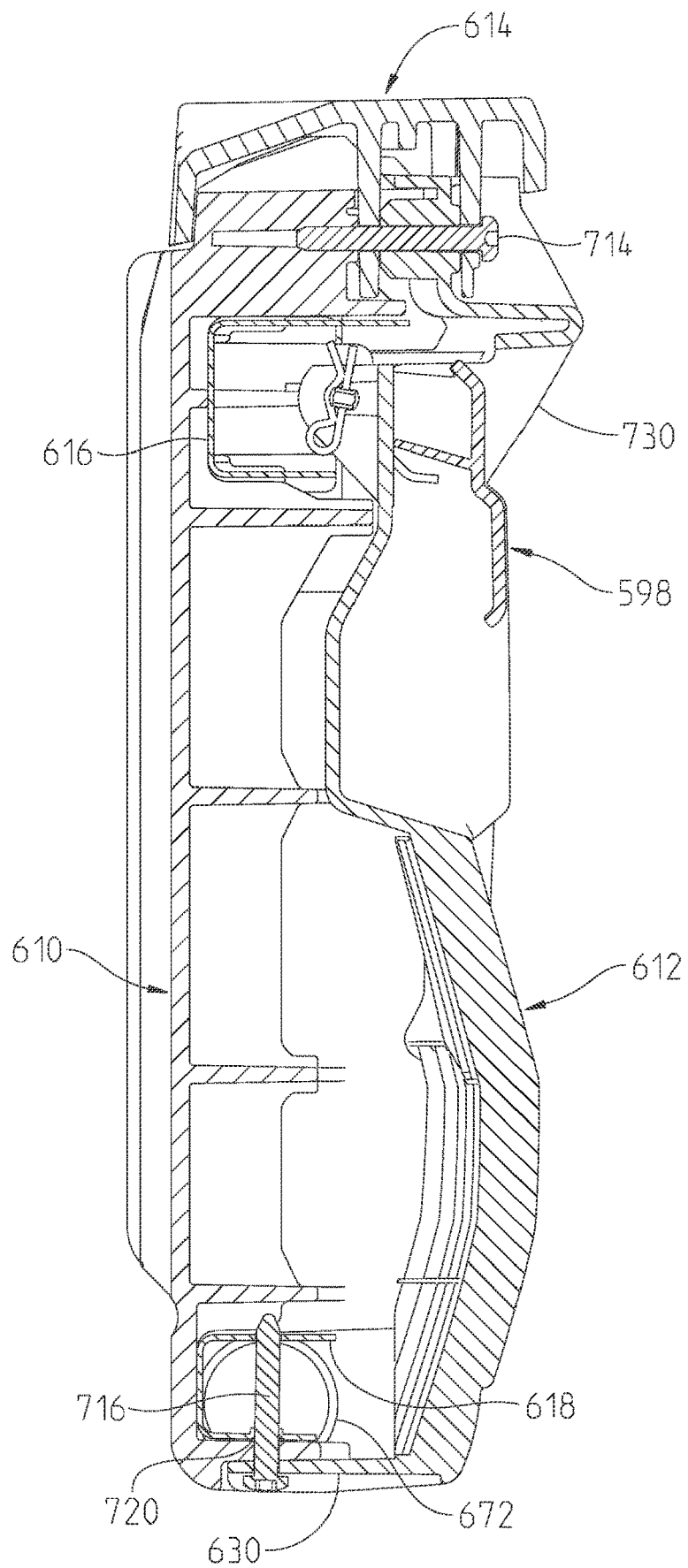
FIG. 27 is a cross-sectional view through lines 27-27 of FIG. 24.
Figure 28:
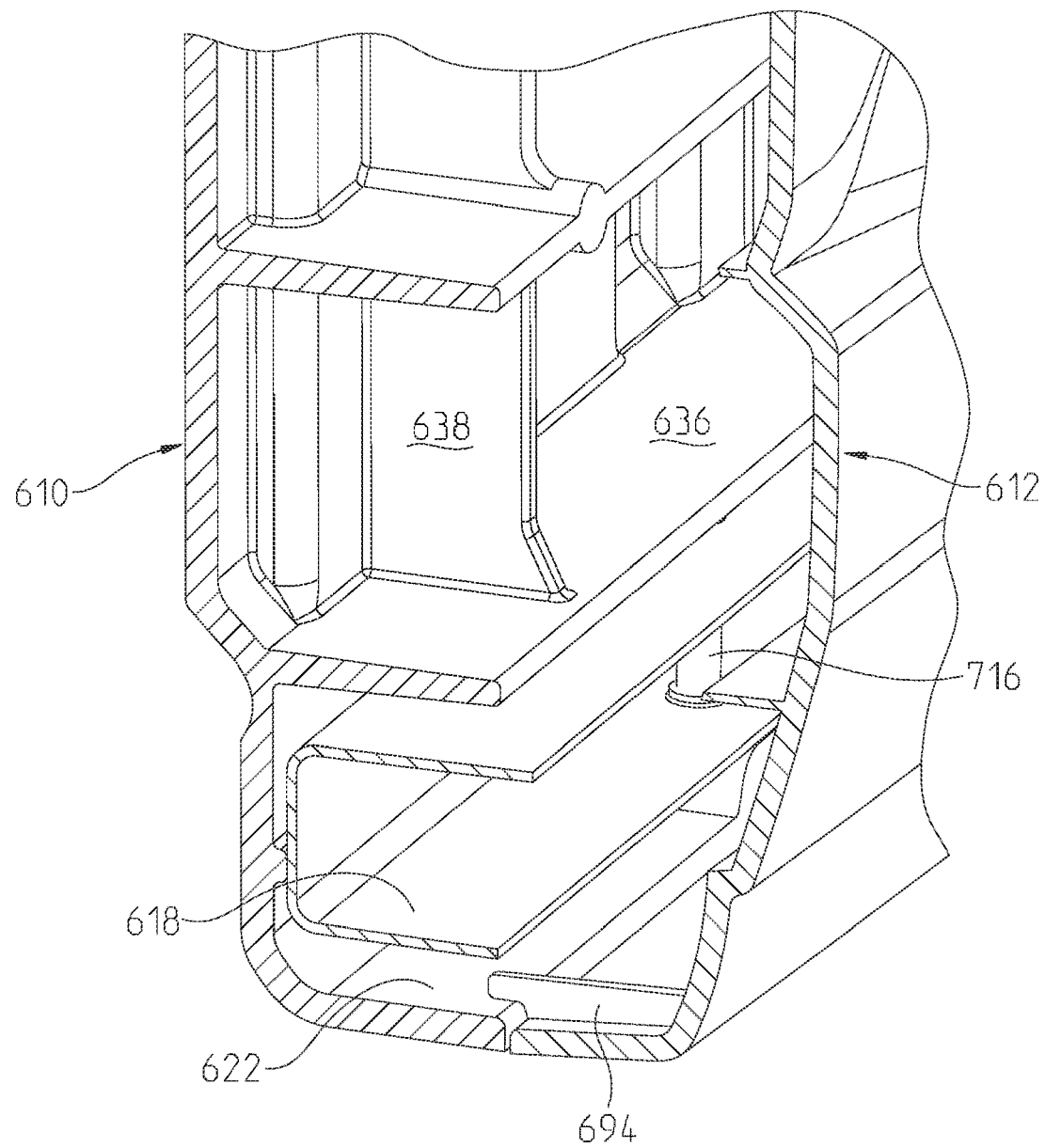
FIG. 28 is a three-dimensional cross-sectional view through the lines 28-28 of FIG. 24.

To assemble tailgate 578, rail 616 is positioned in channel 640 and rail 618 is positioned in channel 642. Fasteners 710 may be positioned through the end wall 624 of front panel 610 and received in apertures 654 of rail 616. Handle 598 is then assembled within rear panel 612 with rod 662 positioned through apertures 702 and rear panel 612 is brought into position with front panel 610 such that latches 682 latch with corresponding latches 628 on front panel and where tabs 690 align with tabs 630. Top panel 614 may then be brought into position where tabs 712 align with bosses 644 and fasteners 714 are positioned through apertures 686 and into threaded engagement with bosses 644. Fasteners 716 are then brought into position with apertures 692 (FIG. 26) and brought into threaded engagement with apertures in tabs 630. As shown in FIG. 27, fasteners 716 extend through tabs 630 and 690, and into apertures 720 of rail 618. As assembled, rails 616 and 618 rigidify the tailgate 578 from both bending stresses and torsion. As shown in FIG. 28, ribs 694 also overlap lower wall 622 of front panel 610. Also tailgate 578 has a cleaner look as no fasteners are visible from the outside of the tailgate, even when the tailgate 578 is rotated to the open position.

Also, as shown in FIGS. 25 and 27, tailgate 578 includes a defined surface 730 for directing dust away from the operator's compartment if dust is coming upward from the ground past the tailgate.

Figure 29:
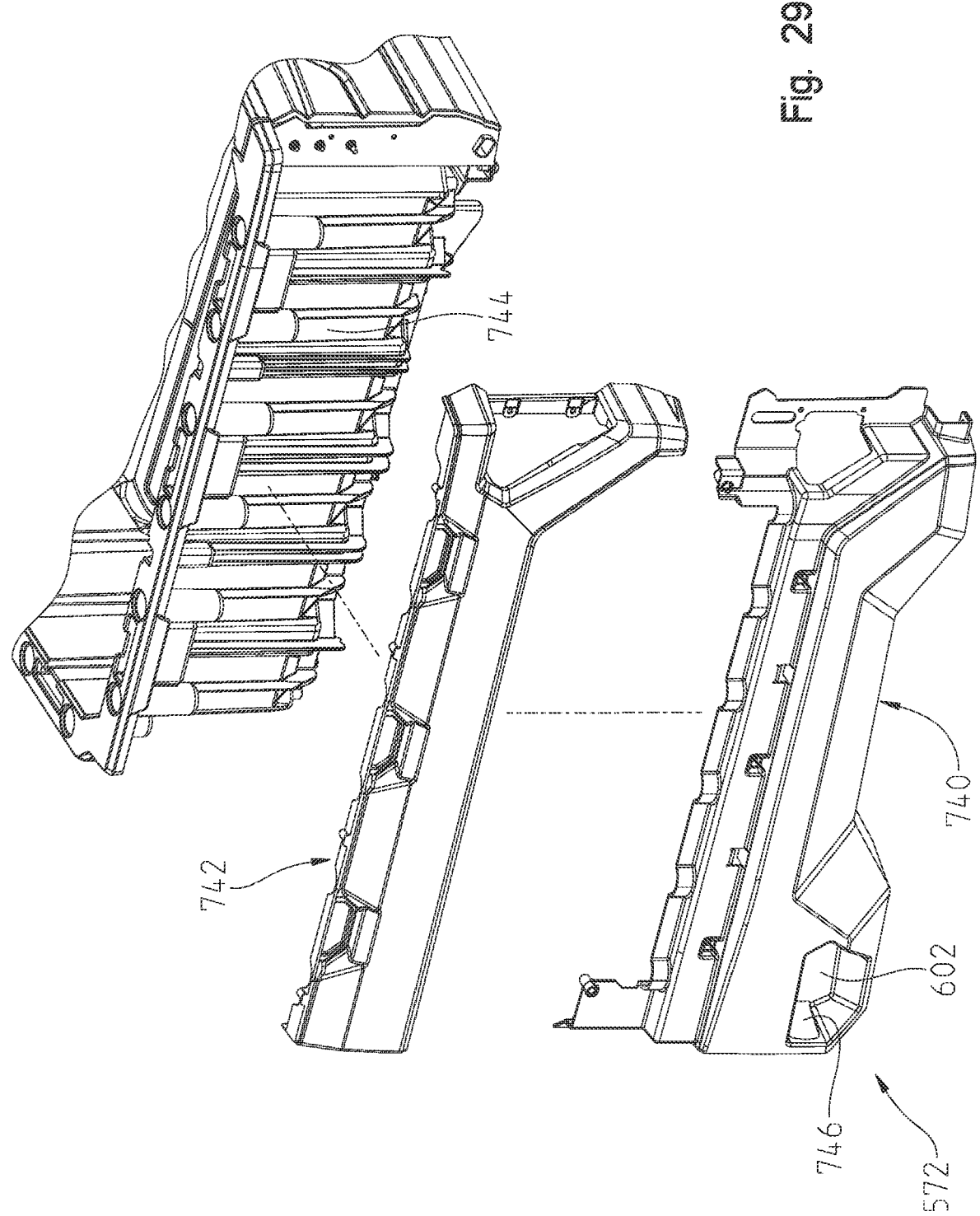
FIG. 29 is an exploded view of the panels that make up the sidewall of the cargo area.
Figure 30:
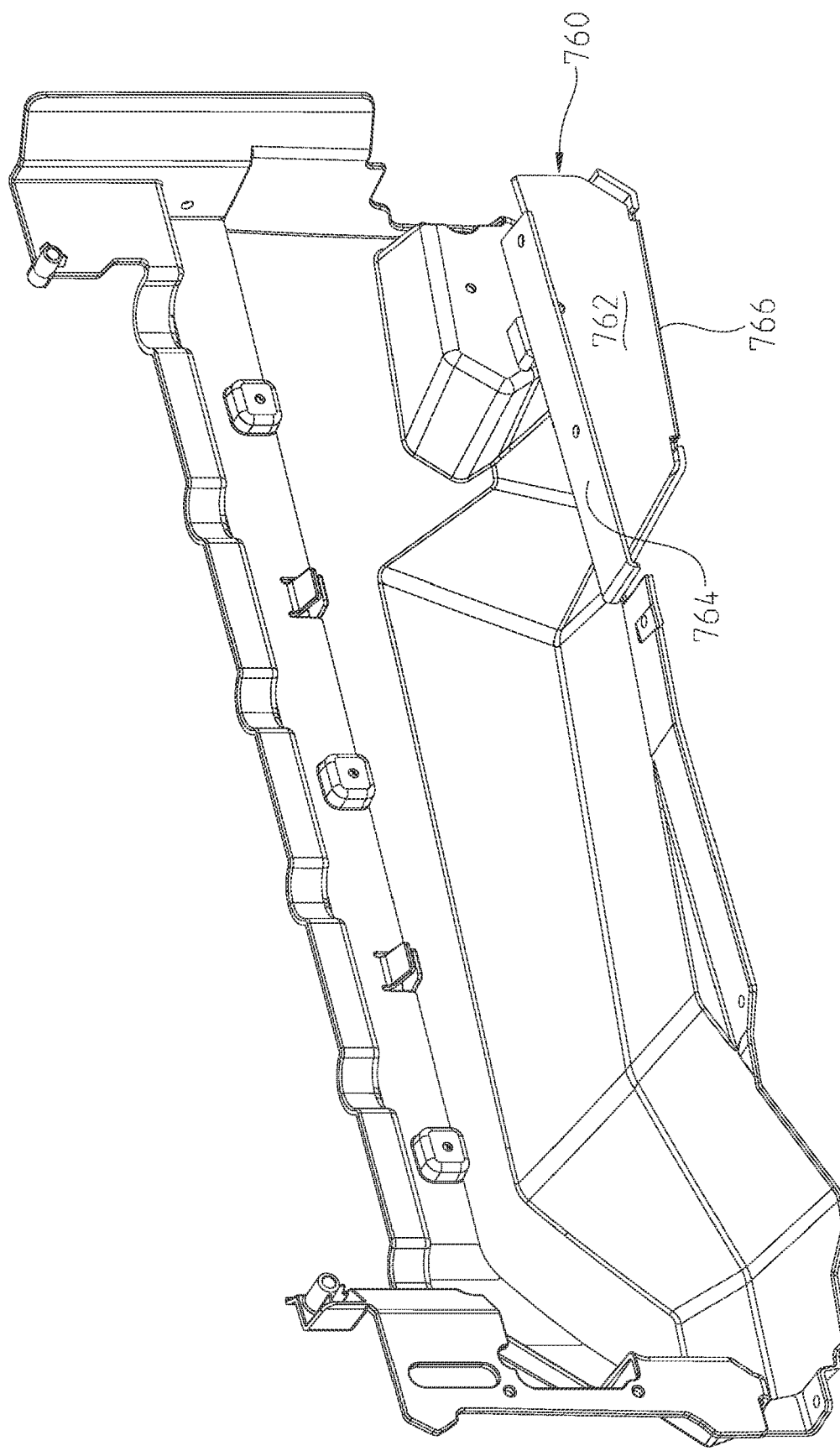
FIG. 30 is a perspective view of the inside of the lower panel shown in FIG. 29.
Figure 31:
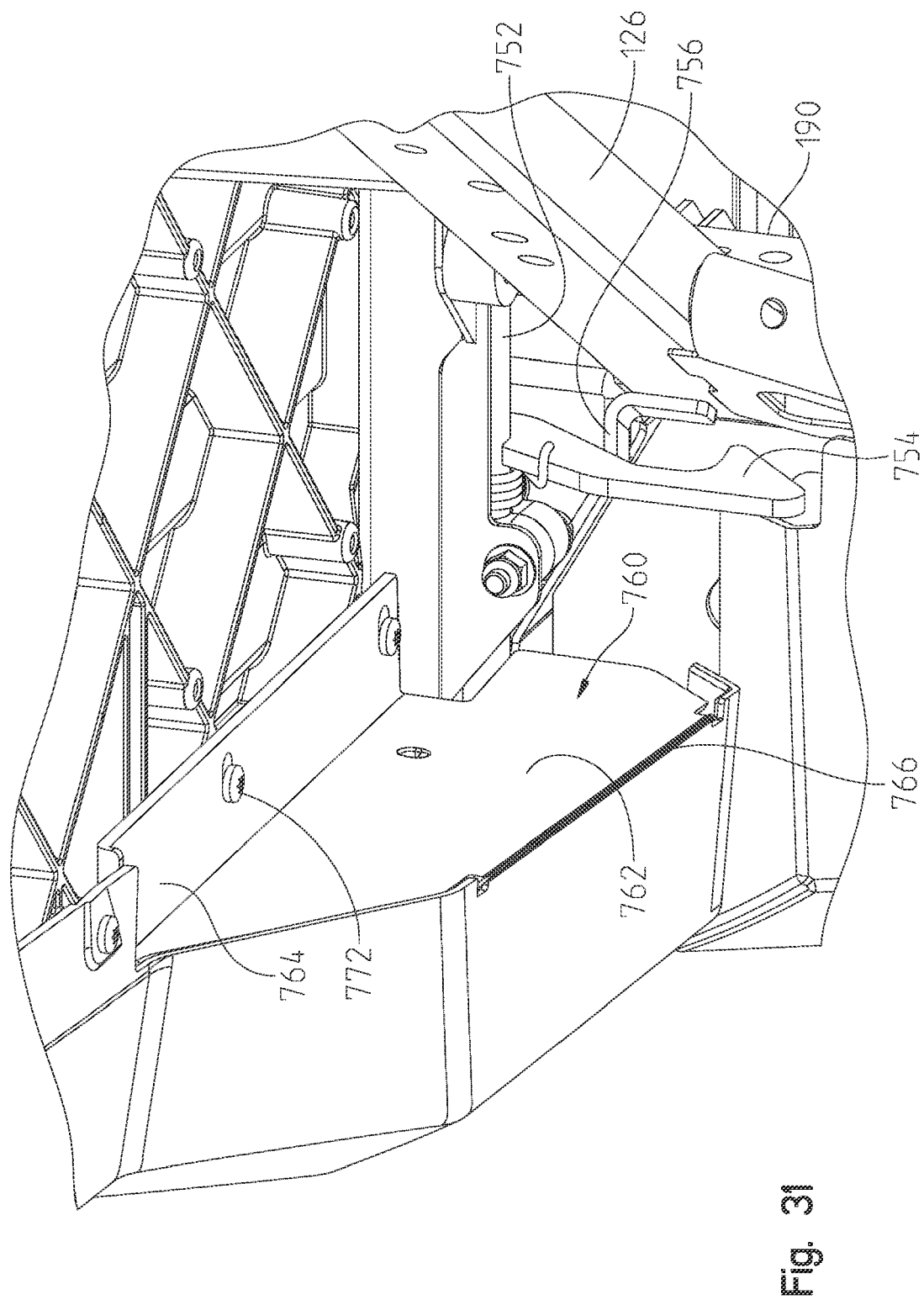
FIG. 31 is an underside perspective view of the panel shown in FIG. 30 as attached to the cargo area.
Figure 32:
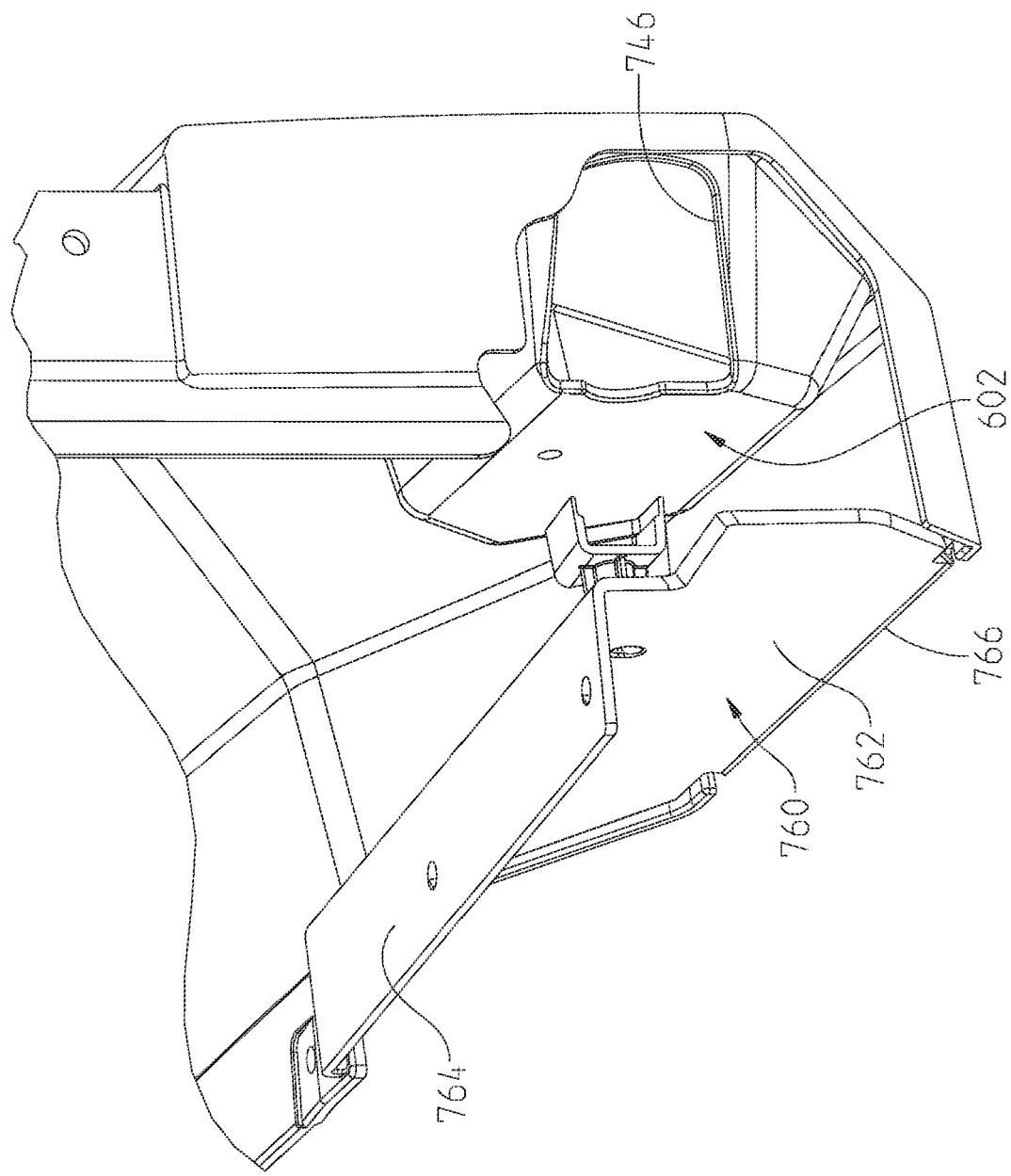
FIG. 32 is a front perspective view of the panel of FIG. 30.
Figure 33:
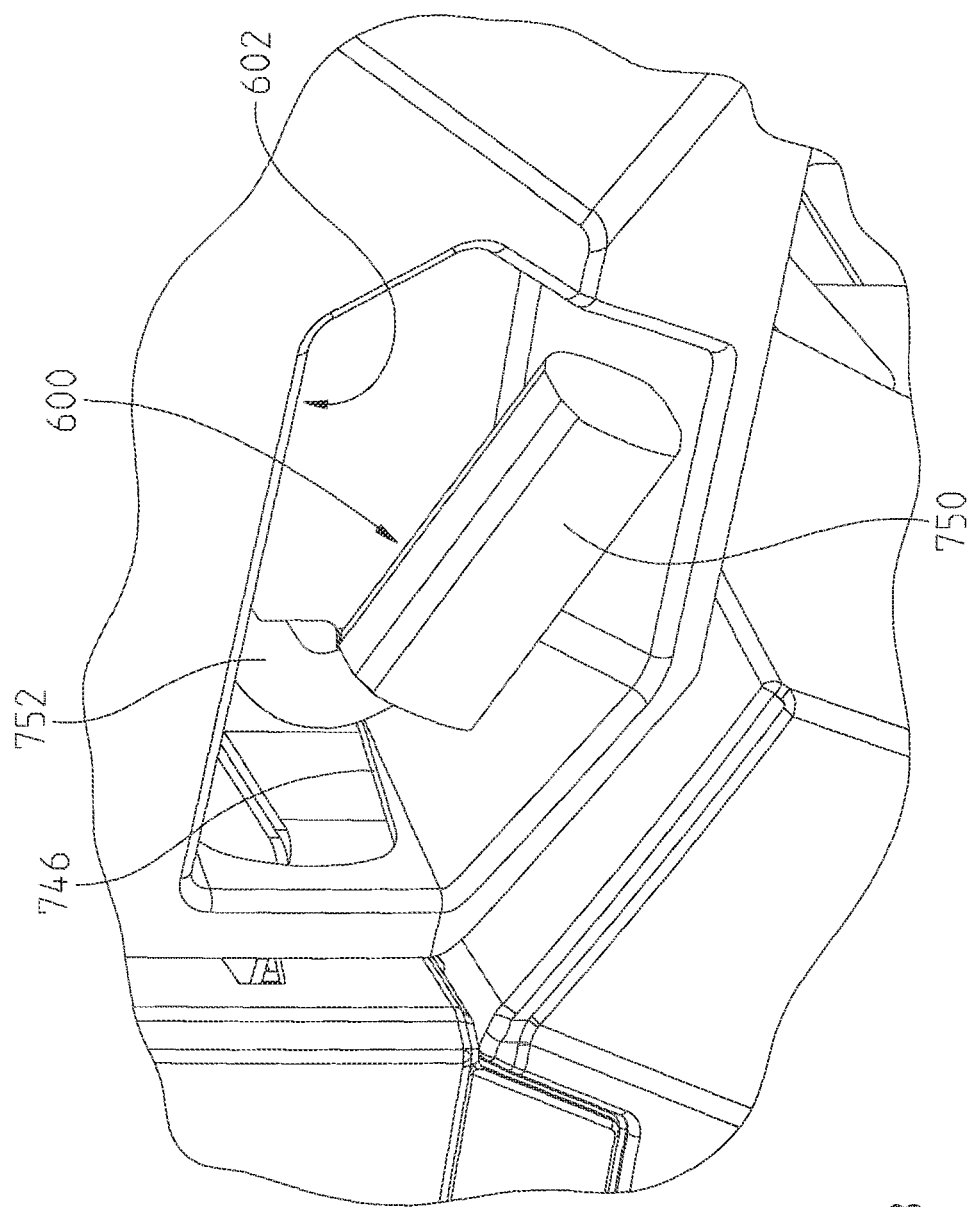
FIG. 33 is an enlarged area showing the release latch mechanism for the cargo area.

With reference now to FIGS. 29-33, sidewall 572 of the dump box 570 will be described. As sidewall 574 is a mirror image of sidewall 572, only sidewall 572 will be described. As shown in FIG. 29, sidewall 572 includes an outer lower panel 740, an outer upper panel 742, and sidewall 744 of dump box 570. Outer panel 740 and 742 couple together and couple to sidewall 744 to define sidewall 572. As shown in FIG. 33, latch 600 includes a handle 750, an actuating arm 752, and a spring loaded latch 754 (FIG. 31). A catch 756 is provided on frame rail 126. Arm 752 extends through a window 746 defined within opening 602 where opening 746 is at a front end of opening 602. A sealing surround 760 (FIGS. 30-32) is positioned adjacent to opening 602 and includes a sidewall 762, an upper mounting flap 764, and a frangible hinge 766. As sealing surround 760 is positioned forward of wheel well 770 (FIG. 23) it protects the latch structure from mud and debris collecting against the latch 754 or catch 756. This can best be seen in FIG. 31, as viewed from under the dump bed 570 looking forward at the sealing surround 760. It should be appreciated that sidewall 760 is integrally molded with the remainder of the panel and the wall 762 is closed to the position shown in FIG. 31, and fasteners 772 couple the top wall 764 to the underside of the dump bed 570.

Figure 34:
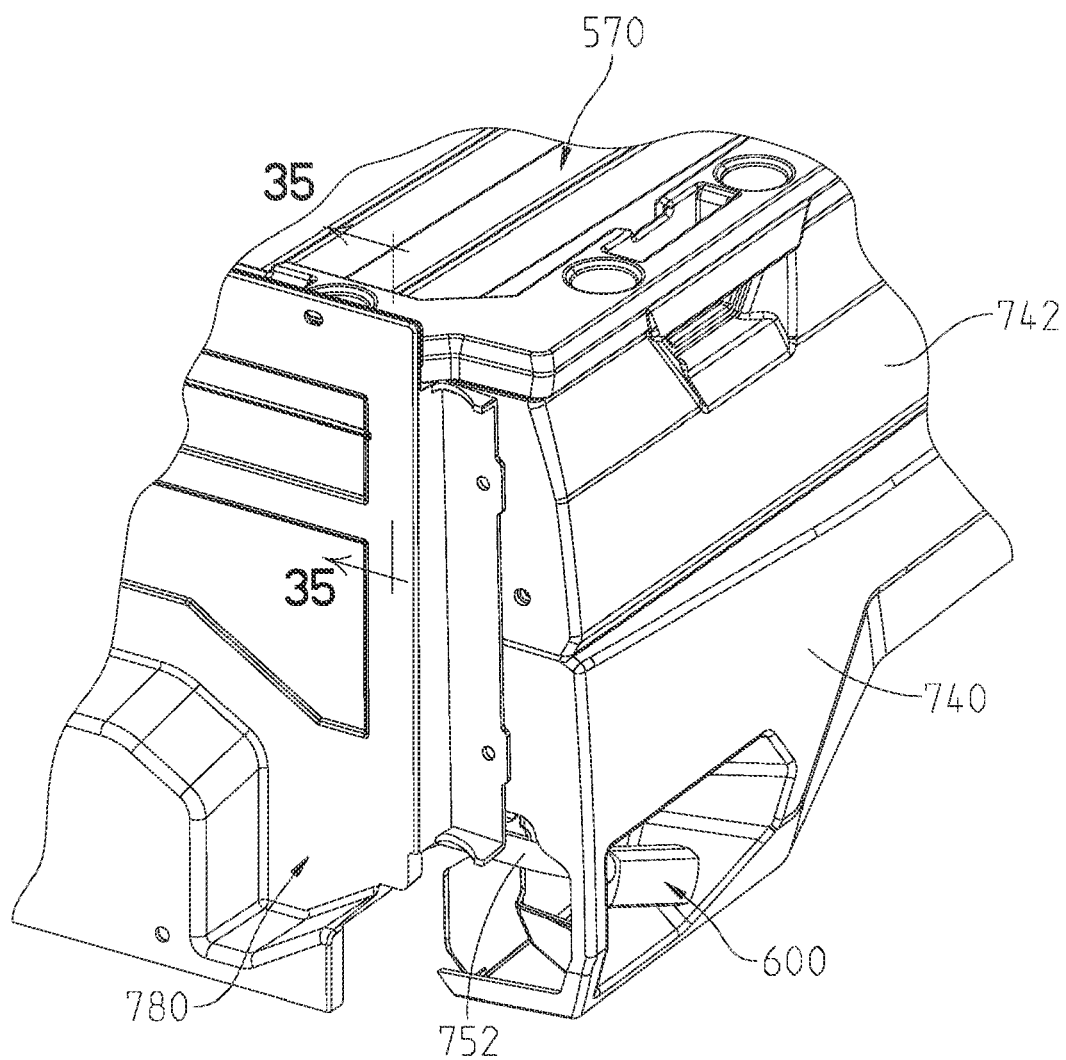
FIG. 34 shows the cargo area in combination with a front panel which extends rearwardly of the operator seat.
Figure 35:
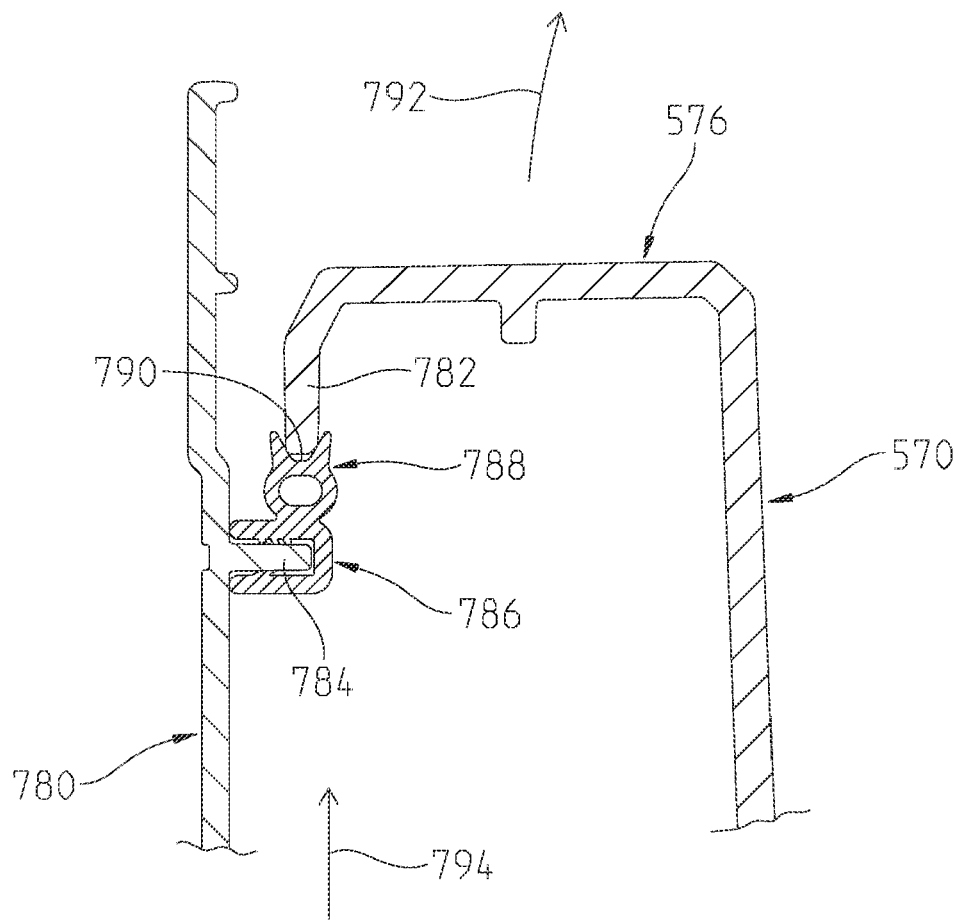
FIG. 35 is a cross-sectional view through lines 35-35 of FIG. 34.
Figure 36:
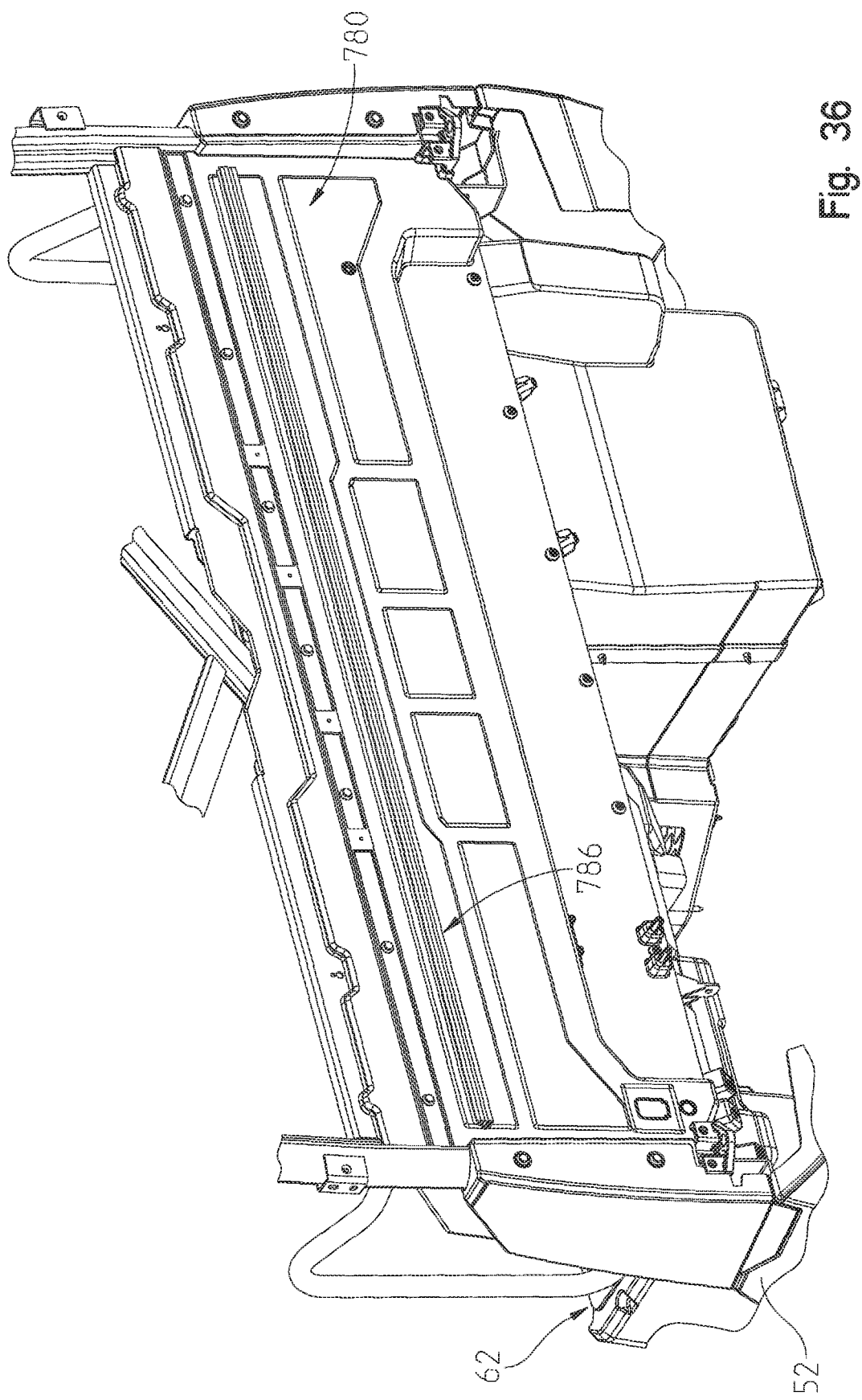
FIG. 36 is a rear perspective view of the utility vehicle of FIG. 1 with the utility box cut away showing the front panel of FIG. 34 behind the seats.
Figure 37:
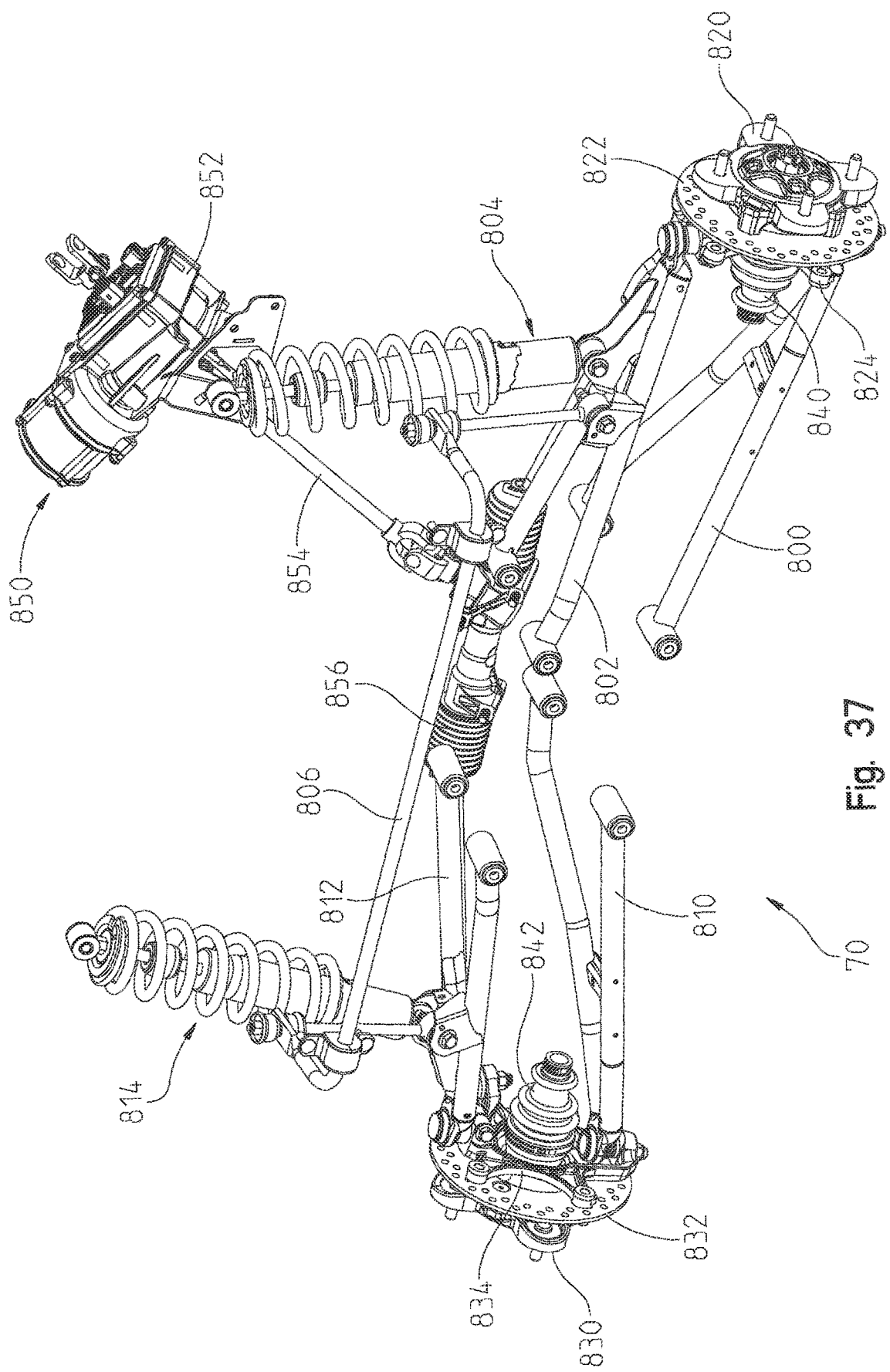
FIG. 37 is a front perspective view of the front suspension system.

With reference now to FIGS. 34-36, dump box 570 is also sealed along a front edge of dump box 570. As shown in FIG. 34, a rear panel 780 is positioned rearward of operator seats 62, 64 and is fixed relative to the vehicle 10 and to frame 12. Dump box 570 includes a front lip 782 (FIG. 35) as part of the front wall 576 and wall 780 includes a tab 784. Seal 786 is coupled to tab 784 and includes a sealing bead 788 having a sealing groove at 790. Thus when dump box 570 opens, in the direction of arrow 792 in FIG. 35, lip 782 lifts out of sealing groove 790 whereas when the box is lowered, lip 782 is moved back to the position shown in FIG. 35. Therefore, dust is not able to travel upwardly between the panel and the dump bed, for example in the direction shown by arrow 794 and back into the operator's area.

Figure 38:
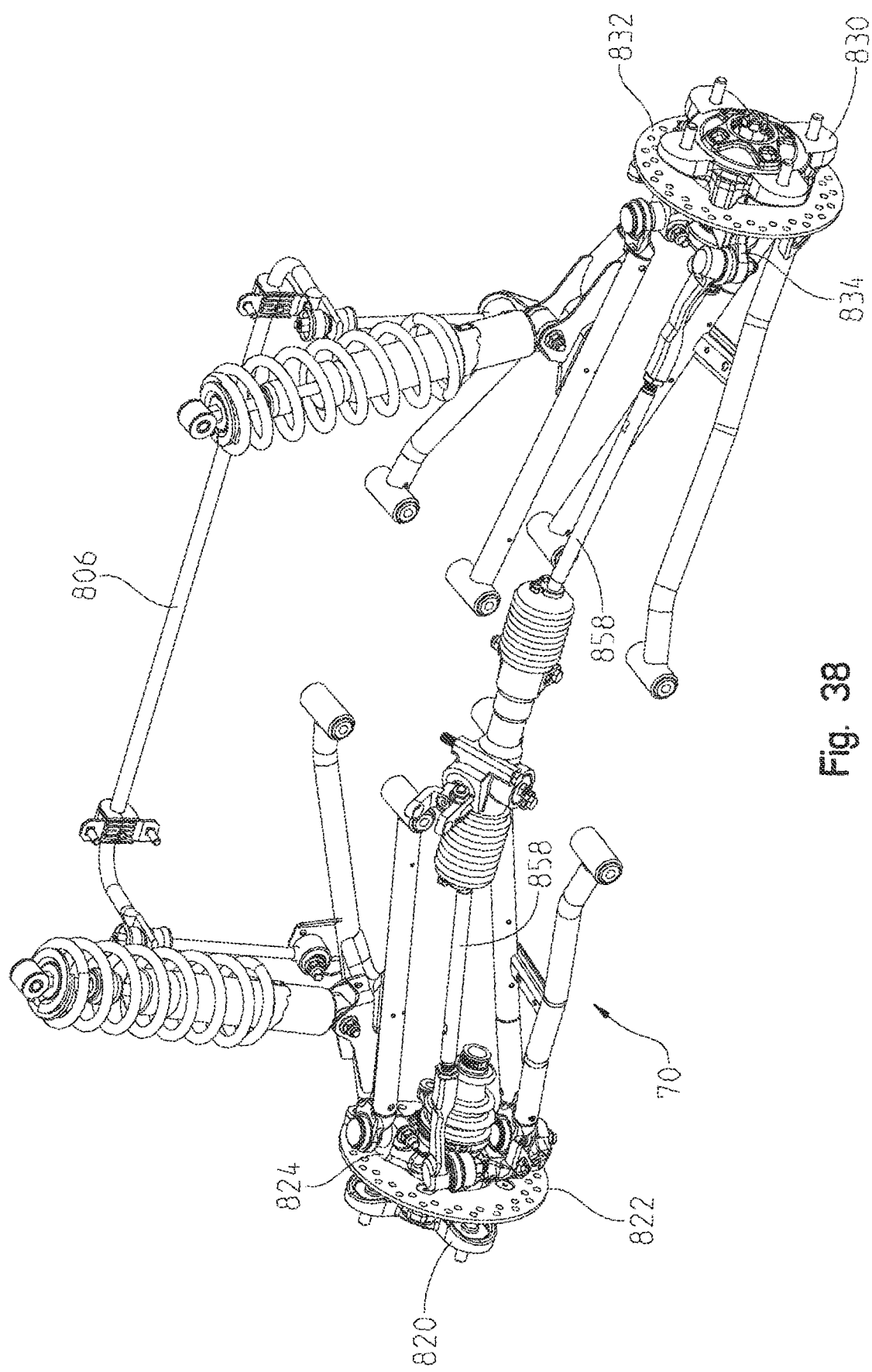
FIG. 38 is a rear perspective view of the suspension shown in FIG. 37 less the power steering motor.
Figure 39:
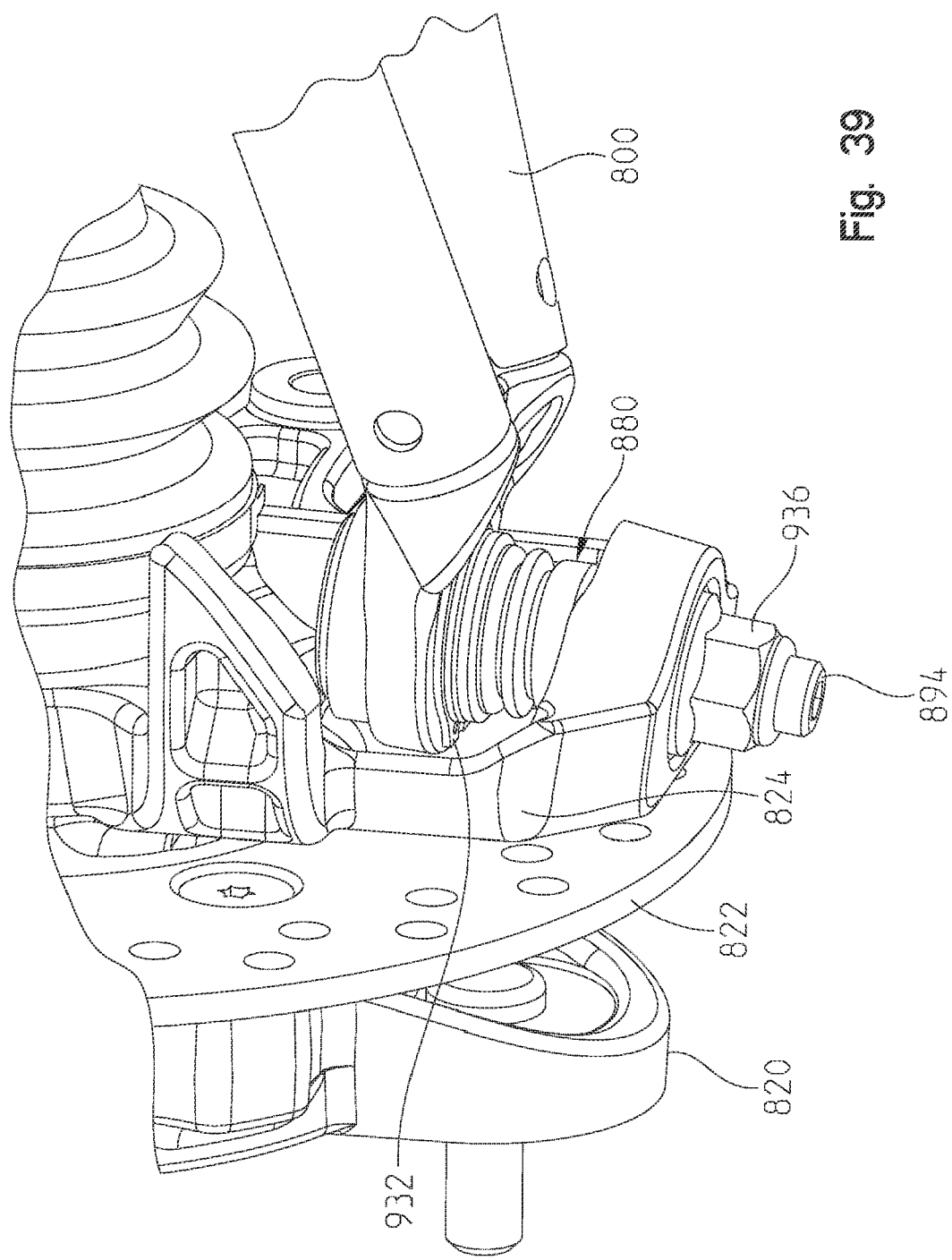
FIG. 39 is a rear perspective view of the left front wheel assembly.

With reference now to FIGS. 37-40, the front suspension 70 will be described in greater detail. As shown, front suspension 70 is generally comprised of lower control arms 800, upper control arms 802, a shock absorber 804, and a torsion bar 806. The right suspension is a mirror image of the left suspension and includes a lower control arm 810, upper control arm 812, and a shock absorber 814. Left wheel assembly is comprised of a wheel hub 820, a disc brake 822, and a steering knuckle 824. Right wheel assembly is comprised of hub 830, disc brake 832, and steering knuckle 834. As shown best in FIG. 37, front wheel assemblies are steered by way of a steering system 850 which may comprise a power steering motor 852, a steering shaft 854, a steering gear 856 (shown as a rack-and-pinion steering system), and steering arms 858 (FIG. 38). Each of the wheel hubs 820, 830 are coupled to drive units 840 and 842 which would couple to front final drive by way of half shafts as is known in the art.

Figure 40:
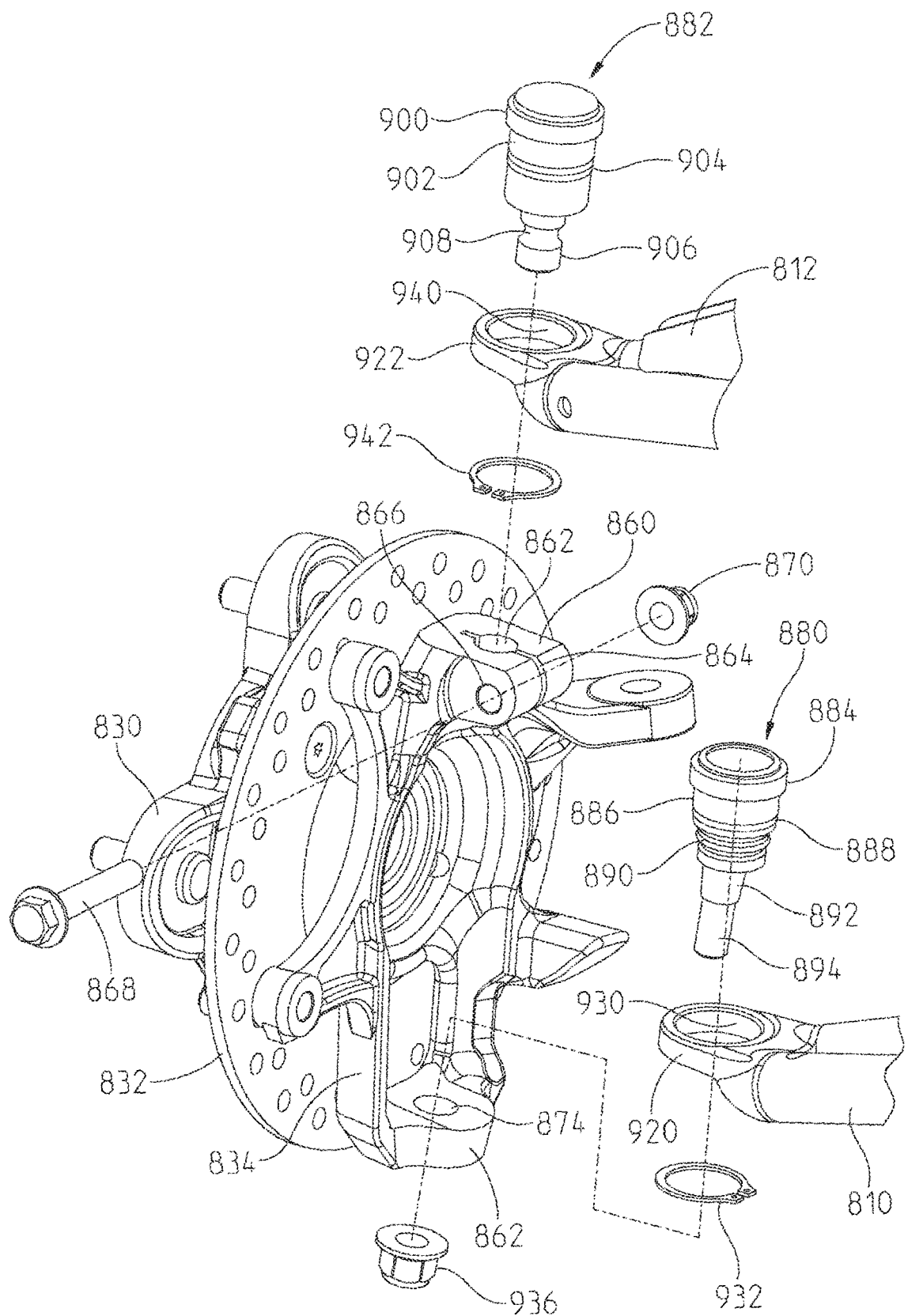
FIG. 40 is an exploded view of the right front wheel assembly.

With respect now to FIG. 40, the front right wheel assembly is shown in exploded view where knuckle 834 includes an upper coupling at 860 and a lower coupling at 862. Upper coupling 860 is split at 864 and includes an aperture 866 extending therethrough for receipt of a fastener 868. An upper aperture 862 extends downwardly through the coupling 860. Lower coupling 862 includes an aperture at 874. The control arms 810 and 812 are coupled to knuckle 834 by way of ball joints 880 and 882. Lower ball joint 880 includes an upper ring at 884, a reduced diameter section at 886, a groove at 888, an internal ball joint portion at 890, a tapered shaft 892, and a threaded shaft portion at 894. In a like manner, upper ball joint 882 includes an upper ring 900, a reduced diameter portion 902, a groove at 904, and a shaft at 906. Shaft 906 is interrupted by a semi-circular groove at 908 as described herein. As also shown, lower control arm 810 includes a coupling joint at 920 and upper control arm 812 includes an upper coupling joint at 922.

To assemble the knuckle 834 and hub 830 to the control arms 810, 812, ball joint 880 is positioned within coupling joint 920 such that diameter portion 886 resides within diameter 930 of coupling joint 920 whereupon a snap ring 932 is positioned within groove 888 of lower ball joint 880. It should be appreciated that snap ring 932 retains ball joint 880 to the lower control arm 810. Threaded shaft 894 is then inserted through aperture 874 which is profiled to receive tapered shaft portion 892. This allows a portion of threaded shaft 894 to extend downwardly through coupler 862 whereupon a fastener 936 is threaded onto threaded diameter 894 to couple control arm 810 to the knuckle 834.

In a like manner, upper ball joint 882 is positioned through coupling joint 922 such that diameter portion 902 resides against surface 940 of coupling joint 922 and snap ring 942 can be positioned within groove 904 of upper ball joint 882. This locks the ball joint and the upper control arm 812 together. Shaft 906 can thereafter be positioned within aperture 862 and fastener 868 can be positioned through aperture 866. It should be appreciated that semi-circular groove 908 is profiled to align with aperture 866 such that a portion of threaded fastener 868 extends through the groove 908 and then outwardly to receive fastener 870. As should be noted, both of the control arms 810 and 812 are mounted to knuckle 834 at a position above the couplers 862 and 860 which raises the control arms relative to the ground. Particularly in the case of the lower control arm 810, the raising of the coupling point raises the ground clearance of the front suspension. The same construction could be employed for the rear suspension.

Figure 41A:
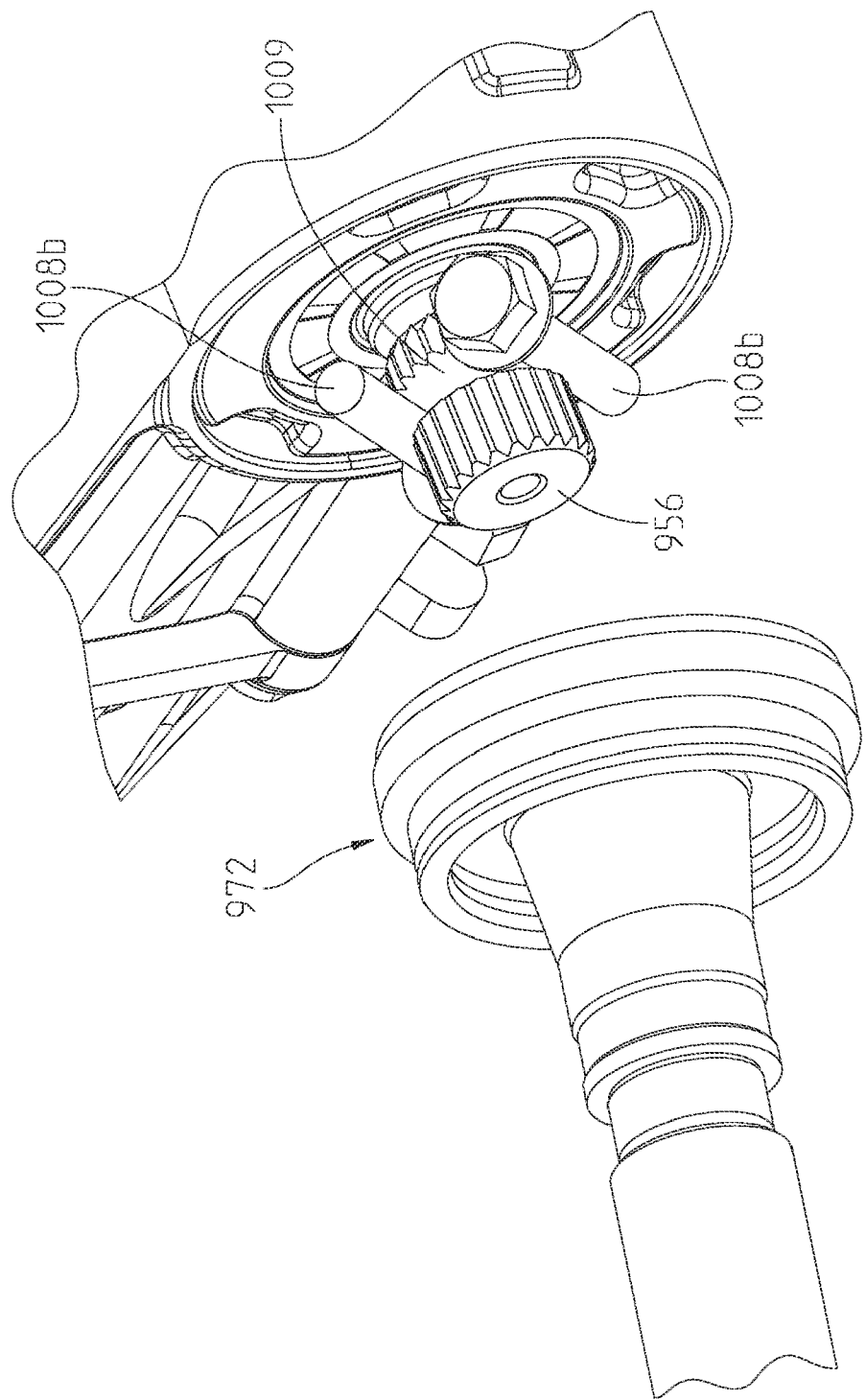
FIG. 41A shows an enlarged view of the drivetrain of FIG. 41 with a portion of the constant velocity joint removed.
Figure 41B:
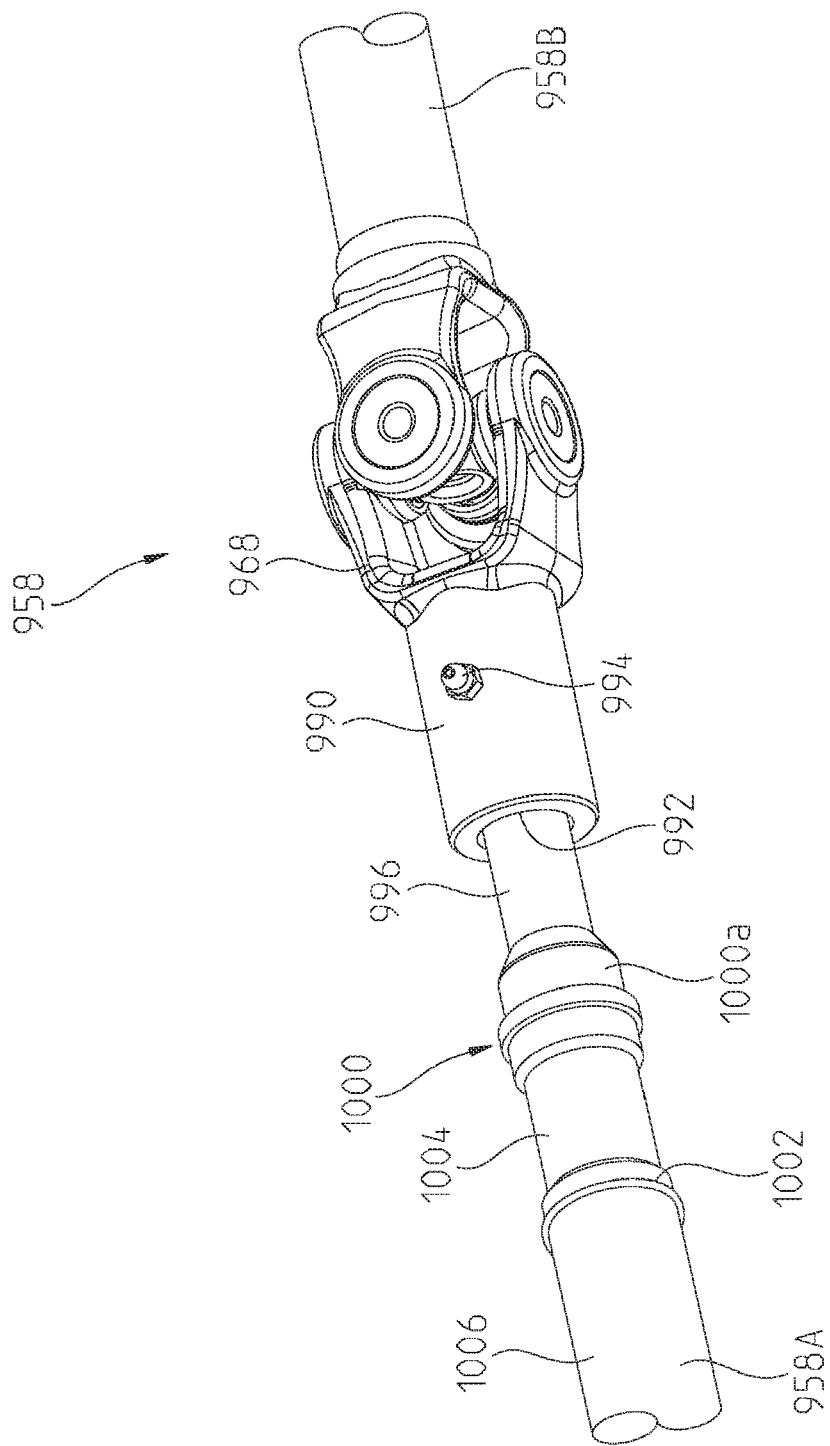
FIG. 41B shows an enlarged view of the drivetrain of FIG. 41.

With reference now to FIGS. 41-41B, the driveline of the vehicle will be described in greater detail. As shown in FIG. 41, the driveline includes a transmission 34 in the form of transaxle 950 having an input shaft at 952 and an output at 954. Output 954 is for the rear wheels where half-shafts would extend from the output 954 to the rear wheels 16. Transaxle 950 also includes a front output at 956 (FIG. 41A) which couples to a prop shaft (or drive shaft) 958. Prop shaft 958 extends forwardly to a front final drive 960 (which may be a differential).

With reference still to FIG. 41, drive shaft 958 includes a two-piece prop shaft including portions 958A and 958B. Prop shaft 958 includes two constant velocity joints 966 and 972, and a centrally located universal joint 968. Prop shaft portion 958A rides within a bearing 980 as further described herein. With reference now to FIG. 41B, universal joint portion 968 includes tubular portion 990 which is internally splined at diameter 992 and includes a grease fitting at 994. Prop shaft portion 958A further includes externally splined portion 996 which is movable longitudinally relative to tubular portion 990. Prop shaft portion 958A further includes a weld joint at 1000 and a second weld joint at 1002 which fuses together tubular portion 1004 to tubular portion 1006. It should be appreciated that bearing 980 rides on surface 1000A of weld joint 1000 and that tubular portion 1004 is forward of bearing 980. Tubular portion 1004 has a smaller diameter and a lower torsional threshold than does tubular portion 1006 so as to define a torsional rupture point for shaft portion 958A. The rupture point is created by a reduced cross-sectional area of metal at the location, in relation to other locations on the drive shaft.

That is, if the drive shaft exceeds a certain torque limit, the defined breaking point for the drive shaft 958 is within the reduced diameter tubular portion 1004. This allows the remainder of the drive shaft 958 rearward of bearing 980 to still be held in place by bearing 980 and still allow the vehicle to have two-wheeled drive; that is, through the rear wheels. This prevents breaking the drive shaft 958 rearward of bearing 980 where drive shaft 958 would potentially spin about, damaging the engine or other vehicle components. While the prop shaft portion 958A forward of the bearing may drop down from its present location, as it is not spinning, it will not damage any vehicle components.

With reference to FIGS. 41 and 41A, the constant velocity joint is coupled to the shaft 956 by way of a coupler 1008 which includes brackets 1008a and fasteners 1008b. As shown in FIG. 41A, the shanks of the fasteners 1008b reside in a groove 1009 of shaft 956 to retain the constant velocity joint 972 in a longitudinal sense relative to the shaft 956. Any longitudinal movement of the shaft 958 is taken up in the constant velocity joints 966, 972.

Figure 42:
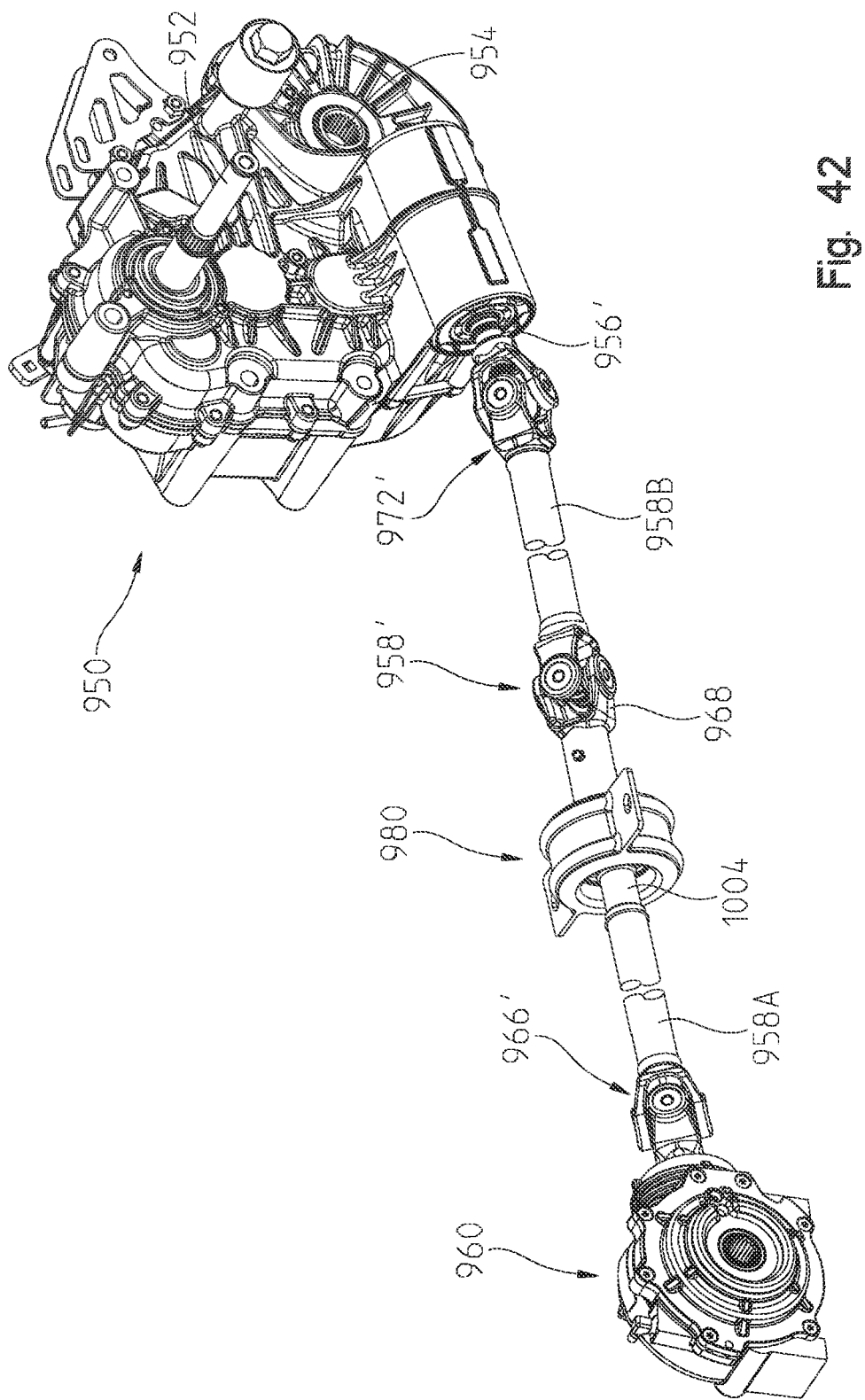
FIG. 42 shows a left perspective view of an alternate drivetrain.

Alternatively, and with reference to FIG. 42, the constant velocity joints 966, 972 could be replaced with universal joints 966', 972' where longitudinal movement of the shaft 958' is taken up by the universal joints 966', 972' sliding relative to the shafts, 956' for example.

Figure 43:
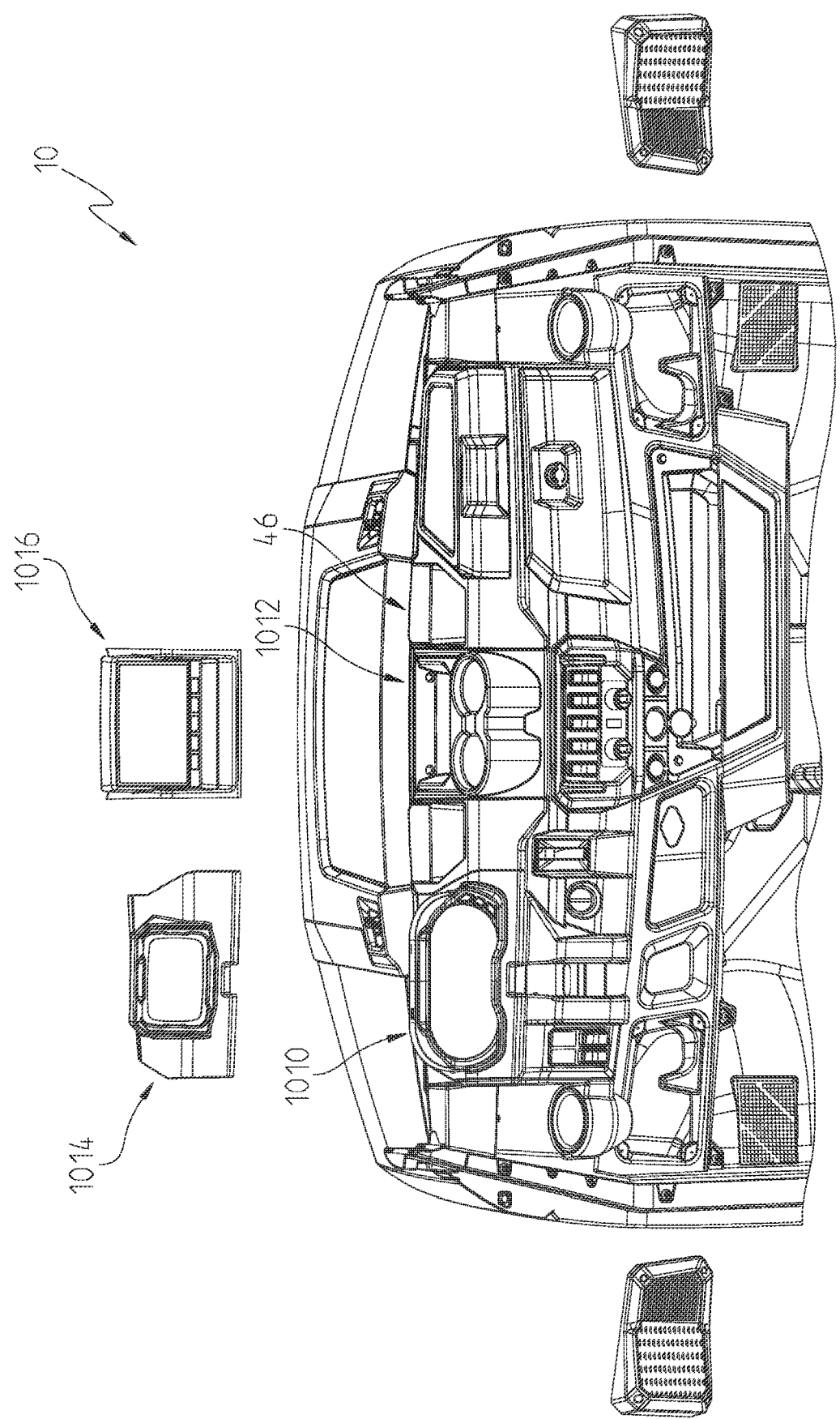
FIG. 43 shows a rear view of the dash with interchangeable accessories.
Figure 44:
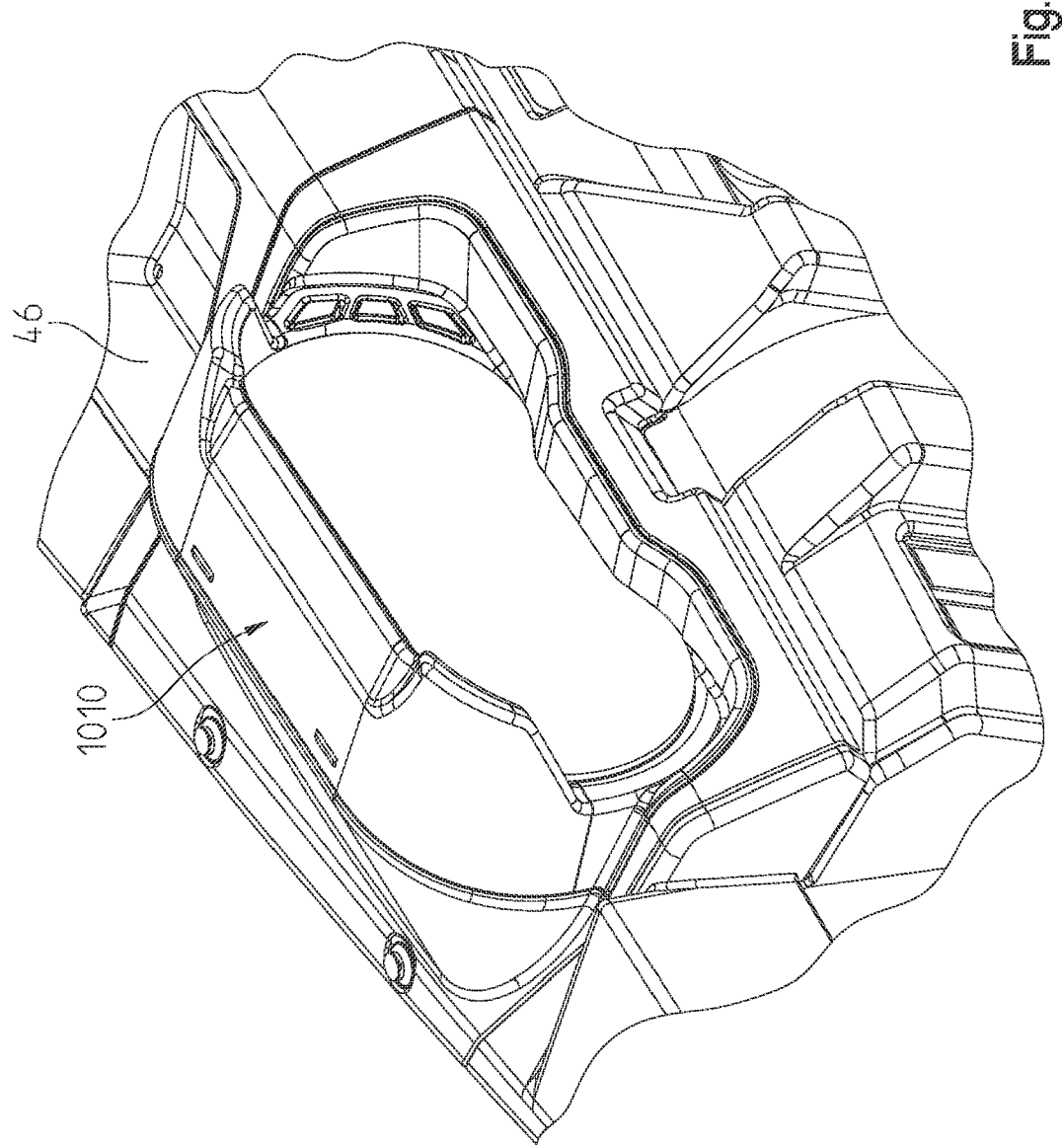
FIG. 44 shows an enlarged perspective view of the accessory shown in FIG. 43.
Figure 45:
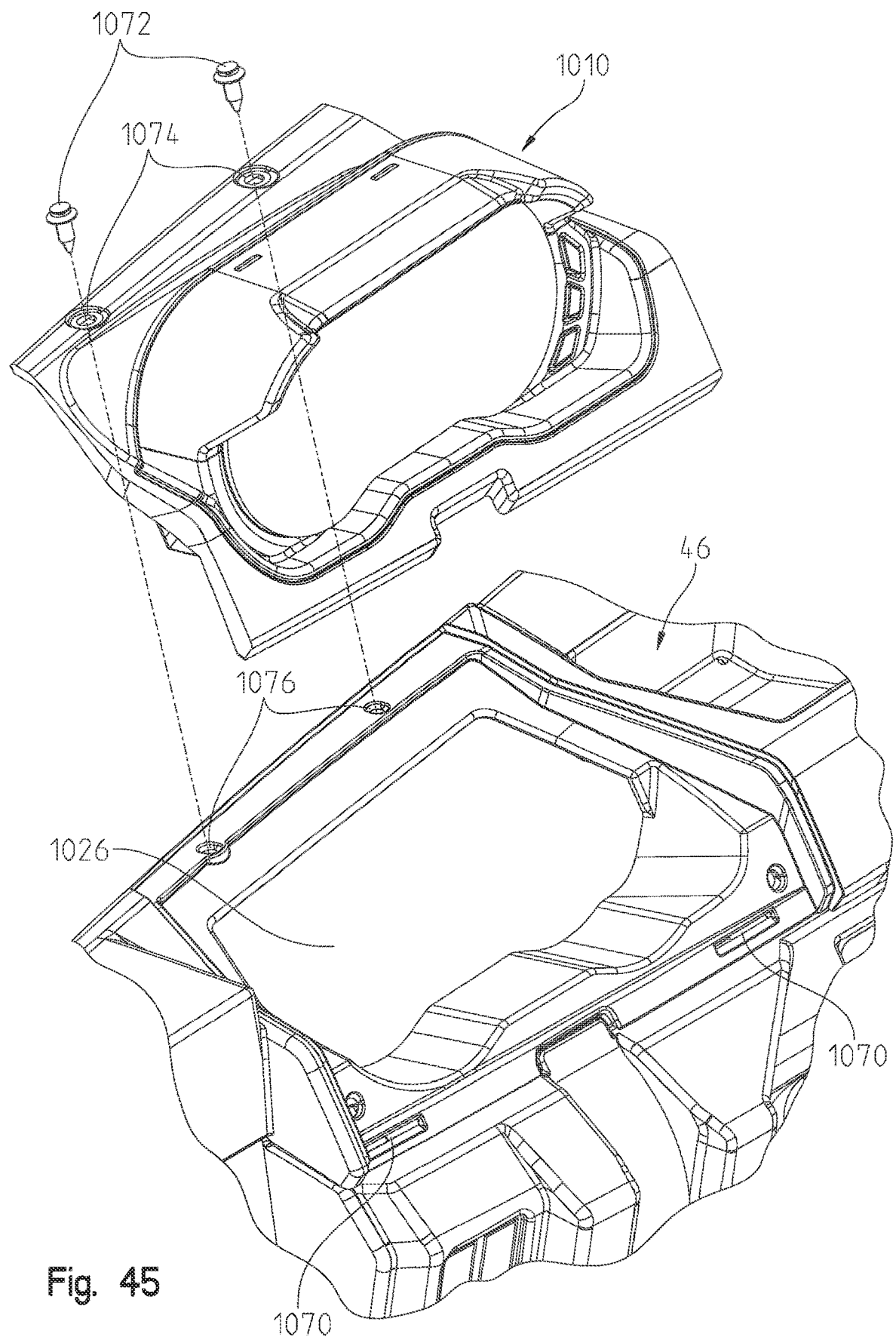
FIG. 45 shows an enlarged perspective view of the accessory shown in FIG. 44 exploded away from the dash.
Figure 46:
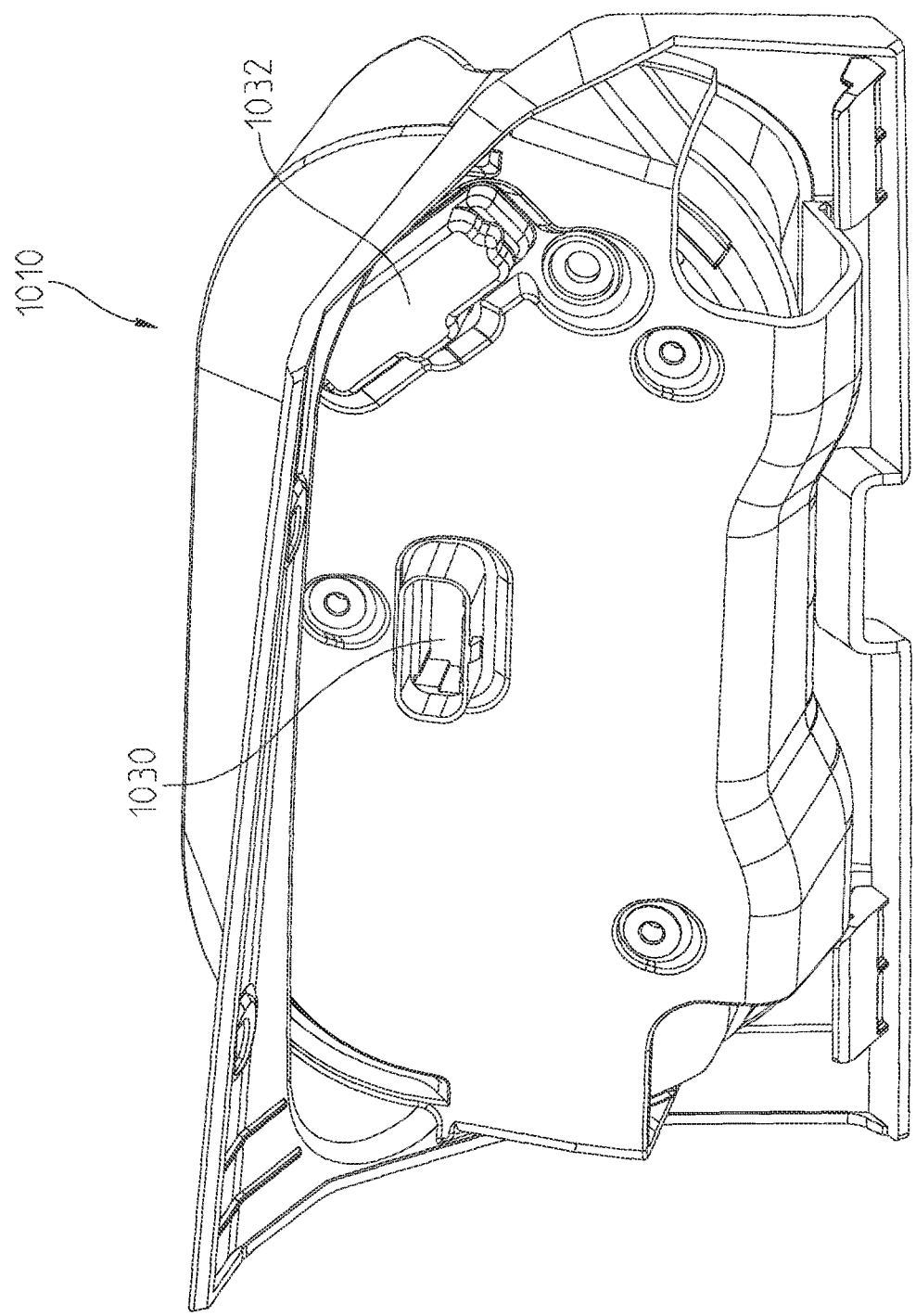
FIG. 46 shows a rear view of the accessory.

With reference now to FIGS. 43-48, optional gauges and electronic modules are shown for vehicle 10. As shown in FIG. 43, module 1010 is shown installed in the dashboard 46 while another module 1012 is installed in the center of the dash 46. Module 1010 could include multiple different gauges such as a speedometer or tachometer whereas module 1012 is shown including a pair of cup holders for the vehicle. Optionally, module 1010 may comprise a different configuration of gauges such as module 1014 to be installed instead of module 1010. Additionally, module 1012 may be replaced by removing module 1012 and replacing it with module 1016. Module 1016 could be a monitor such as diagnostic indications, GPS, or infotainment. With reference now to FIGS. 44 and 45, module 1010 is shown removable as an assembly. The rear of the module 1010 is shown in FIG. 46 as including connector interfaces such as 1030 and 1032. These would connect with complementary connectors within the dash 1026 (FIG. 45).

Figure 47:
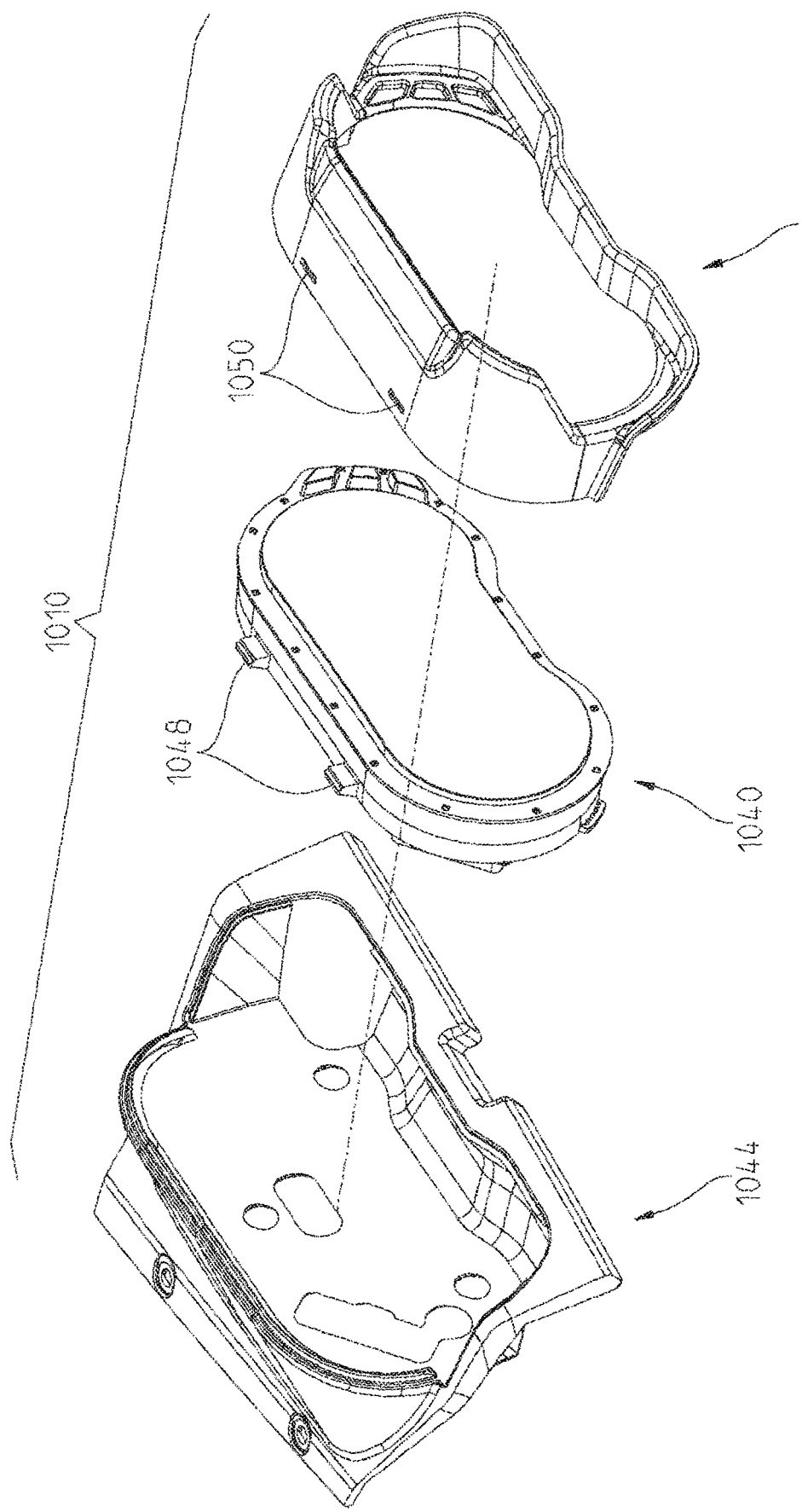
FIG. 47 shows an exploded view of the accessory of FIG. 46.
Figure 48:
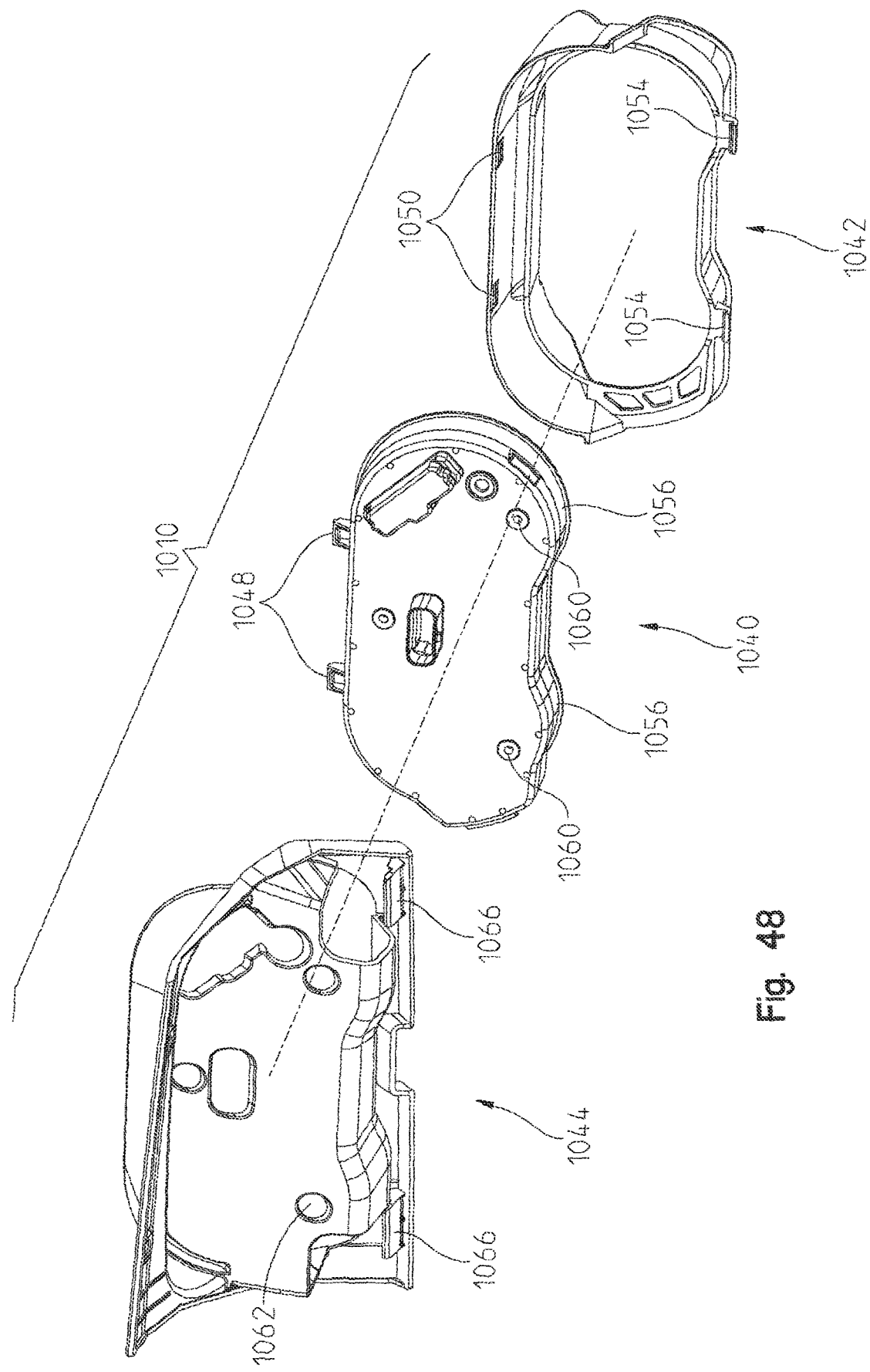
FIG. 48 shows a rear exploded view of the accessory of FIG. 47.

As shown in FIGS. 47-48, module 1010 is shown as including the gauge assembly 1040, a front facia 1042, and a mounting member 1044. Gauge assembly 1040 includes two tabs 1048 along a top edge thereof which mate with apertures 1050 in front facia 1042. As shown in FIG. 48, front facia 1042 includes two clips 1054 which clip on a back edge 1056 of gauge 1040 to couple the gauge 1040 to the front facia 1042. The back of gauge 1040 includes threaded inserts 1060 which align with apertures 1062 in mounting member 1044 such that fasteners can be received through aperture 1062 into threaded engagement with threaded inserts 1060 to retain gauge 1040 and facia 1042 to the mounting member 1044. The back of mounting member 1044 includes tabs 1066 which align with apertures 1070 in the dash (FIG. 45) and fasteners 1072 may be received through apertures 1074 in mounting member 1010 and into threaded engagement with apertures 1076, all of which is shown in FIG. 45. It should be understood that module 1014 would include tabs similar to that as 1066 and apertures 1074 in a like position such that module assembly 1014 could be swapped with module 1010 to provide an alternate vehicle configuration. A similar replacement of module 1016 with module 1012 can upgrade the vehicle to include an electronics package such as GPS, etc. as discussed above.

Figure 49:
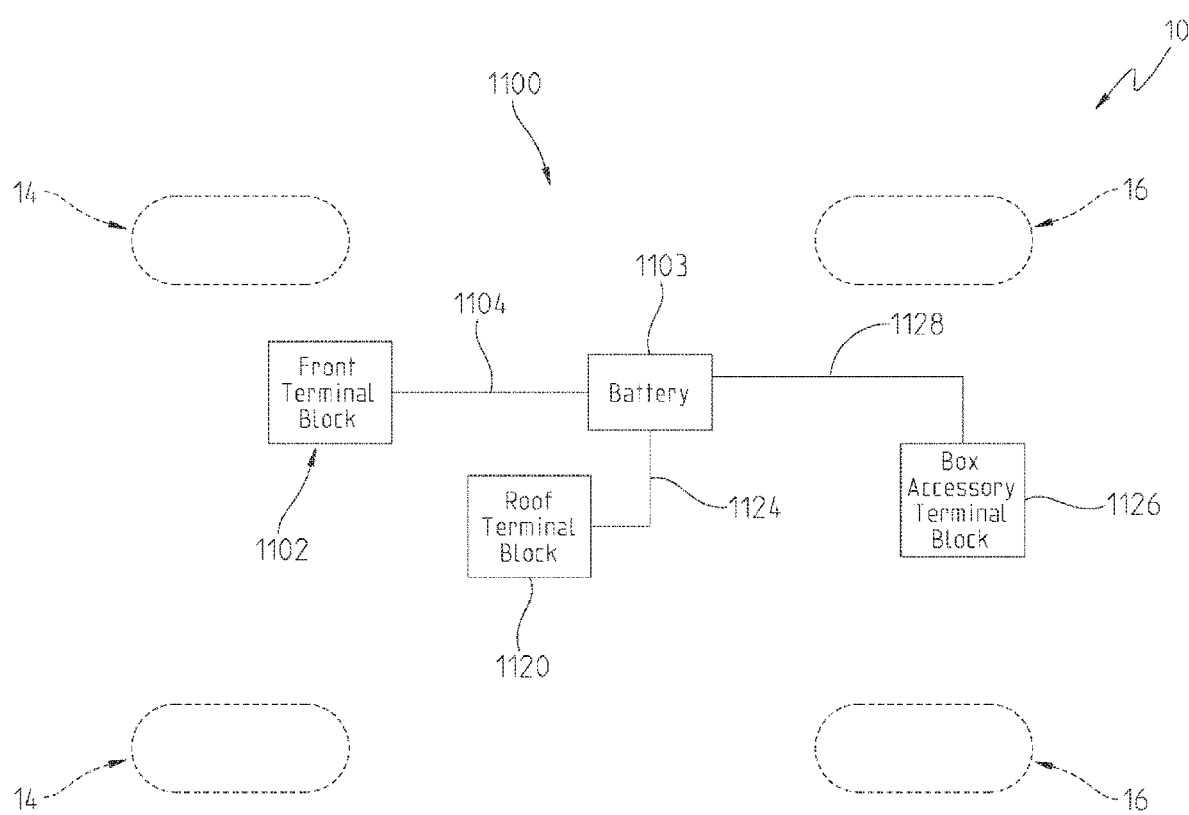
FIG. 49 is a schematic view of other locations for terminal blocks of the busbar system.
Figure 50:
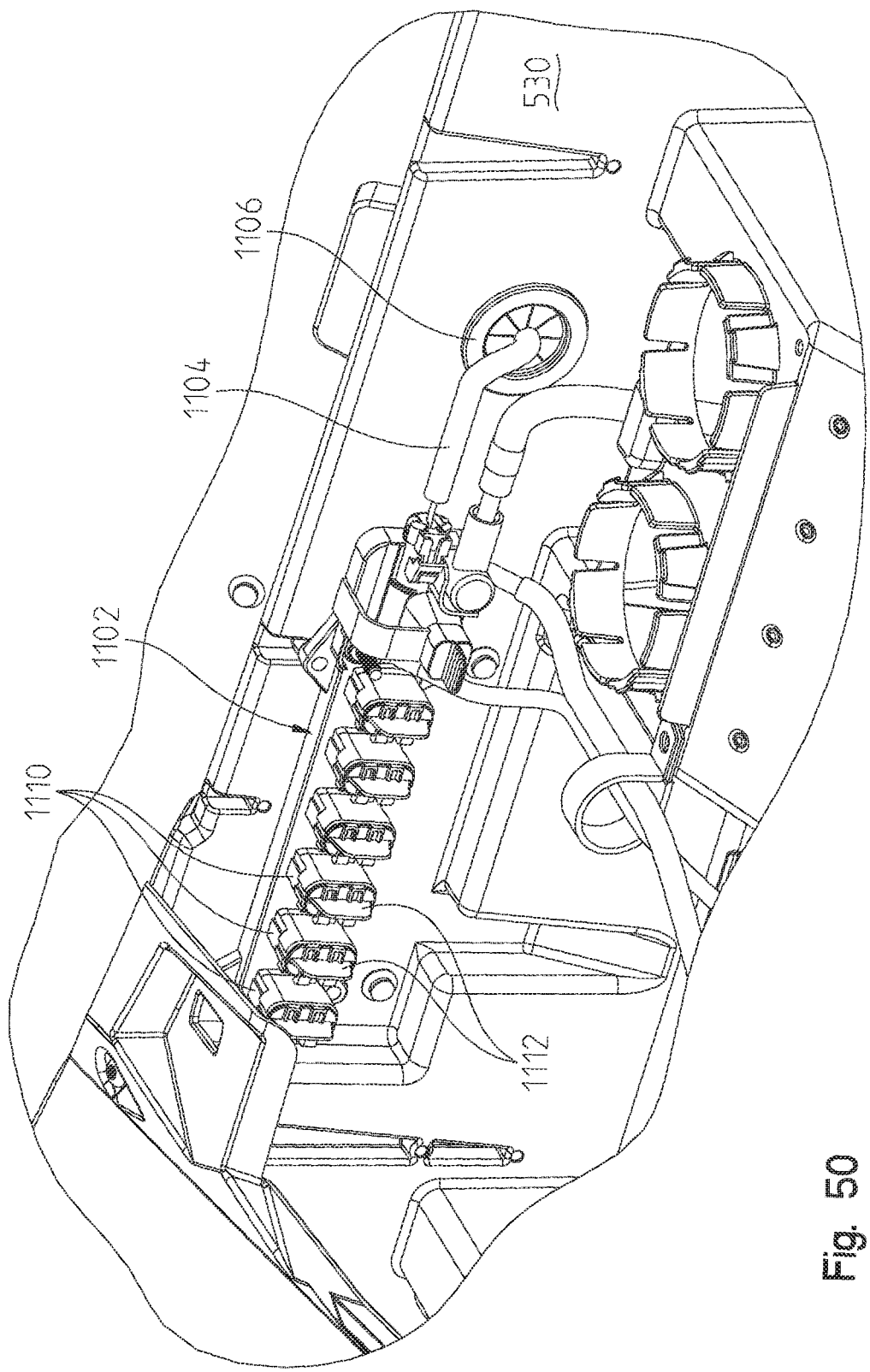
FIG. 50 shows a representative busbar electrical connection system located under the hood.

With reference to FIGS. 49-59, a busbar system 1100 is shown for the vehicle 10. As shown in FIG. 49, the system would comprise terminal blocks at various locations on the vehicle which are directly powered by the battery 1103. For example and as shown in FIG. 50, a front terminal block 1102 is located under the hood attached to panel 530 where terminal block 1102 is powered by a cable 1104 which runs through panel 530 and is sealed by seal 1106. Cable 1104 is coupled directly to battery 1103. Terminal block 1102 would include a plurality of outlets 1110 which would include electrical connectors for direct connection for accessories. As shown in FIG. 50, terminal block 1102 presently has 6 positions and a plurality of dust covers 1112 which may be removed to make the electrical connection. Such accessories for connection to terminal block 1102 could be a winch on the front bumper, specialized accessory lights such as fog lights, and the like. As shown in FIG. 49, other potential areas for a terminal block includes a roof terminal block 1120 coupled directly to the battery 1103 at 1124. Also a terminal block 1126 could be coupled at a position adjacent the rear box 56 and coupled to the battery 1103 by wiring 1128. The location for terminal blocks 1102, 1120 and 1126 are shown representatively in FIG. 49, and terminal blocks 1102 and 1120 are shown in detail in FIGS. 50-55 coupled to the cab frame 74.

Figure 51:
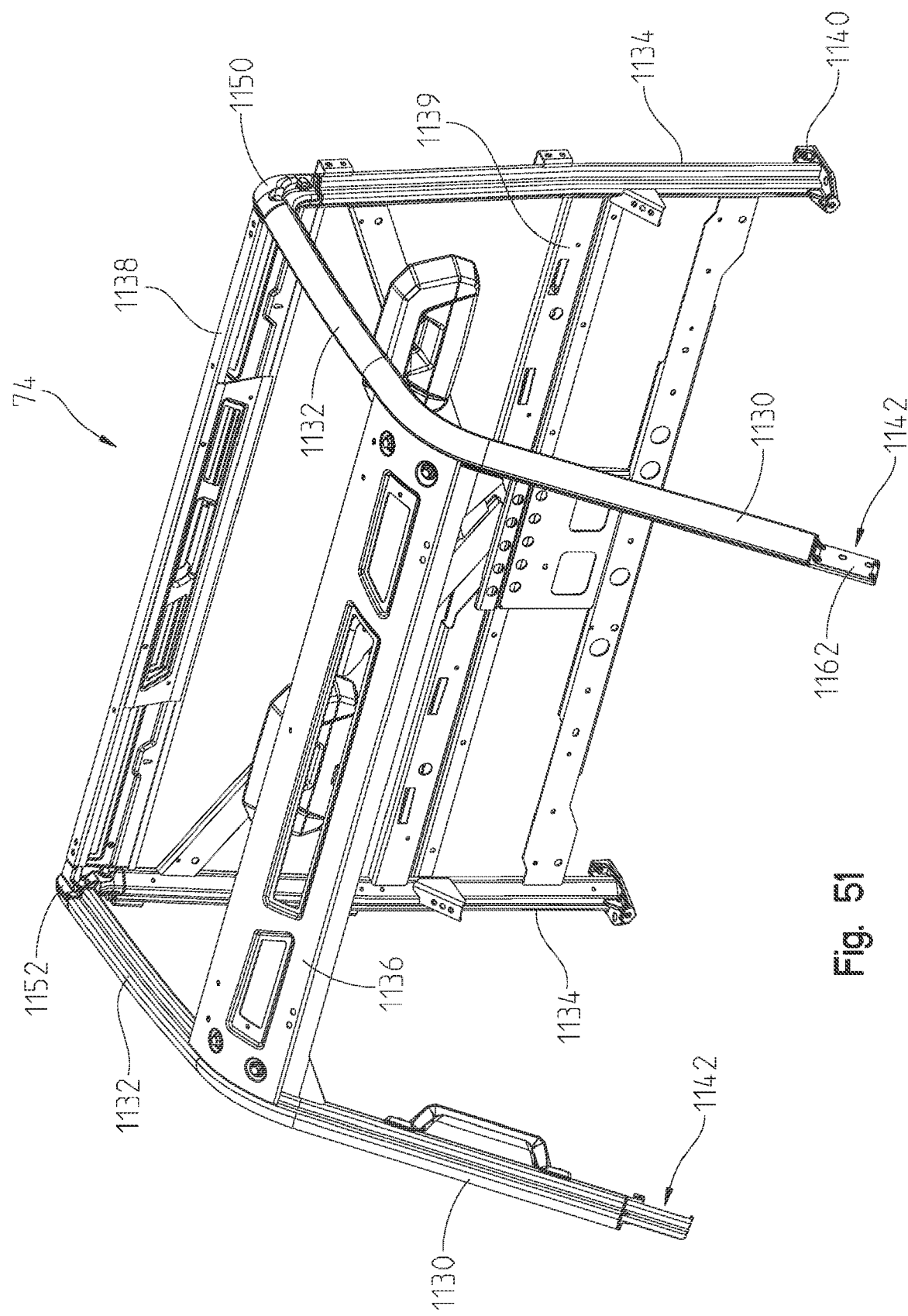
FIG. 51 shows a front left perspective view of the cab frame of the vehicle.

As shown in FIG. 51, cab frame 74 includes front posts 1130, upper posts 1132, rear posts 1134, front transverse channels 1136, and rear transverse channels 1138 and 1139. Rear posts 1134 include brackets 1140 which couple directly to the rear cab frame couplings 90 (FIG. 3). Front posts 1130 have insert couplers 1142 which couple to front cab frame couplings 88 (FIG. 3). Rear couplers couple posts 1132, 1134, and 1138 together and include outside couplers 1150 and inside couplers 1152, where a pair of couplers 1150, 1152 are on each side of the cab frame 74 as described herein. It should also be appreciated that the posts 1130 and 1134 are extruded such that the extrusion forms a hollow passage in the post, such that accessory wiring may be routed through the posts. While transverse channels 1136 and 1138 are fabricated metal, such as a sheet metal stamping, they too are hollow such that accessory wires may be routed through the transverse channels 1136, 1138 and 1139. It should also be appreciated that the couplers 1142 and 1152 are also provided with openings, such that accessory wiring may be routed upwardly through the insert couplers 1142, 1152 and into their representative posts 1130, 1138 as described herein.

Figure 52:
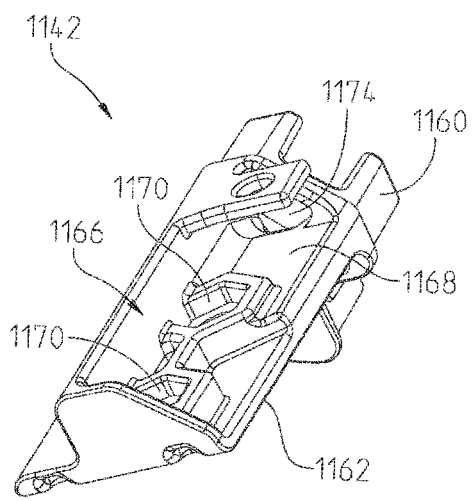
FIG. 52 shows an enlarged perspective view of the coupler insert which connects the front tubes of the cab frame to the vehicle frame.
Figure 53:
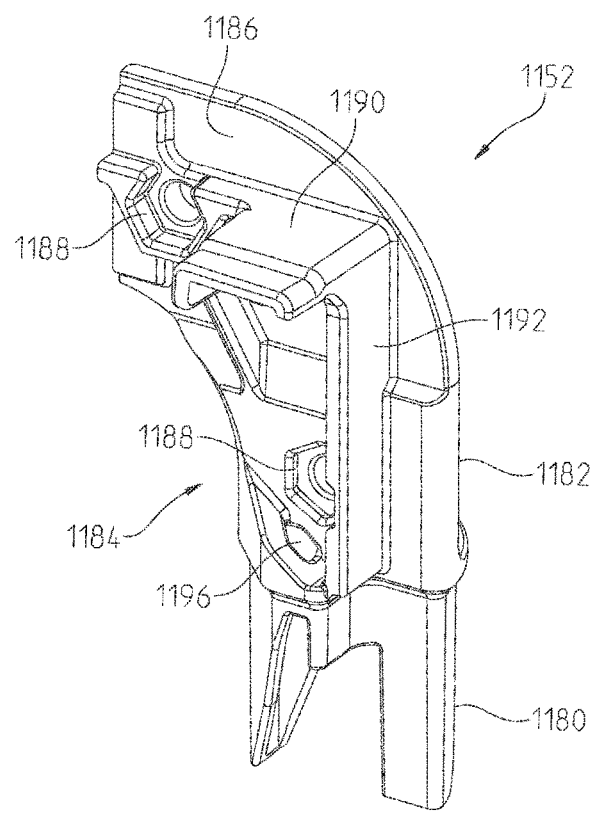
FIG. 53 shows an enlarged perspective view of the coupler insert for the top rear of the cab frame.

With reference now to FIG. 52, insert coupler 1142 is shown having a coupler end 1160 which extends up into the post 1130 such that it is not shown in FIG. 51. Coupler 1142 also includes a connection face at 1162 which would couple to its complementary face 1164 (FIG. 3). On the opposite side of face 1162, an inner structure 1166 is defined having a surface 1168 which is opposite from face 1162 and includes two fastener receiving recesses 1170 for receiving such a fastener as a nut, not shown, which would couple the cab frame 74 to the frame 12 with a complementary fastener. Inner structure 1166 further includes an opening at 1174 which allows a wire to pass through the insert coupler 1142 and upwardly into the post 1130.

Figure 54:
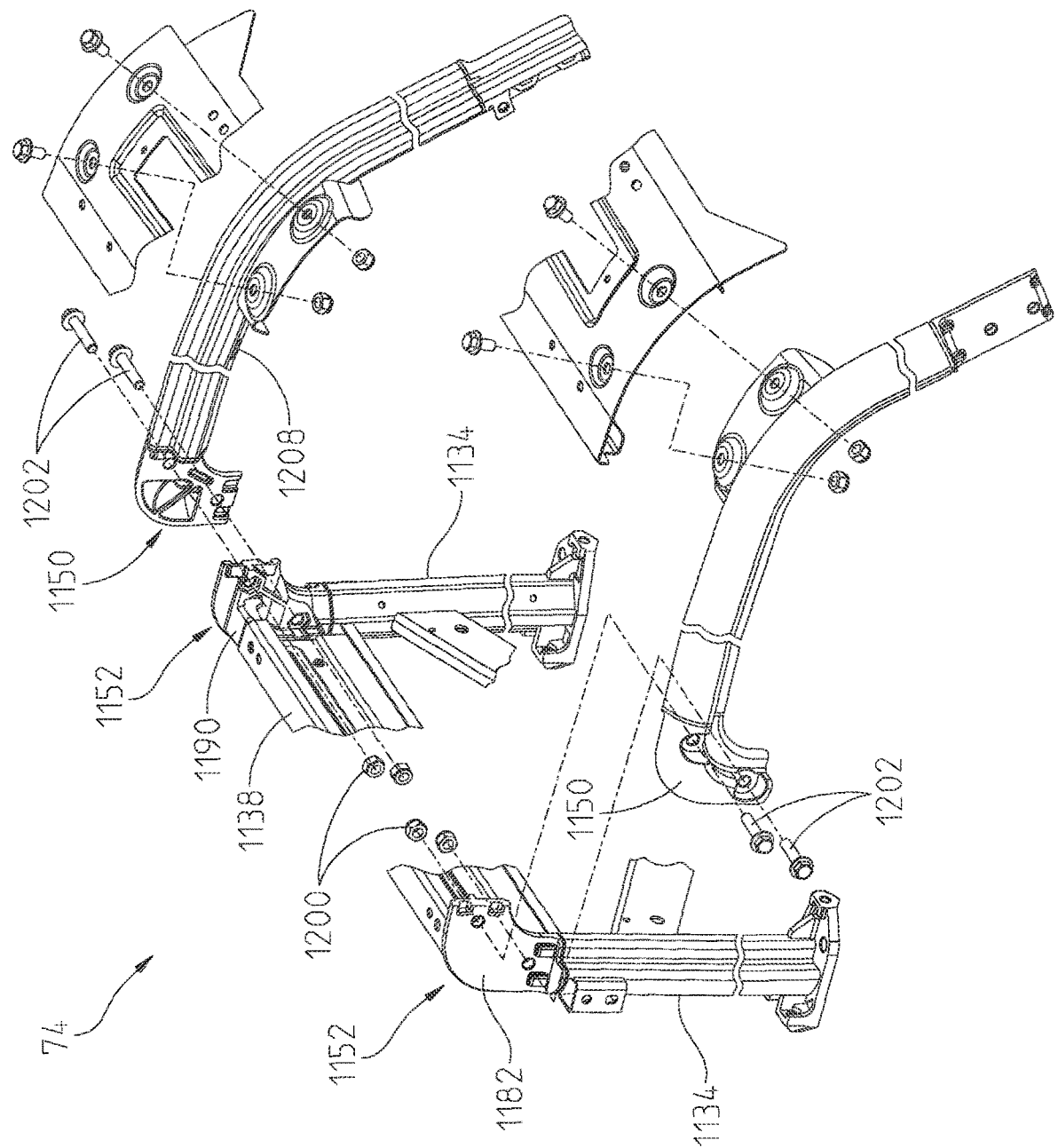
FIG. 54 shows an exploded view of the cab frame showing the location for accessory wire routing.

In a like manner, insert coupler 1152 includes a coupler portion 1180 which would be inserted into the top end of post 1134, and has an outer face at 1182 (FIG. 54) providing a mounting face for outer coupler 1150. Coupler 1152 further includes an inner structure 1184 having a surface 1186 opposite surface 1182 and includes fastener receiving recesses 1188 for receiving fasteners as described above. Coupler 1152 also includes an upper horizontal wall 1190 and a vertical wall 1192 which are profiled to receive an end of channel 1138 thereover as shown in FIG. 54. Insert 1152 further includes an aperture 1196 which extends through insert end 1180 which would allow an accessory wire to pass upwardly from post 1134 and into channel 1138 through the insert coupler 1152. FIG. 54 shows an exploded view of the cab frame 74 which is partially broken away showing the outer couplers 1150, inner couplers 1152 being coupled by way of fasteners 1200, 1202. Finally, and with reference to FIG. 50, it is anticipated to have a further terminal block 1130 positioned adjacent to a rear of the vehicle beneath the cargo area 56.

With reference now to FIGS. 55-58, the main wiring for the terminal block 1120 will be described. As shown, terminal block 1120 is shown positioned at an area adjacent to transverse channel 1138. Main wiring 1124 is shown running up the rear rail 1134. A connector assembly 1220 includes a header connector 1222 (FIG. 58) and a socket connector 1224. Socket connector 1224 is coupled to wiring harness 1226 which includes wire 1228 coupled to battery 1103. With the terminal blocks 1102 and 1120 in position and wired to the battery 1103, accessory wiring can be coupled to the terminal blocks for various accessories.

For example, it would be advantageous to have a wire 1230 coupled to terminal block 1102 by way of a connector 1234. The cable could either run up the outside of the post 1130 or through the post as described above. This connection would terminate adjacent position 1240 in front transverse channel 1136, for example for coupling when an accessory windshield and windshield wiper are provided. Thus, a wire could be routed upwardly through one of the posts 1130 and out of aperture 1208 as seen in FIG. 54.

In a similar manner, an accessory wire 1250 (FIG. 57) is shown coupled to terminal block 1120 by way of connector 1252 and be coupled to the transverse rail 1138 by clips 1254, and terminate in connectors 1260. The connectors 1260 could be used to access power for such items as overhead lights, etc. Wire organizers 1262 may also be provided for bundling the wires 1124 and 1250 and organizing them relative to the transverse channel 1138. Terminal block 1120 could be coupled to an overhead roof of the vehicle (not shown) or to the transverse rail 1138.

Figure 55:
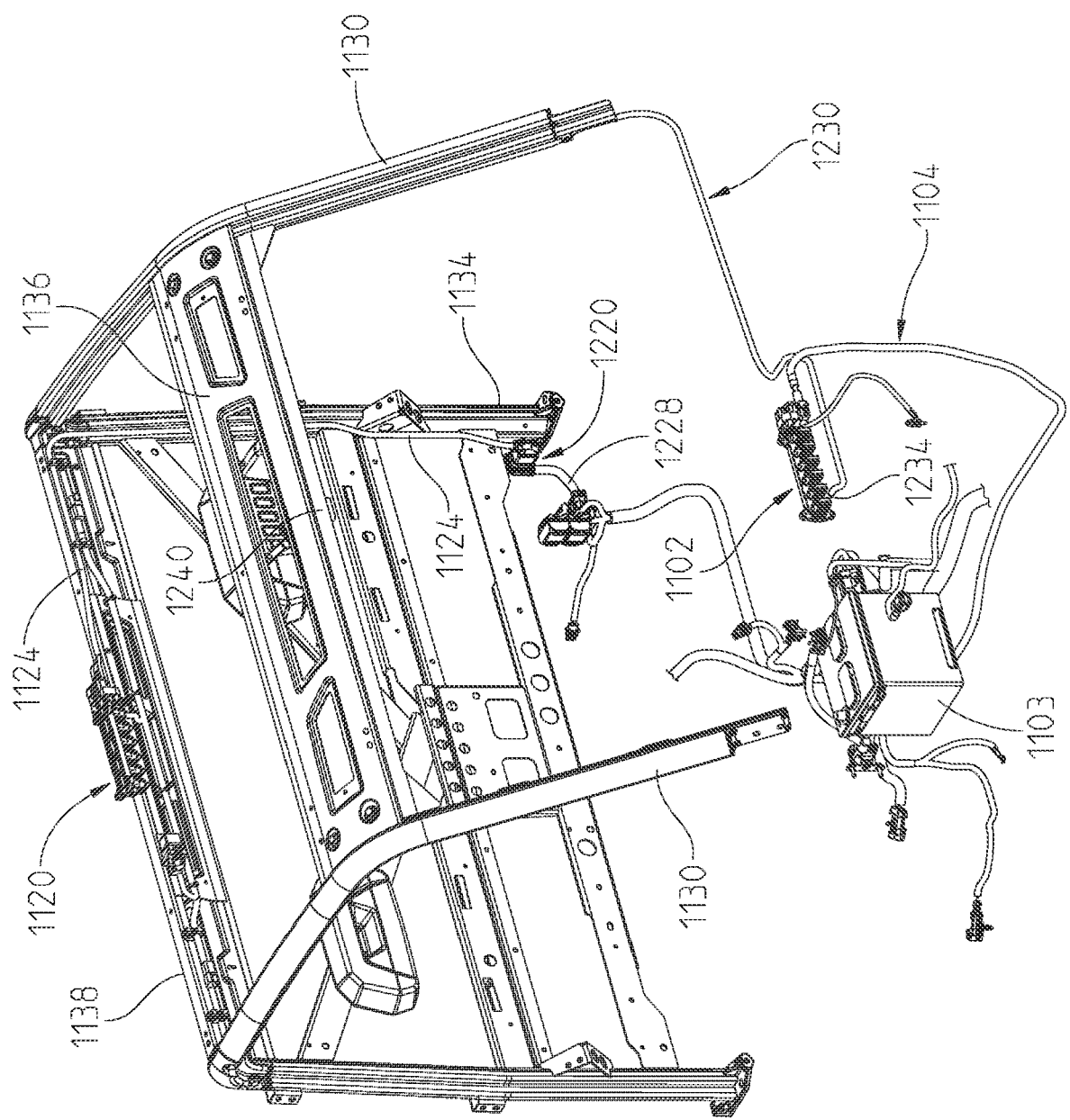
FIG. 55 shows a right front perspective view of the cab frame and busbar system.
Figure 56:
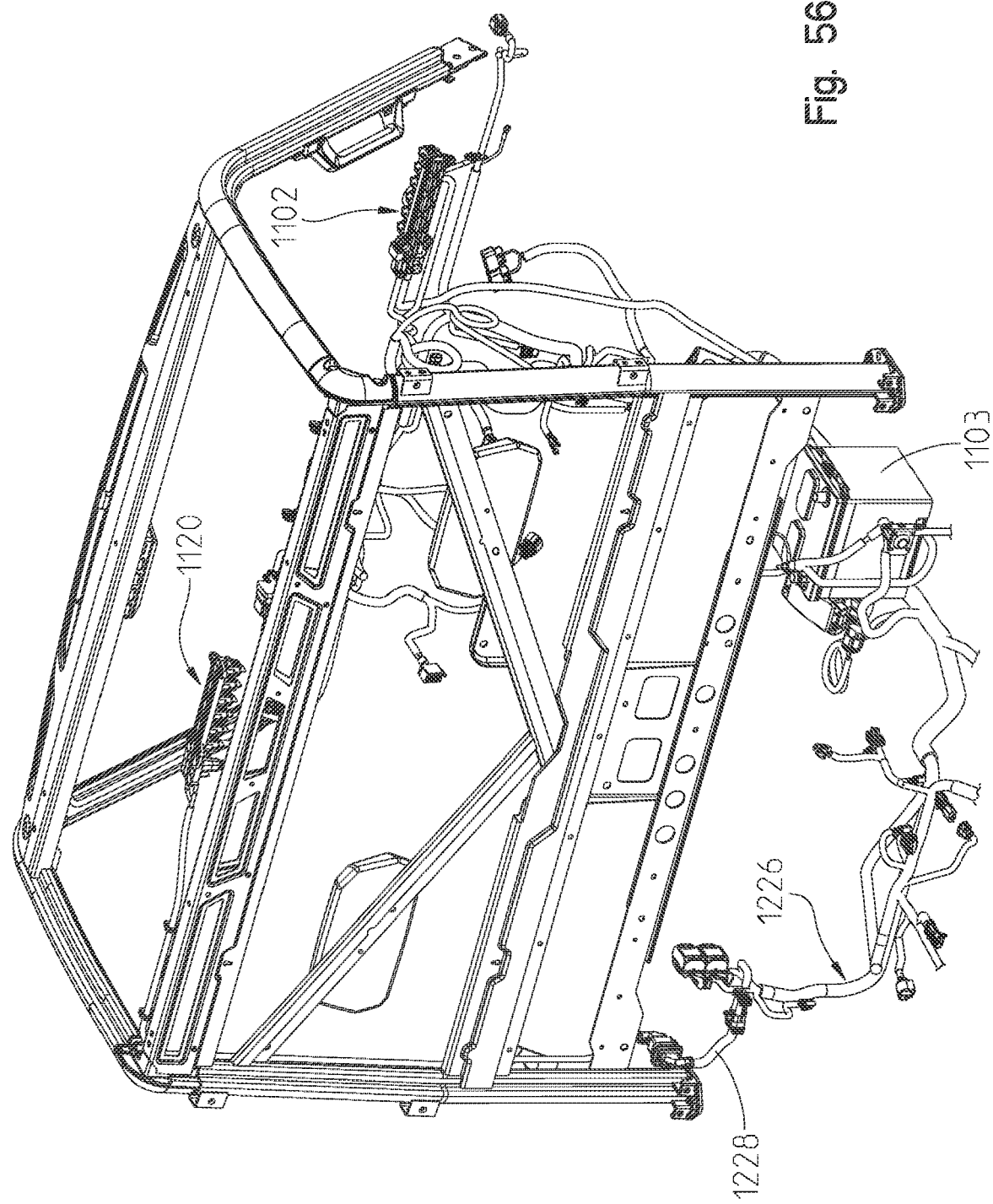
FIG. 56 shows a right rear perspective view of the cab frame and busbar system.
Figure 57:
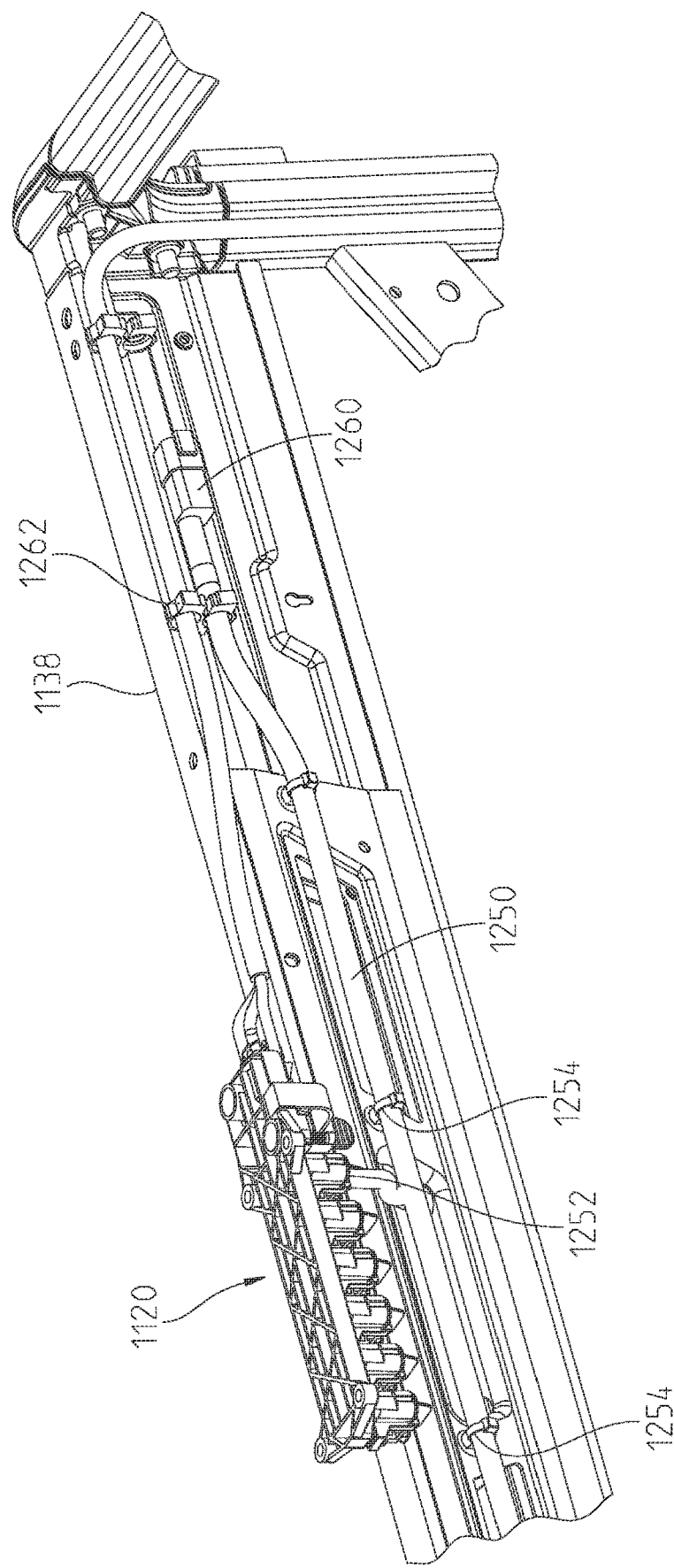
FIG. 57 shows an enlarged front perspective view of the roof terminal block.
Figure 58:
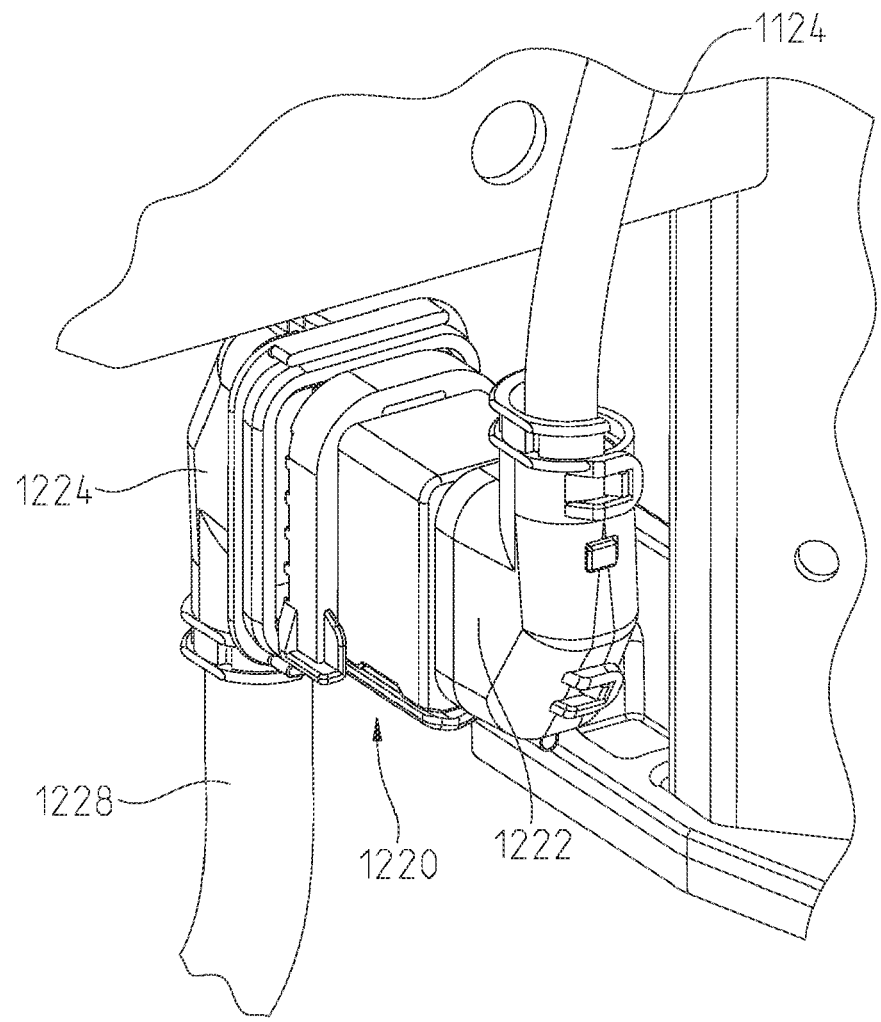
FIG. 58 shows the main wiring coupling for the roof terminal block.
Figure 59:
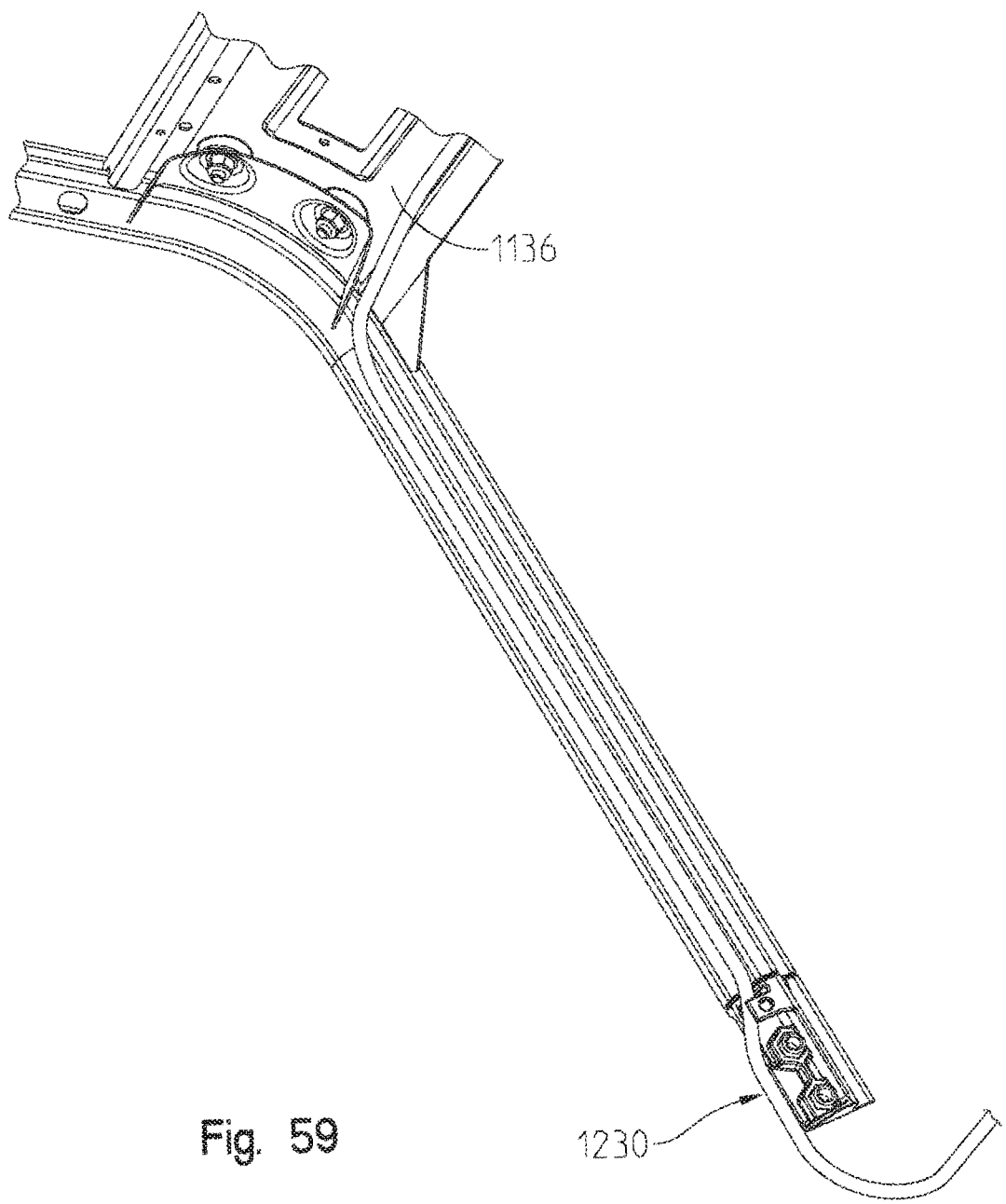
FIG. 59 shows wiring for a front overhead position.
Figure 60:
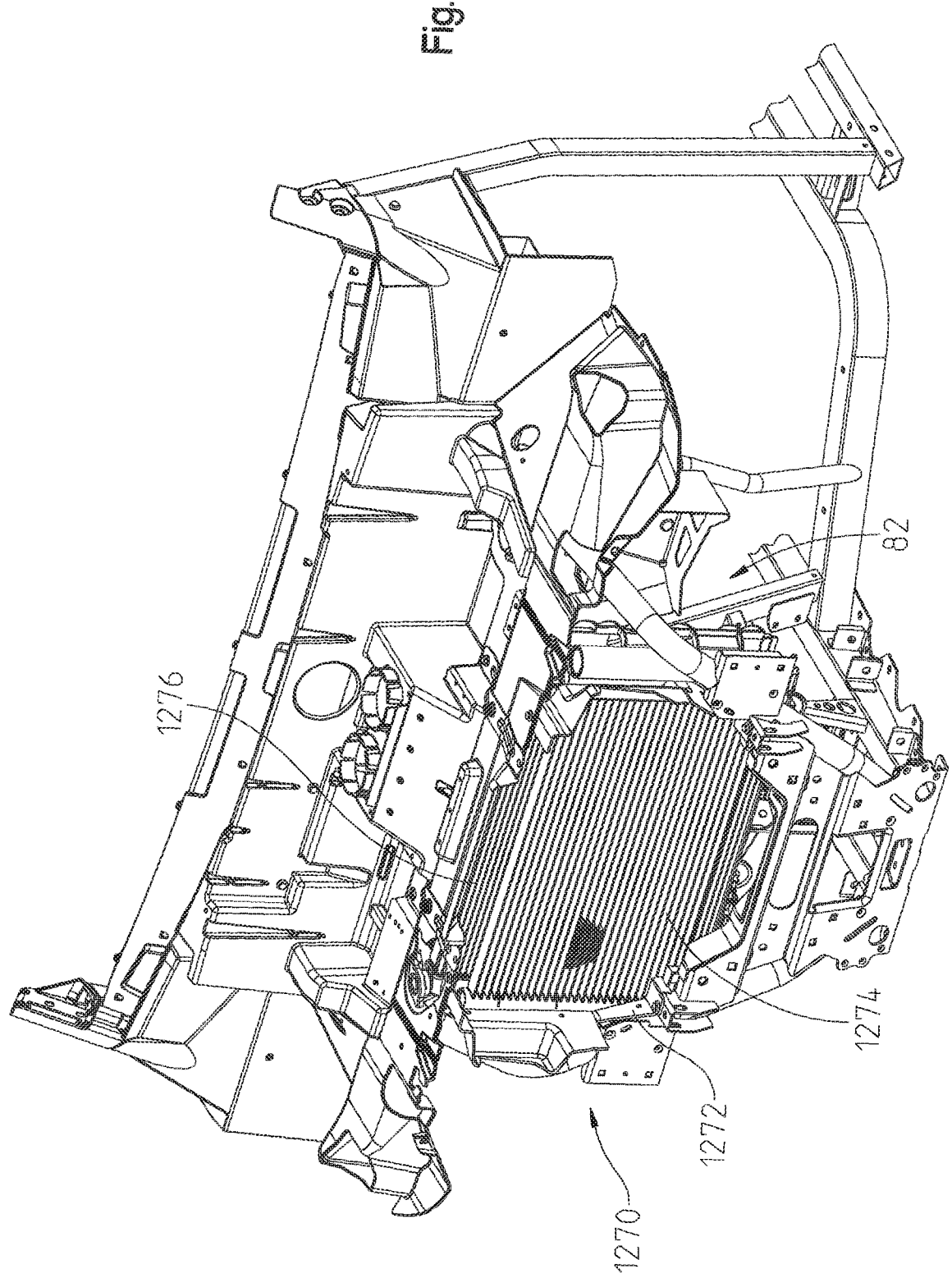
FIG. 60 shows a front left perspective view of the cooling system of the vehicle.
Figure 61:
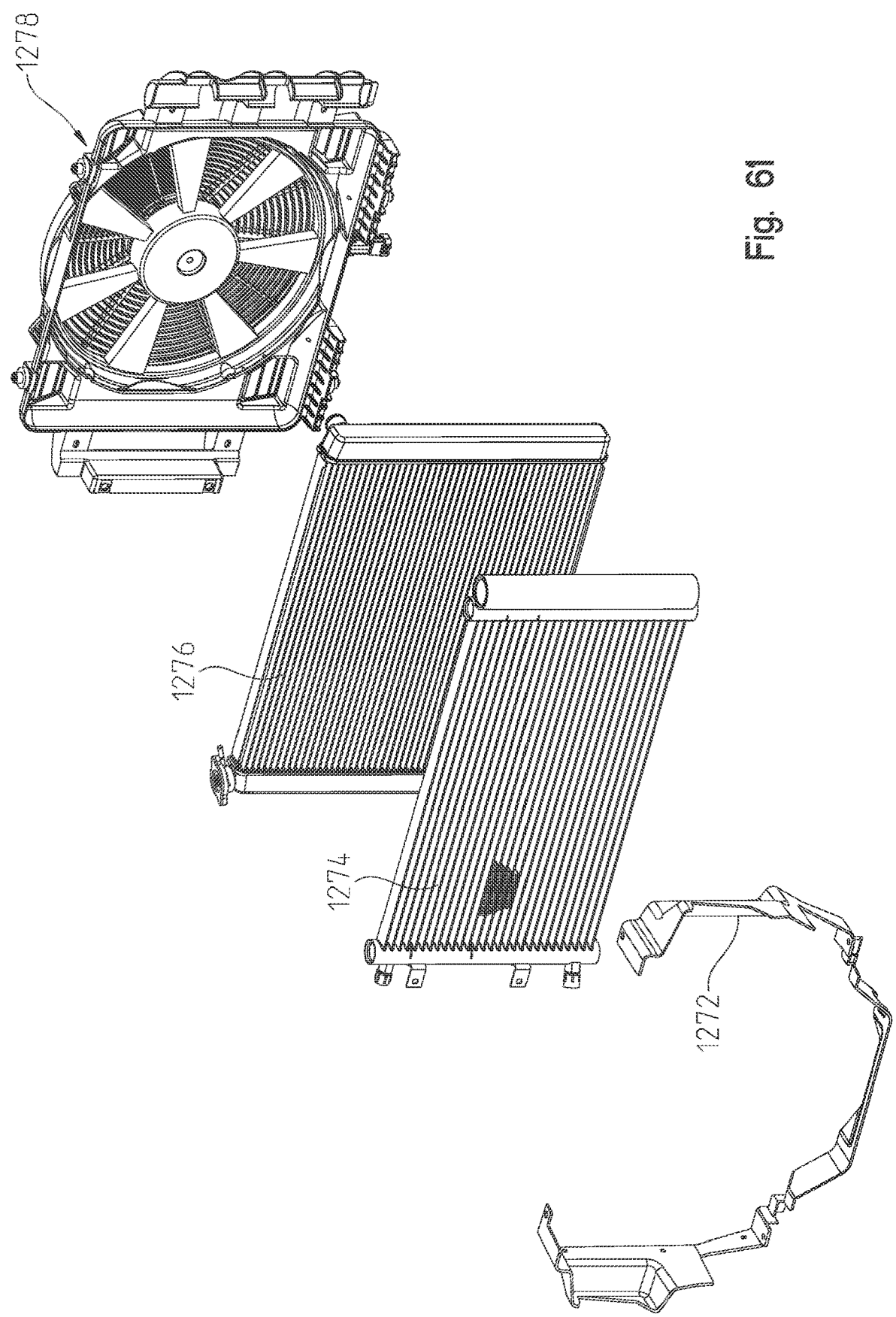
FIG. 61 shows an exploded view of the cooling system of FIG. 55.

With reference now to FIGS. 60 and 61, a cooling system of the vehicle is shown at 1270 including a mounting bracket 1272, a first heat exchanger 1274, a second heat exchanger 1276, and a fan at 1278. As shown in FIG. 55, bracket 1272 couples heat exchangers 1274, 1276 to the front frame portion 82. While not seen in FIG. 55, fan 1278 is positioned behind first and second heat exchangers 1274, 1276 to draw air through the heat exchangers as is known in the art. The fin density of the first heat exchanger 1274 is narrower than the fin density of the second heat exchanger 1276 to allow particles to be caught in the first heat exchanger 1274 and not pass and be caught by the second heat exchanger 1276.

Figure 62:
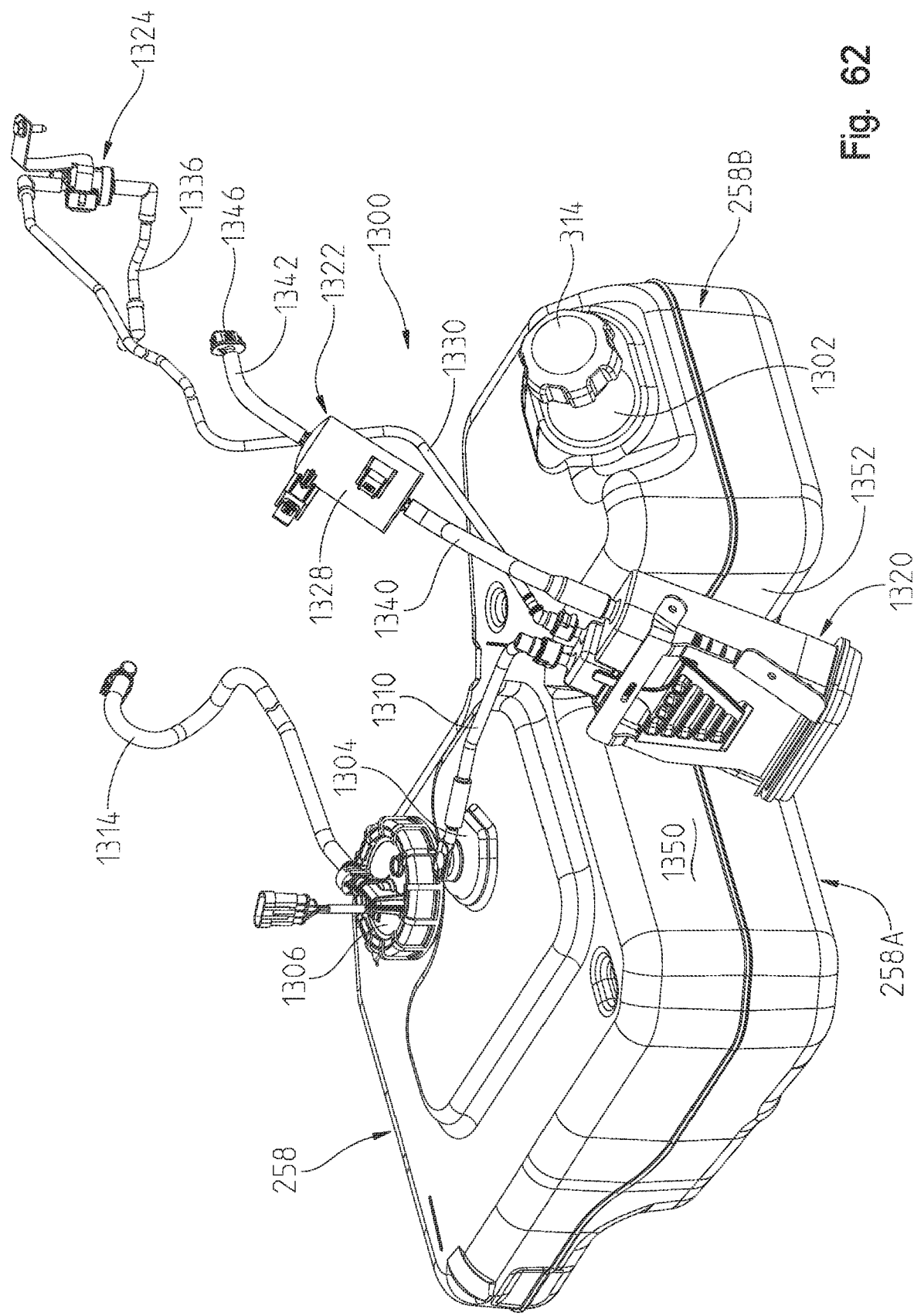
FIG. 62 shows a fuel evaporation system coupled to the fuel tank and positioned under the driver seat.
Figure 63:
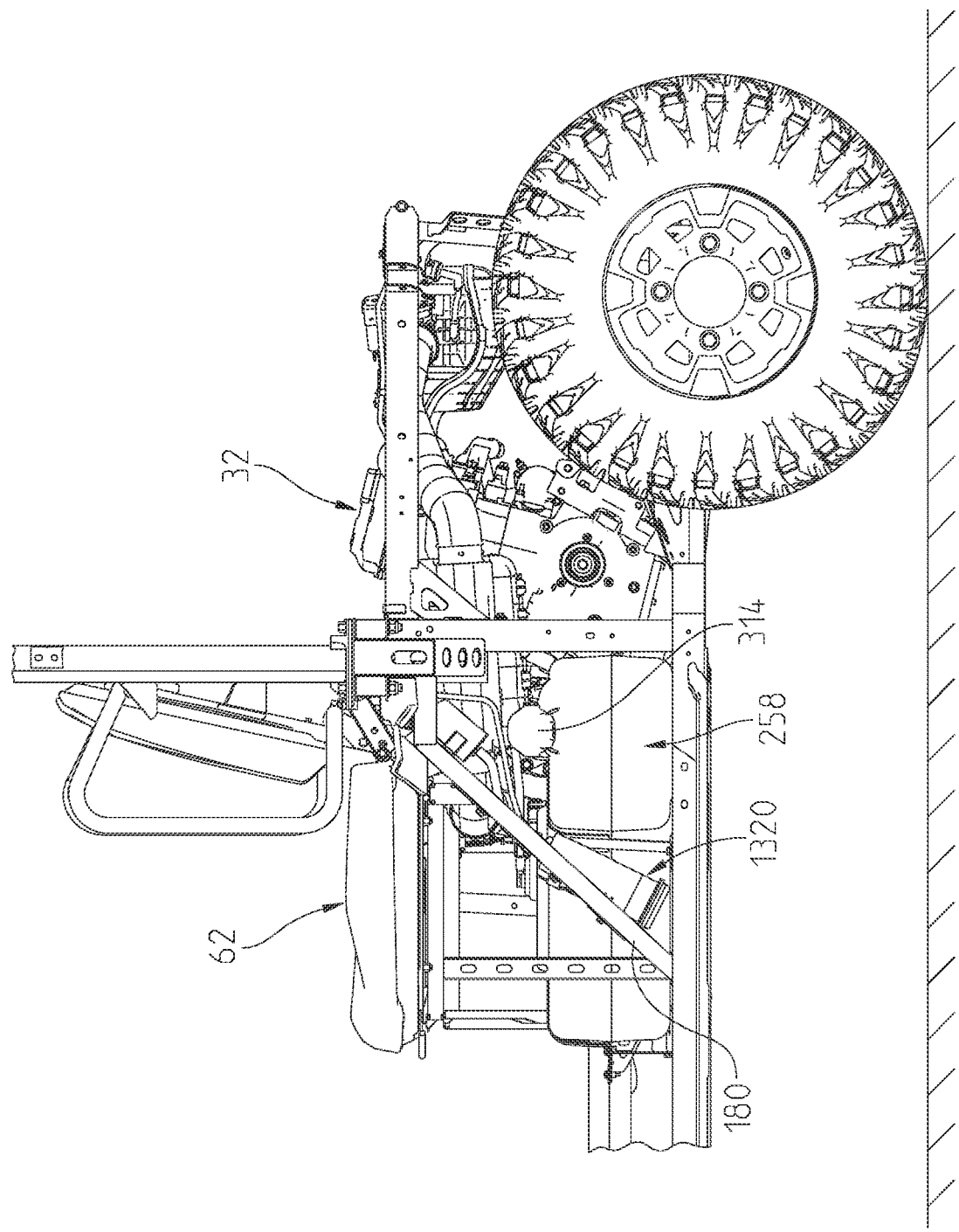
FIG. 63 shows a side view of the vehicle shown in FIG. 62.
Figure 64:
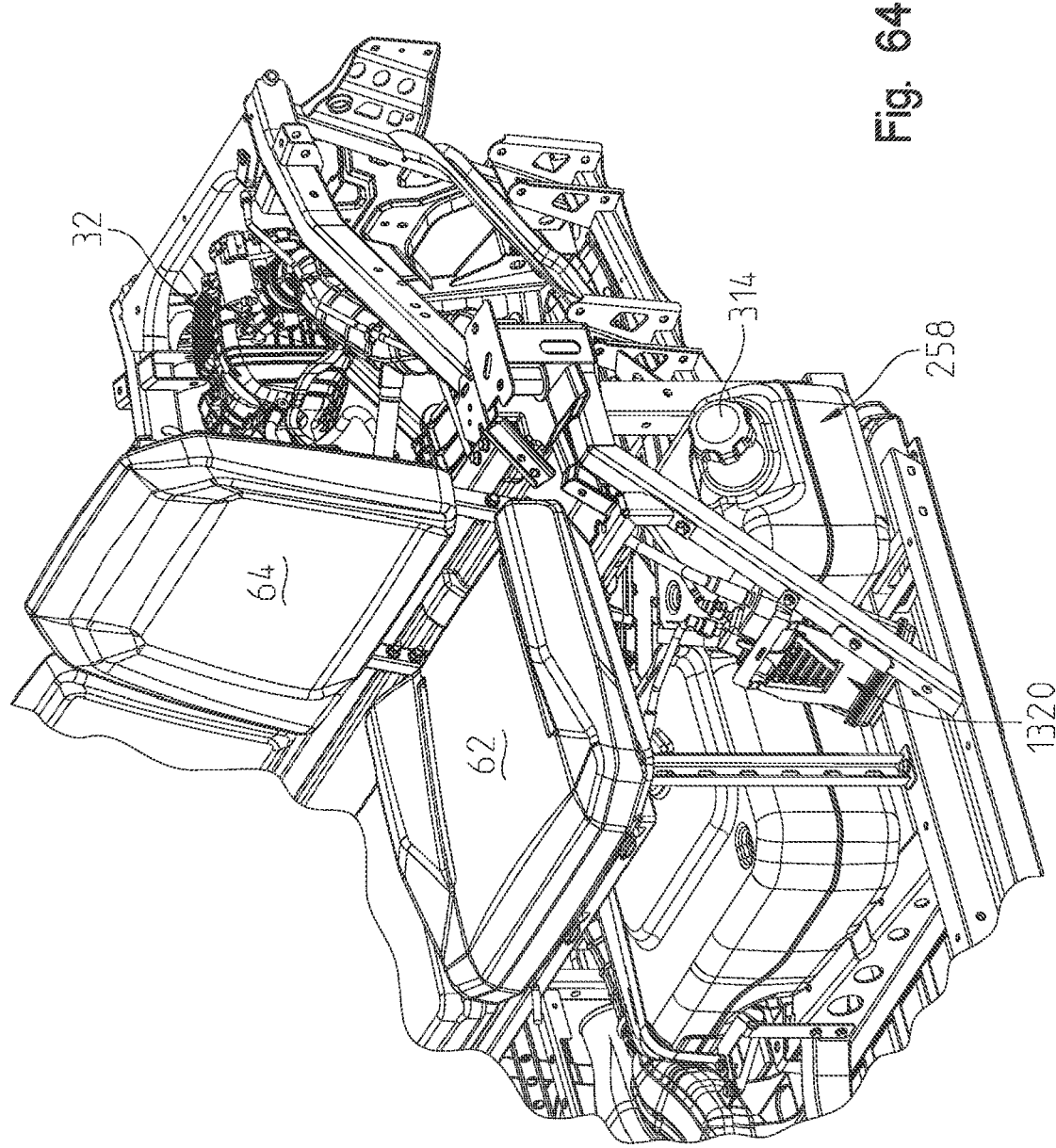
FIG. 64 shows the fuel evaporation canister.

With reference now to FIGS. 62-64, a fuel evaporative system of the disclosed vehicle will be described in greater detail. The evaporative system is shown generally as 1300 and could be operative in the manner described in U.S. patent application Ser. No. 15/387,662, the subject matter of which is incorporated herein by reference.

With reference now to FIG. 62, fuel tank 258 includes a fill tube 1302, a roll over valve 1304, and a fuel pump 1306, and is generally positioned below seat bottom 62b (FIG. 62). Fill tube 1302 of fuel tank 258 is configured to receive liquid fuel from a fuel delivery apparatus, and generally includes cap 314 for containing both liquid fuel and fuel vapor within fuel tank 258. Furthermore, fill tube 1302 is generally accessible from a side of vehicle 10, as best herein in FIG. 1.

Roll over valve 1304 of fuel tank 258 is configured to allow venting of fuel vapors collecting within fuel tank 258, and prevent liquid fuel from escaping fuel tank 258, specifically in the case of vehicle 10 overturning. Accordingly, roll over valve 1304 prevents liquid fuel from entering a fuel vapor line 1310 configured to receive fuel vapor from fuel tank 258 through roll over valve 1304. Fuel pump 1306 of fuel tank 258 is configured to deliver liquid fuel from fuel tank 258 to engine 32 through fuel delivery line 1314 based on the operating conditions of vehicle 10, for example based on information received from the throttle controls.

Still referring to FIGS. 62-64, evaporative system 1300 includes an evaporation canister 1320 configured to receive and/or store fuel vapor received from fuel tank 258, a fresh air intake 1322 coupled to evaporation canister 1320 and configured to provide fresh ambient air for mixing with the fuel vapor within evaporation canister 1320, an air filter 1328 fluidly coupled to fresh air intake 1322, a purge valve 1324 coupled to evaporation canister 1320 by way of fuel vapor line 1330 and configured to control the amount of fuel vapor delivered to engine 32 from evaporation canister 1320 through line 1336. While not shown, a mixing volume could be provided and configured to mix fuel vapor provided from fuel tank 258 and/or evaporation canister 1320 with air. It should be appreciated that the fuel is delivered to throttle bodies of the engine 32.

Evaporative system 1300 is configured such that fuel vapor from fuel tank 258 travels through roll over valve 1304 and fuel vapor line 1310 to evaporation canister 1320. Evaporation canister 1320 adsorbs and stores the fuel vapors from tank 258 until purge valve 1324 is opened allowing fuel vapors and air to travel through fuel vapor line 1336 to the throttle bodies. Evaporation canister 1320 is also coupled to fresh air intake 1322 through air intake line 1340 such that ambient air is pulled into evaporation canister 1320 through air filter 1328, positioned along air intake line 1342, to mix with the fuel vapors within evaporation canister 1320 when purge valve 1324 is opened. Air intake line 1342 has a fitting 1346 at an intake end coupled to a frame tube of frame assembly 12 to prevent spiders or debris from entering air intake line 1342.

Furthermore, as shown in FIGS. 62-64, evaporation canister 1320 is generally positioned in close proximity to fuel tank 258. A shorter connection path between the fuel tank 258 and evaporation canister 1320 is advantageous. This shorter path through line 1310 allows for quicker venting through the evaporation canister 1320 and less air restriction from the bends in the line 1310. This is particularly true if the ORVR regulation gets implemented. This same reasoning also applies to the very short line 1340 which vents the system to atmosphere.

Furthermore, the shorter the line 1310, the less fuel permeation there is through the line surface. This leads to less overall evaporative emissions for the vehicle. The load line always has fuel vapor in it unlike the purge lines. This can also allow for the use of low perm rubber line between the fuel tank and canister (which is not as low perm as nylon fuel line). The advantage of low perm rubber line is the tooling to form it is much quicker than nylon line. In this case, where the line is so short, a formed rubber line is not necessary to control routing. Therefore the canister position is advantageous for time to production.

The mounting location of the evaporative canister 1320 is generally advantageous for cost because of the short line lengths leading to less material to make the part as well as smaller tools. The location is generally advantageous because it is simple routing that is easy for the manufacturing line, reducing cost and time associated with manufacturing controls. Routing is better controlled with shorter lines and the canister 1320 and fuel tank 258 are exposed to the same dynamic inputs/vibration. This reduces the stress or strain on the line 1310 connecting the fuel tank 258 and canister 1320 and the line 1340 connecting the canister 1320 to the filter 1328 and the line 1342 connecting the filter 1328 to the chassis frame 12 through fitting 1346.

The mounting location of the evaporative canister 1320 also protects the canister 1320 on multiple sides from road debris. The fuel tank 258 protectings two sides of the evaporative canister 1320. That is, fuel tank portion 258A has a surface 1350 and fuel tank portion 258B has a surface 1352 which encompasses the evaporative canister 1320, while the rear sideboard 52, pedestal portion 400, skid plate (not shown), and floor 50 protect the other portions of the evaporative canister 1320.

Figure 65:
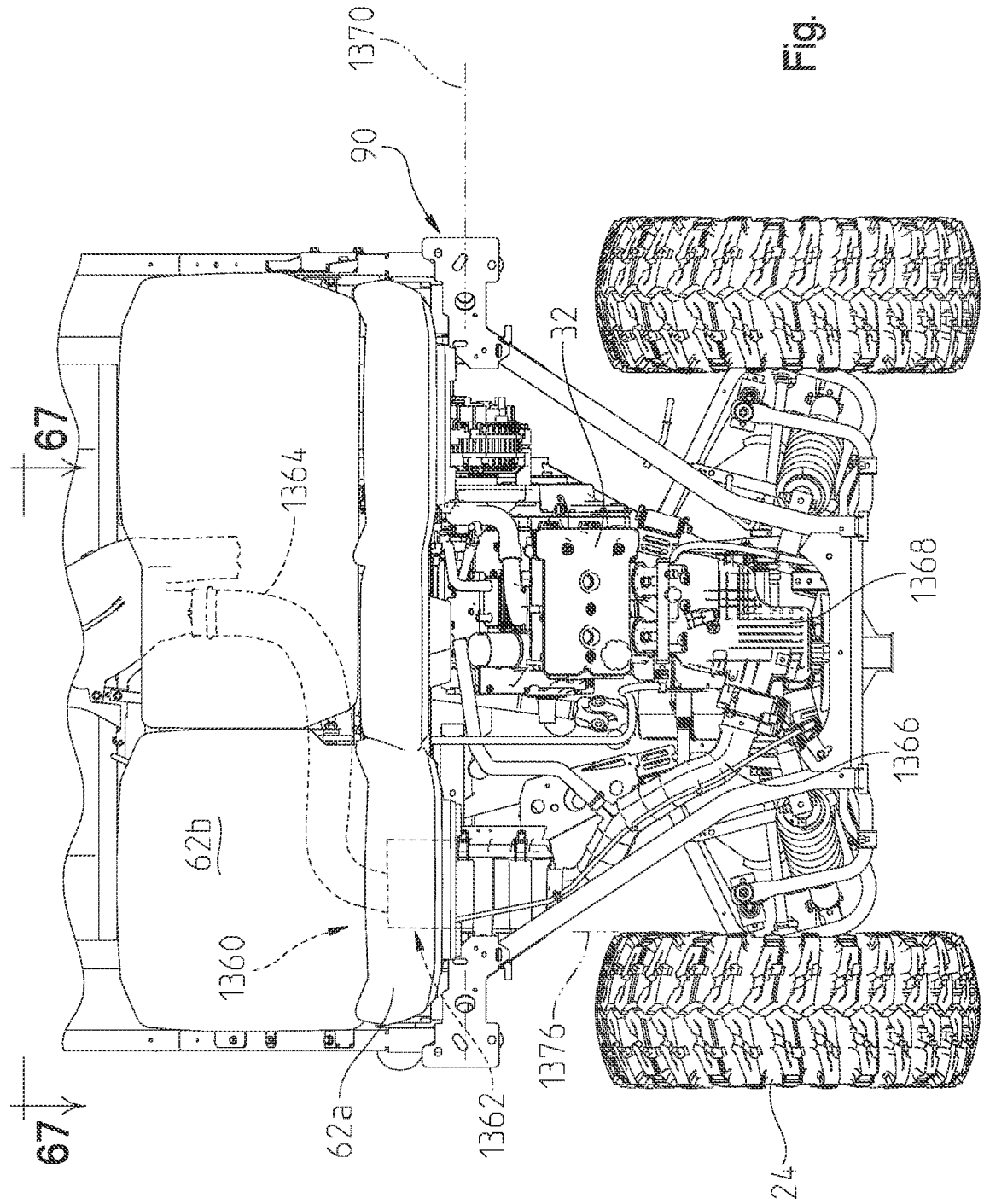
FIG. 65 shows a top view of the vehicle with the vehicle body panels removed.
Figure 66:
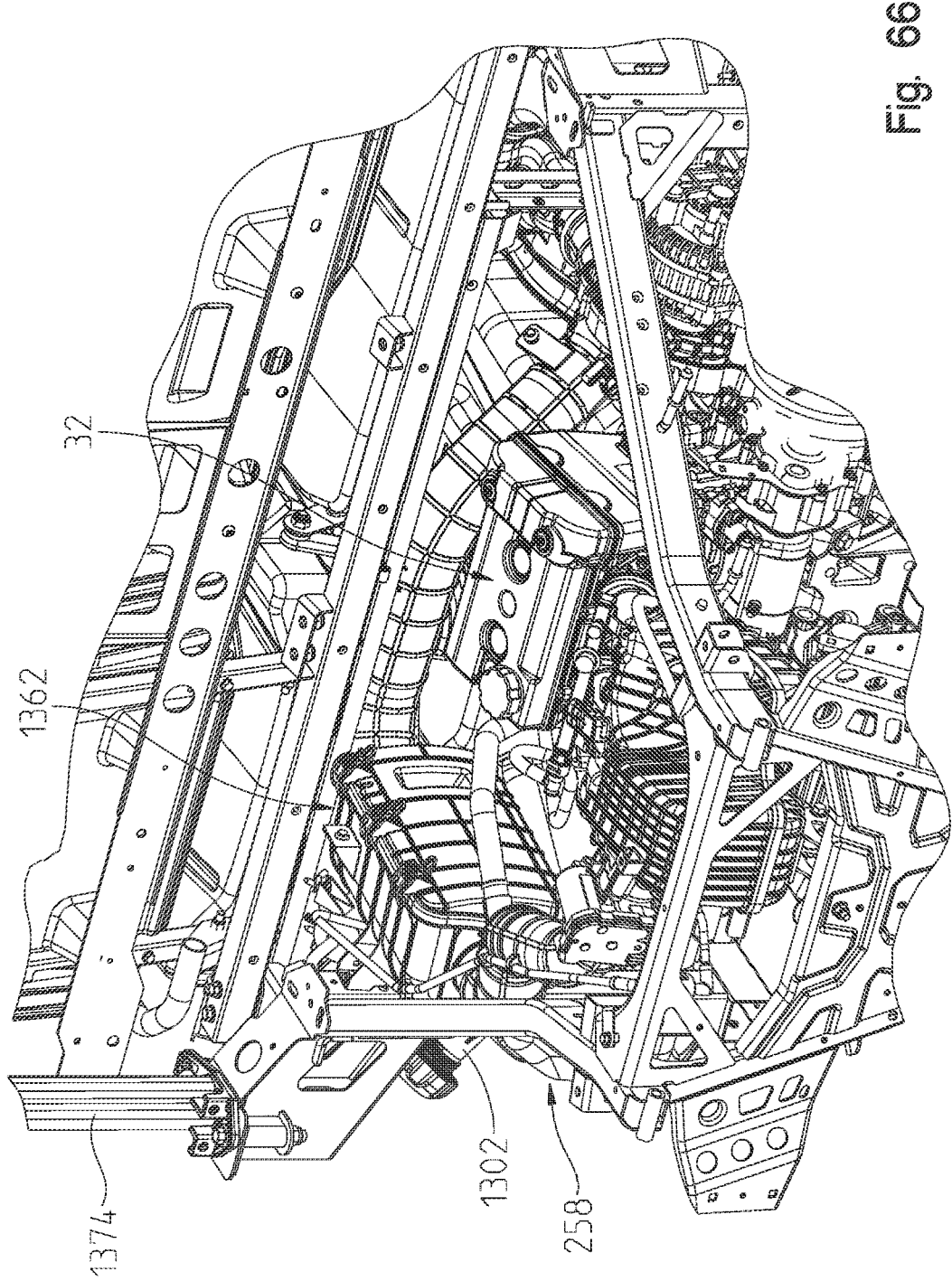
FIG. 66 shows a rear right perspective view or the vehicle of claim 65.
Figure 67:
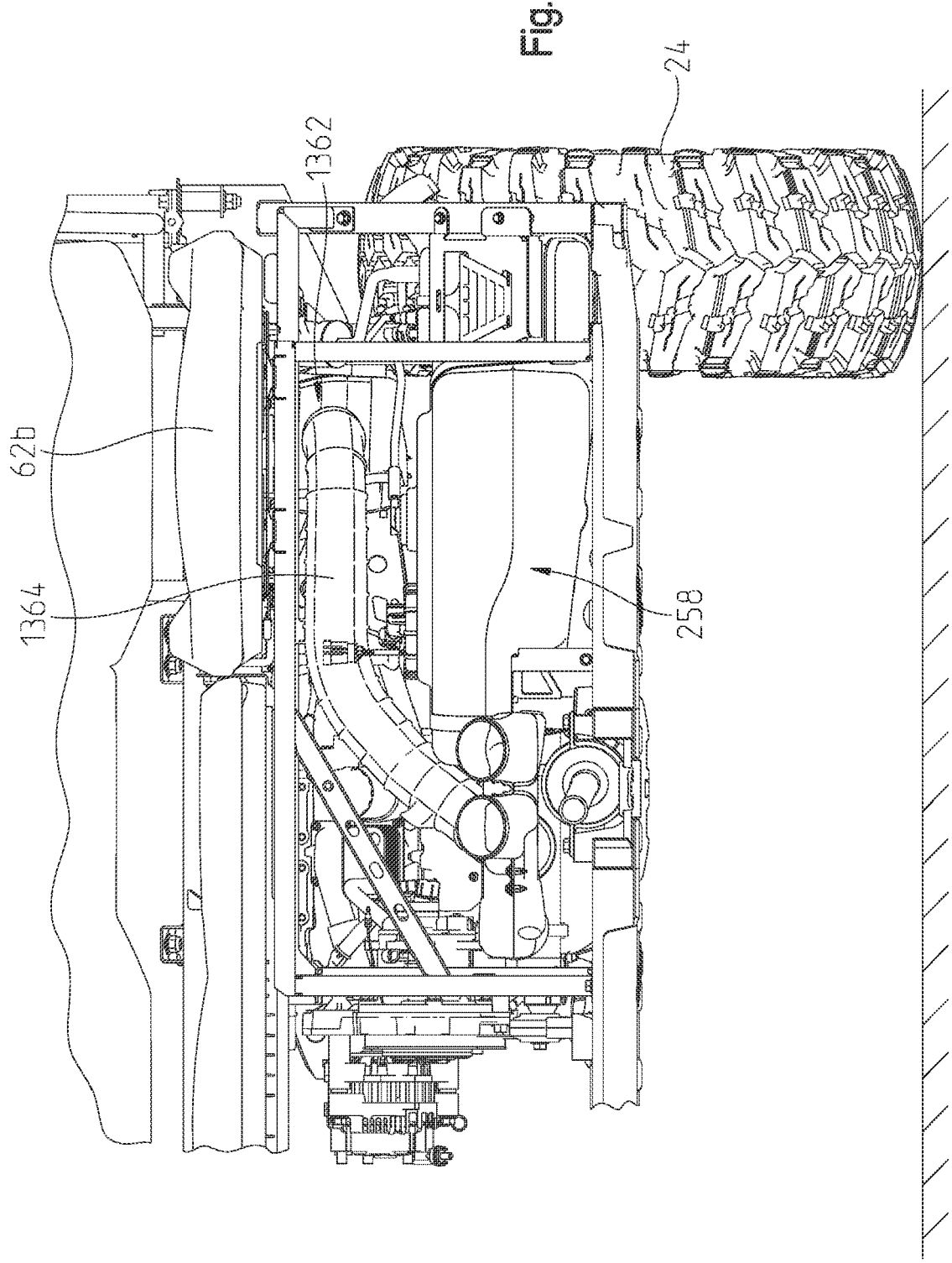
FIG. 67 shows a view shown by arrows 67-67 of FIG. 65.

With reference now to FIGS. 65-67, an air intake system 1360 of the present vehicle will be described. As shown, the air intake system includes an air box 1362 positioned adjacent to engine 32, having a duct 1364 to receive fresh air from a position adjacent a front of the vehicle, and a duct 1366 to feed air plenum 1368. As shown, air box 1362 is positioned at least partially under the driver seat bottom 62b. A line 1370 is shown which represents a centerline of the rear posts 1374 (FIGS. 1, 2 and 66) and airbox is at least partially forward of and at least partially rearward of, line 1370. Airbox 1362 is also inside of a line 1376, which is the innermost position of rear tire 24, which prevents rocks and debris from striking the airbox 1362. As shown in FIG. 67, the airbox 1362 is vertically higher than the fuel tank 258 and lower than the driver's seat bottom 62b. This provides for ease of access for servicing under the rear cargo area 56 (FIGS. 1 and 2) as well as allowing duct 1366 to be relatively short due to the proximity of airbox 1362 to the engine 32.

Figure 68:
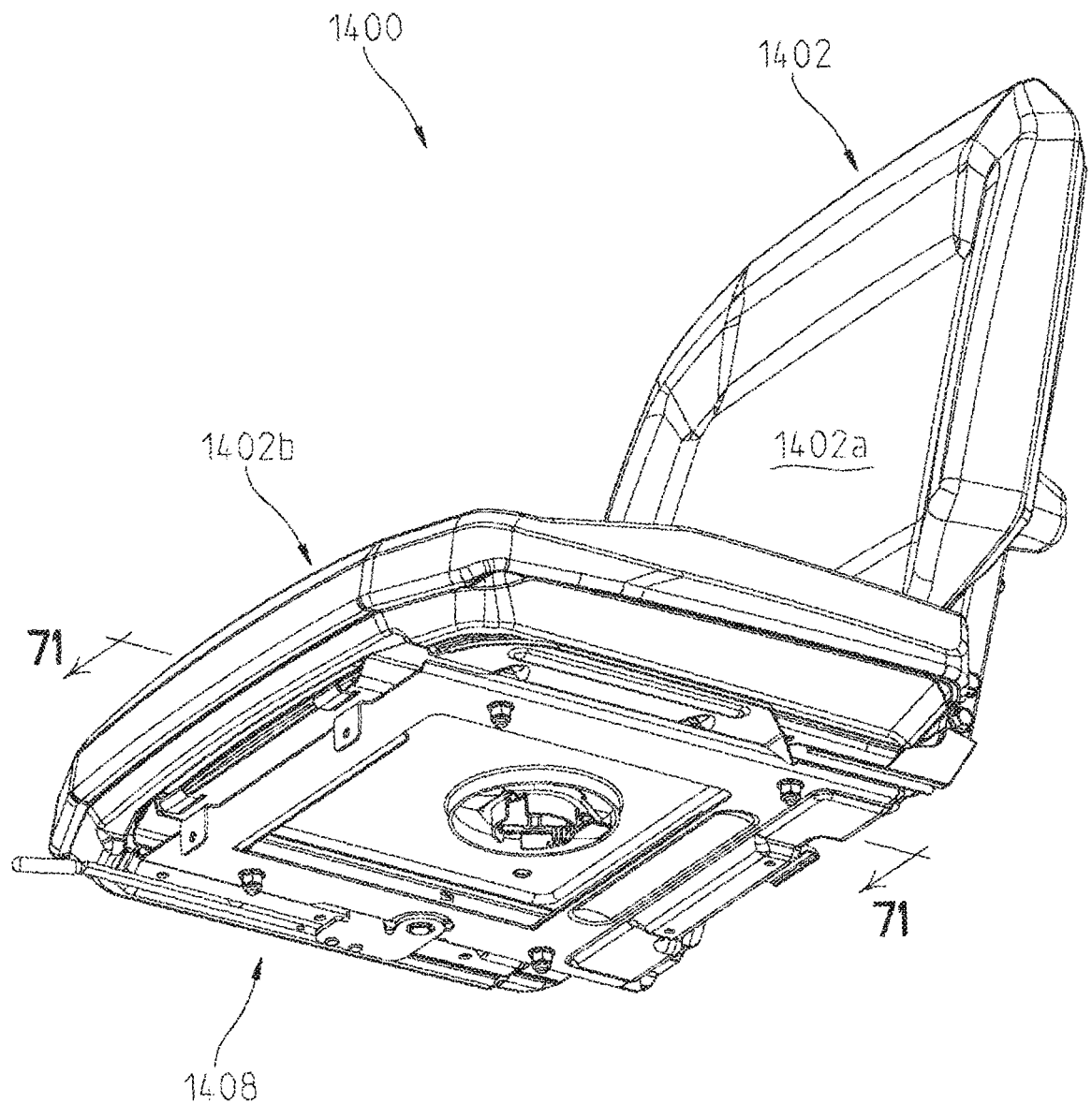
FIG. 68 shows an underside perspective view of the driver seat.
Figure 69:
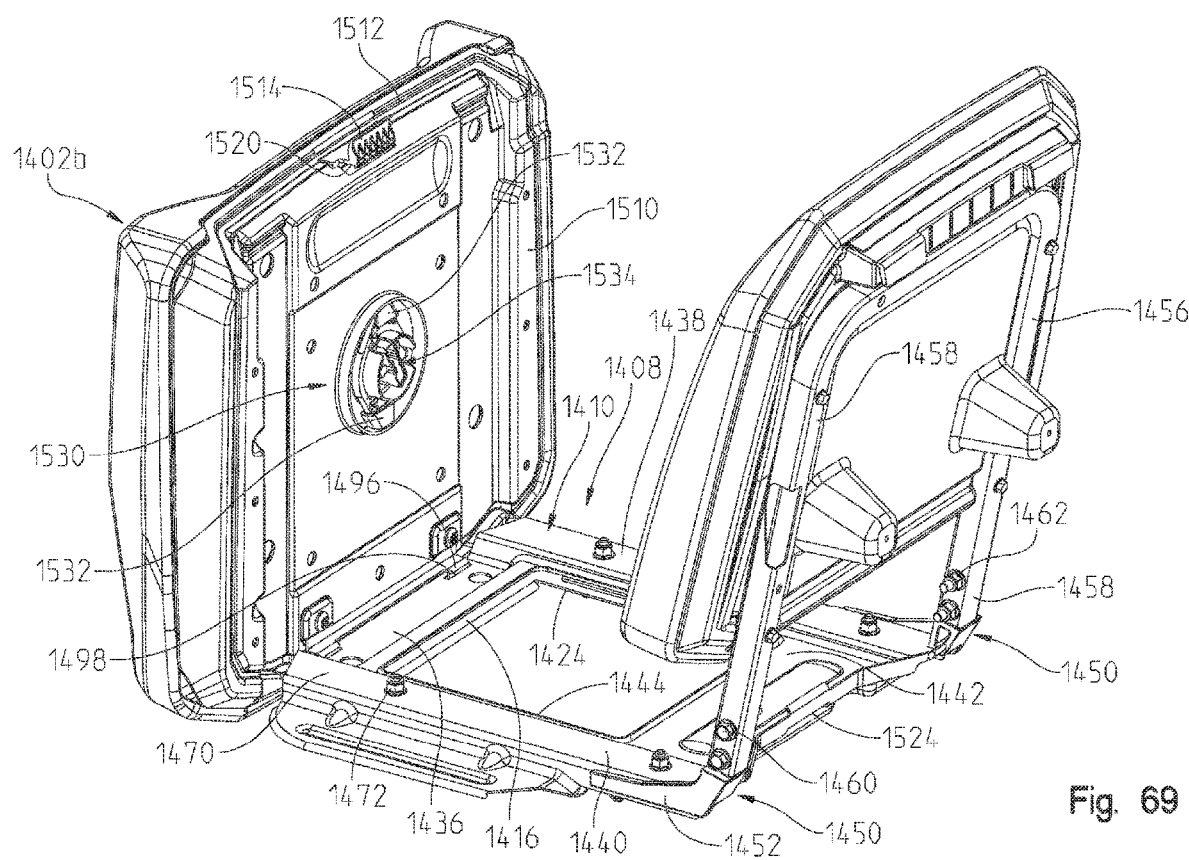
FIG. 69 shows a left rear perspective view of the driver seat with the seat bottom rotated to an open position.
Figure 70:
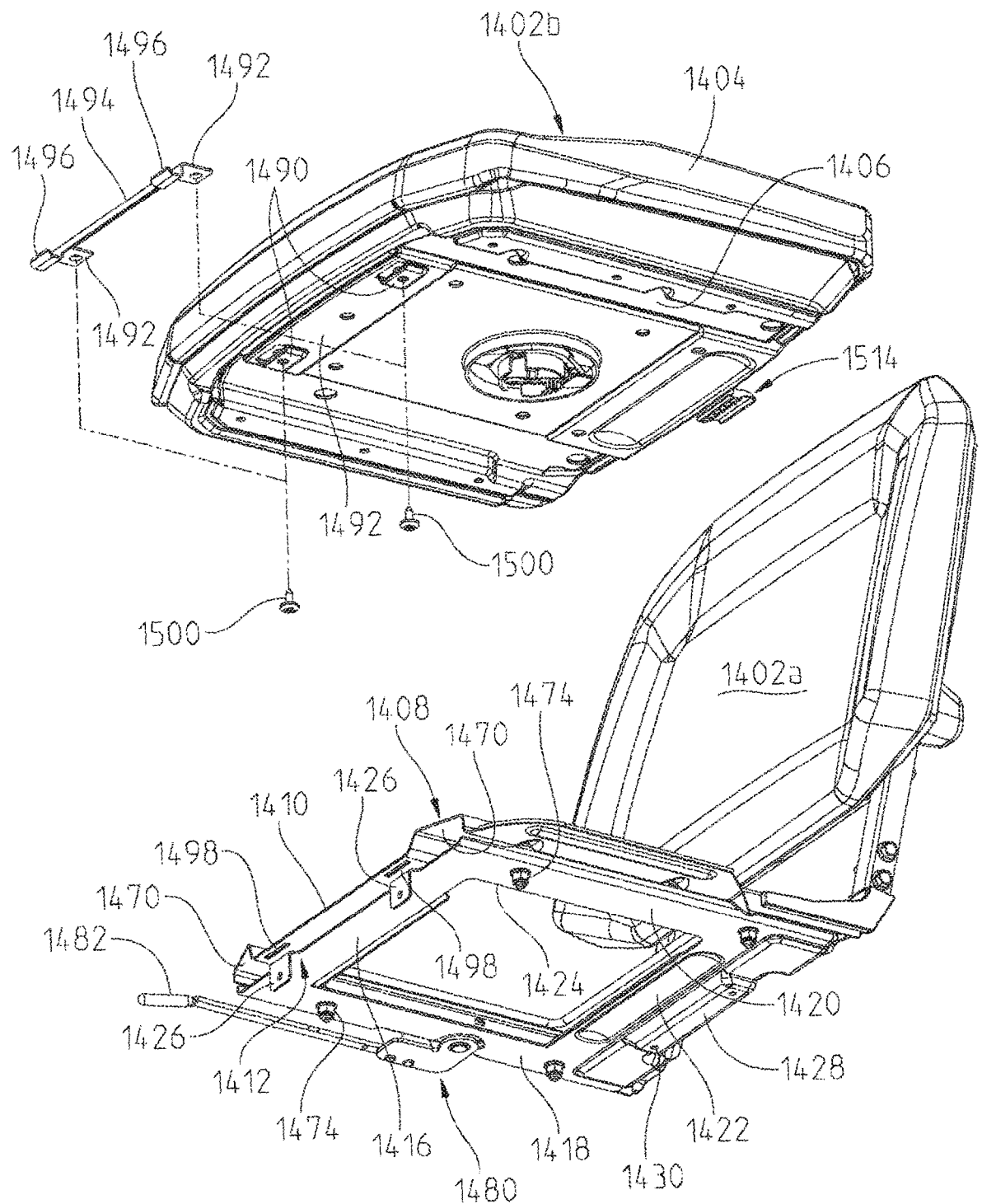
FIG. 70 shows an underside perspective view of the driver seat with the seat bottom exploded away from the seat frame.
Figure 71:
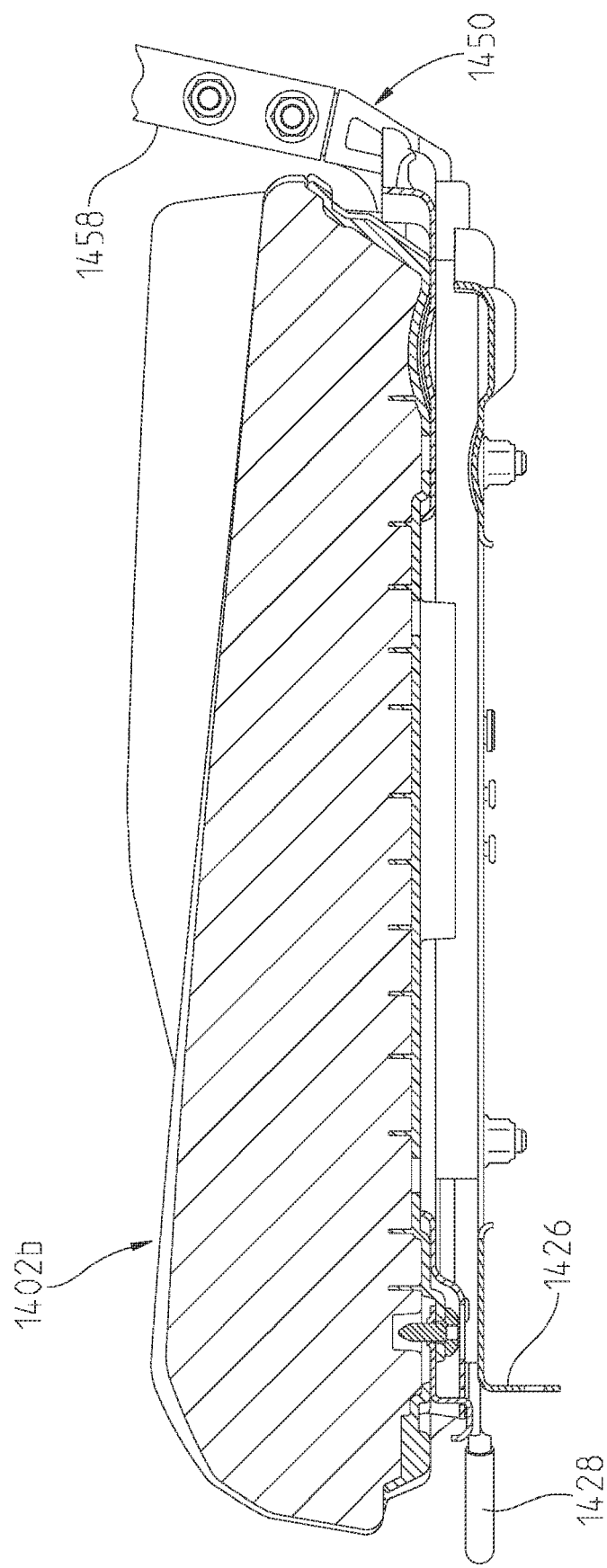
FIG. 71 shows a cross-sectional view of the driver seat through lines 71-71 of FIG. 68.

With reference now to FIGS. 68-72, an alternate driver's seat assembly is shown at 1400 having a seat 1402 with a seat back 1402a and a seat bottom 1402b. Seat bottom 1402b includes an upper cushion portion 1404 and a seat bottom mount 1406 (FIG. 70). Seat 1402 is coupled to a seat frame 1408 which in turn is coupled to the frame, namely to seating mount 112 (see FIG. 3). As shown best in FIG. 70, seat frame 1408 includes an upper frame portion 1410 and a lower frame portion 1412.

Lower frame portion 1412 includes a front frame portion 1416, side frame portions 1418, 1420 and rear frame portion 1422. Frame portions 1416-1422 circumscribe an opening 1424 of lower frame portion 1412. Front frame portion 1416 includes mounting tabs 1426 for mounting the seat frame 1408 to the seating mount 112, and rear frame portion 1422 has a boss 1428 having apertures 1430 for mounting the seat frame 1408 to the seating mount 112.

As shown best in FIG. 69, upper frame portion 1410 includes a front frame portion 1436, side frame portions 1438, 1440 and rear frame portion 1442. Frame portions 1436-1442 circumscribe an opening 1444, which substantially overlies opening 1424. Upper frame portion 1410 also includes corner brackets 1450 having a leg portion 1452 coupled to the side frame portions 1438, 1440; and further includes a portion (not seen) which extends upwardly into the seat back frame 1456. Namely, the corner brackets have a portion extending upwardly through vertical tube portions 1458 of seat back frame 1456, and are held together by way of fasteners 1460, 1462. By way of example, corner brackets 1450 could be a casting such as aluminum and coupled to the upper frame portion 1410 by way of fasteners, adhesives or welding.

Upper frame portion 1410 also includes channel shaped sections 1470 (FIG. 70) which receives a slider mechanism (not shown) which allows the upper frame portion 1410 to slide forwardly and rearwardly relative to lower frame portion 1412. More particularly, the slider mechanism includes an upper track coupled by way of fasteners 1472 (FIG. 69) and a lower track coupled by way of fasteners 1474 (FIG. 70), where the upper and lower tracks move by way of ball bearings. A latch mechanism 1480 (FIG. 70) couples the slide mechanism into the fixed position as shown in FIG. 68, but can be released by way of handle 1482 to allow the upper frame portion 1410 to slide relative to the lower frame portion 1412, as is known in the art. It should be understood that the seat back 1402a and seat bottom 1402b slide together relative to the lower frame portion 1412, and to the remainder of the vehicle.

With reference again to FIG. 70, the coupling of the seat bottom 1402b to the seat frame 1408 will be described in greater detail. As shown best in FIG. 70, seat bottom mount 1406 includes two sheared sections 1490, sheared away from section 1492 of seat bottom mount 1406, which receives tabs 1492 of a clip 1494. Clip 1494 has two hooks at 1496 which are received in slots 1498 (FIG. 70) in upper frame portion 1410. Clip 1494 is coupled to the seat bottom mount 1406 by way of fasteners 1500.

As shown best in FIG. 69, seat bottom 1402b includes a molded frame portion 1510 having a rear section 1512 having a molded living hinge 1514. As shown in FIG. 72, hinge is shown having a latch handle 1516 and a latch hook 1520. As shown in FIG. 69, upper frame portion 1410 includes a rear edge 1524 which receives the latch hook 1520. Thus, seat bottom 1402b can be rotated open into the position of FIG. 69, by releasing the latch 1514 and rotating the seat bottom 1402b. This allows access through openings 1424, 1444 to items under the seat.

Finally, the seat bottom 1402b has a molded in sensor mount 1530 having wings 1532 for rotatably receiving a sensor 1534, when rotated in a clockwise position shown in FIG. 69.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising:
a plurality of ground-engaging members;
a frame supported by the ground-engaging members;
a drivetrain supported by the frame;
an occupant compartment comprising a seating area having a seat,
the seat defined by a seat back and a seat bottom, the seat bottom being pivotal relative to the seat back and towards the seat back, the seat having a linkage to hold the seat bottom in the upper position, the seat including a linkage having a link arm coupled to the seat bottom and to the frame.

2. The utility vehicle of claim 1, wherein the linkage includes a linear force element, which holds the seat in the up position.

3. The utility vehicle of claim 1, wherein the link arm is coupled to the frame at a first pivot point.

4. The utility vehicle of claim 3, wherein the first pivot point is fixed.

5. The utility vehicle of claim 3, wherein a bracket is coupled to the seat bottom and to the linear force element at a second pivot point.

6. The utility vehicle of claim 5, wherein the second pivot point is movable relative to the first pivot point.

7. The utility vehicle of claim 6, wherein when the seat bottom is in the down position, the second pivot point is rearward of the first pivot point, and when the seat is in the up position, the second pivot point is forward of the first pivot point.

8. The utility vehicle of claim 1, wherein the frame comprises a seat frame member; and the passenger seat extends transversely of the seat frame member so as to cantilever over an end of the seat frame member, the space under the cantilevered portion of the seat bottom being available for storage.

9. A utility vehicle, comprising:
a plurality of ground-engaging members;
a frame supported by the ground-engaging members, including a seat frame member;
a drivetrain supported by the frame;
an operators compartment comprising a seat;
the seat defined by a seat back, a seat bottom, and a linkage to hold the seat bottom in the upper position and including a link arm coupled to the seat bottom and to the frame,
the seat extending transversely of the seat frame member so as to cantilever over an end of the seat frame member, a space under the cantilevered portion of the seat bottom being available for storage.

10. The utility vehicle of claim 9, wherein the seat bottom being pivotal relative to the seat back and towards the seat back.

11. The utility vehicle of claim 10, wherein the seat is a passenger's seat.

12. The utility vehicle of claim 11, wherein a pedestal surrounds the seat frame and defines a right lateral surface under the seat bottom.

13. The utility vehicle of claim 12, wherein the right lateral surface extends rearwardly to a back wall.

14. The utility vehicle of claim 13, wherein an inner side panel opposes the right lateral surface under the seat bottom.

15. The utility vehicle of claim 13, wherein the space under the seat bottom and defined between the inner side panel, right lateral surface and back wall defines enough storage are for an accessory storage bin.

16. The utility vehicle of claim 15, wherein the accessory storage bin is a 5 gallon bucket.

17. The utility vehicle of claim 9, wherein the passenger seat includes a linkage including a linear force element, which holds the seat in the up position.

18. The utility vehicle of claim 17, wherein the link arm is coupled to the frame at a first pivot point.

19. The utility vehicle of claim 18, wherein the first pivot point is fixed.

20. The utility vehicle of claim 19, wherein a bracket is coupled to the seat bottom and to the linear force element at a second pivot point.

21. The utility vehicle of claim 20, wherein the second pivot point is movable relative to the first pivot point.

22. The utility vehicle of claim 21, wherein when the seat bottom is in the down position, the second pivot point is rearward of the first pivot point, and when the seat is in the up position, the second pivot point is forward of the first pivot point.

23. The utility vehicle of claim 9, wherein the seat is a driver's seat defined by a seat back and a seat bottom.

24. The utility vehicle of claim 23, further comprising a door having a storage compartment on an inside of the door, wherein the door when closed places the storage compartment in the space.

25. A utility vehicle, comprising:
a plurality of ground-engaging members;
a frame supported by the ground-engaging members, including a seat frame member;
a drivetrain supported by the frame;
an operators compartment comprising a seat;
the seat defined by a seat back, a seat bottom, and a pedestal surrounding the seat frame and defining a right lateral surface under the seat bottom, the seat extending transversely of the seat frame member so as to cantilever over an end of the seat frame member, a space under the cantilevered portion of the seat bottom being available for storage.

26. A utility vehicle, comprising:
a plurality of ground-engaging members;
a frame supported by the ground-engaging members, including a seat frame member;
a drivetrain supported by the frame;
an operators compartment comprising a seat that is a driver's seat; and
a door having a storage compartment on an inside of the door,
the seat defined by a seat back and a seat bottom, the seat extending transversely of the seat frame member so as to cantilever over an end of the seat frame member, a space under the cantilevered portion of the seat bottom being available for storage, wherein the door when closed places the storage compartment in the space.

* * * * *